US011105999B2

(12) United States Patent
Alston et al.

(10) Patent No.: US 11,105,999 B2
(45) Date of Patent: Aug. 31, 2021

(54) TELECOMMUNICATIONS CABLING SYSTEM

(71) Applicant: CommScope Technologies LLC, Hickory, NC (US)

(72) Inventors: Eric Emmanuel Alston, Fuquay-Varina, NC (US); Julian S. Mullaney, Raleigh, NC (US); William Alan Carrico, Raleigh, NC (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/686,841

(22) Filed: Nov. 18, 2019

(65) Prior Publication Data

US 2020/0158978 A1 May 21, 2020

Related U.S. Application Data

(63) Continuation of application No. 15/815,196, filed on Nov. 16, 2017, now Pat. No. 10,481,360.

(60) Provisional application No. 62/423,017, filed on Nov. 16, 2016, provisional application No. 62/423,030, filed on Nov. 16, 2016.

(51) Int. Cl.
*G02B 6/44* (2006.01)

(52) U.S. Cl.
CPC .......... *G02B 6/4497* (2013.01); *G02B 6/4483* (2013.01); *G02B 6/4486* (2013.01); *G02B 6/4488* (2013.01); *G02B 6/4457* (2013.01)

(58) Field of Classification Search
CPC .. G02B 6/4497; G02B 6/4483; G02B 6/4486; G02B 6/4488; G02B 6/4457

USPC ........................................................ 385/134
See application file for complete search history.

(56) References Cited

U.S. PATENT DOCUMENTS

| 3,099,216 | A | | 7/1963 | Jakobsen et al. |
| 3,517,702 | A | | 6/1970 | Mueller et al. |
| 4,707,074 | A | | 11/1987 | Heywood |
| 4,944,976 | A | | 7/1990 | Plummer, III |
| 5,505,230 | A | | 4/1996 | Bartholomew |
| 5,681,131 | A | * | 10/1997 | Goldenberg ............ F16L 55/26 242/118.1 |

(Continued)

FOREIGN PATENT DOCUMENTS

| JP | 04332406 A | 11/1992 |
| WO | 9210869 A1 | 6/1992 |
| WO | 2014188321 A1 | 11/2014 |

*Primary Examiner* — Jerry M Blevins
(74) *Attorney, Agent, or Firm* — Merchant & Gould P.C.

(57) ABSTRACT

A telecommunications cable jacket insertion system operates to insert a telecommunication cable into a jacket after the jacket has been separately extruded. The system includes a jacket having structures for easily inserting a cable therein over a long distance in a field location. The system can further include a tool for facilitating the insertion of the cable into the jacket. Further, a cabling system includes a cable assembly that is disaggregated into a robust outer jacketing portion and a manageable fiber optic cable portion. For regions of a cable installation where a robust cable construction is desired, the manageable fiber optic cable portion is sheathed or otherwise contained within the robust outer jacketing portion. For regions of a cable installation where a robust cable construction is not needed, the manageable fiber optic cable portion extends beyond or outside of the robust outer jacketing portion.

20 Claims, 35 Drawing Sheets

(56) References Cited

U.S. PATENT DOCUMENTS

| | | | |
|---|---|---|---|
| 6,094,792 | A | 8/2000 | Frye et al. |
| 6,195,861 | B1 | 3/2001 | Frye et al. |
| 6,219,907 | B1 | 4/2001 | Frye |
| 6,239,357 | B1 | 5/2001 | Mabry et al. |
| 6,639,152 | B2 | 10/2003 | Glew et al. |
| 7,098,405 | B2 | 8/2006 | Glew |
| 7,197,816 | B1 | 4/2007 | Frye |
| 7,225,534 | B2 | 6/2007 | Kachmar |
| 7,592,550 | B2 | 9/2009 | Stutzman et al. |
| 7,715,679 | B2 | 5/2010 | Kowalczyk et al. |
| 7,756,379 | B2 | 7/2010 | Kowalczyk et al. |
| 7,784,259 | B2 | 8/2010 | O'Rourke et al. |
| 7,869,682 | B2 | 1/2011 | Kowalczyk et al. |
| 8,167,504 | B2 | 5/2012 | Allen et al. |
| 8,292,517 | B2 | 10/2012 | Allen et al. |
| 8,859,898 | B2 | 10/2014 | Frye |
| 9,182,567 | B2 | 11/2015 | Mullaney |
| 2002/0133939 | A1* | 9/2002 | Gordon .................... H02G 1/08 29/825 |
| 2008/0292261 | A1 | 11/2008 | Kowalczyk et al. |
| 2009/0060441 | A1 | 3/2009 | Kowalczyk et al. |
| 2009/0074370 | A1 | 3/2009 | Kowalczyk et al. |
| 2009/0294016 | A1 | 12/2009 | Sayres et al. |
| 2009/0324181 | A1 | 12/2009 | Kachmar et al. |
| 2009/0324182 | A1 | 12/2009 | Kachmar et al. |
| 2010/0150504 | A1* | 6/2010 | Allen .................... G02B 6/4475 385/76 |
| 2014/0153890 | A1 | 6/2014 | Sayres et al. |
| 2016/0004016 | A1* | 1/2016 | Zimmel ............... G02B 6/3885 385/59 |
| 2016/0077301 | A1 | 3/2016 | Sayres et al. |
| 2016/0207723 | A1 | 7/2016 | Mullaney et al. |
| 2016/0347573 | A1* | 12/2016 | Runzel .................... B65H 49/32 |

\* cited by examiner

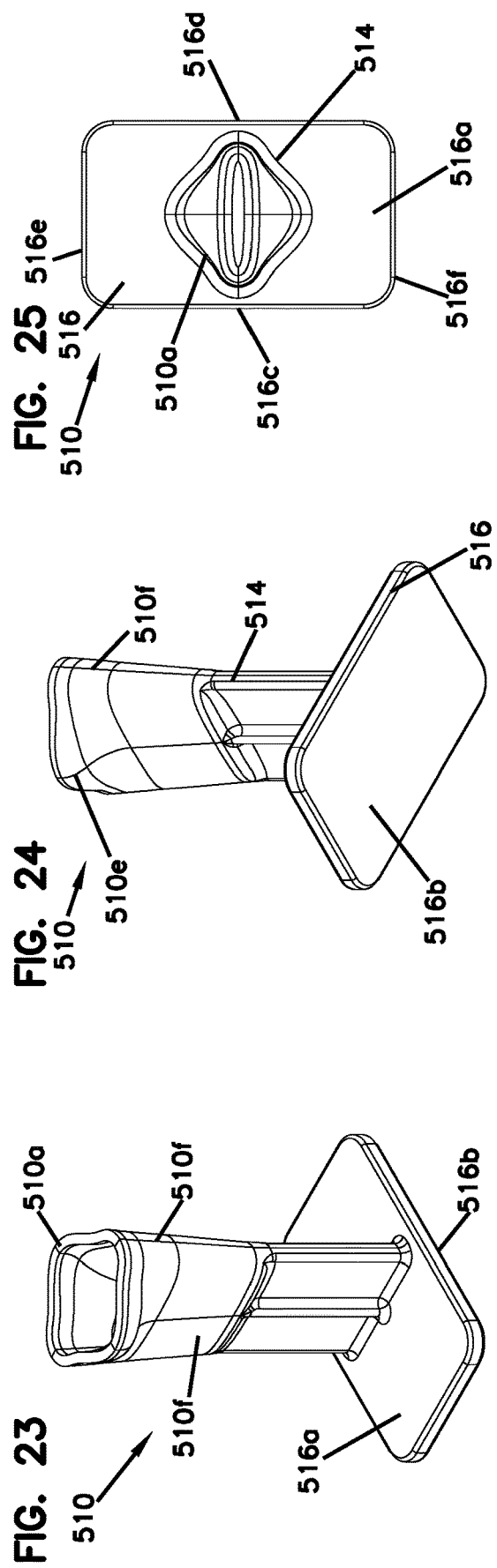
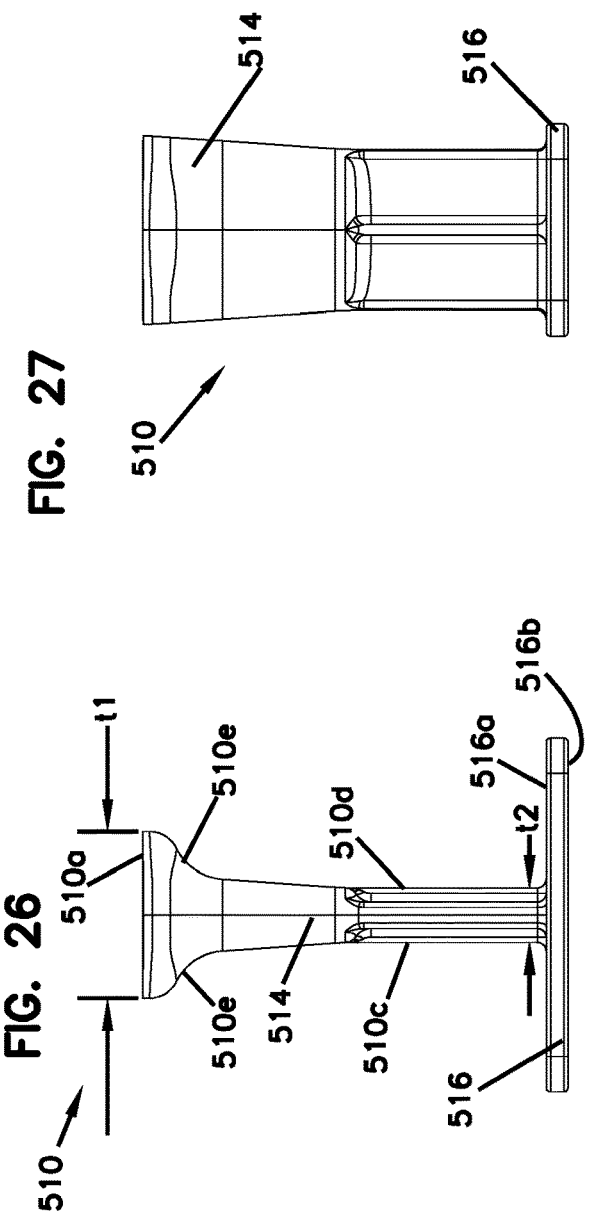

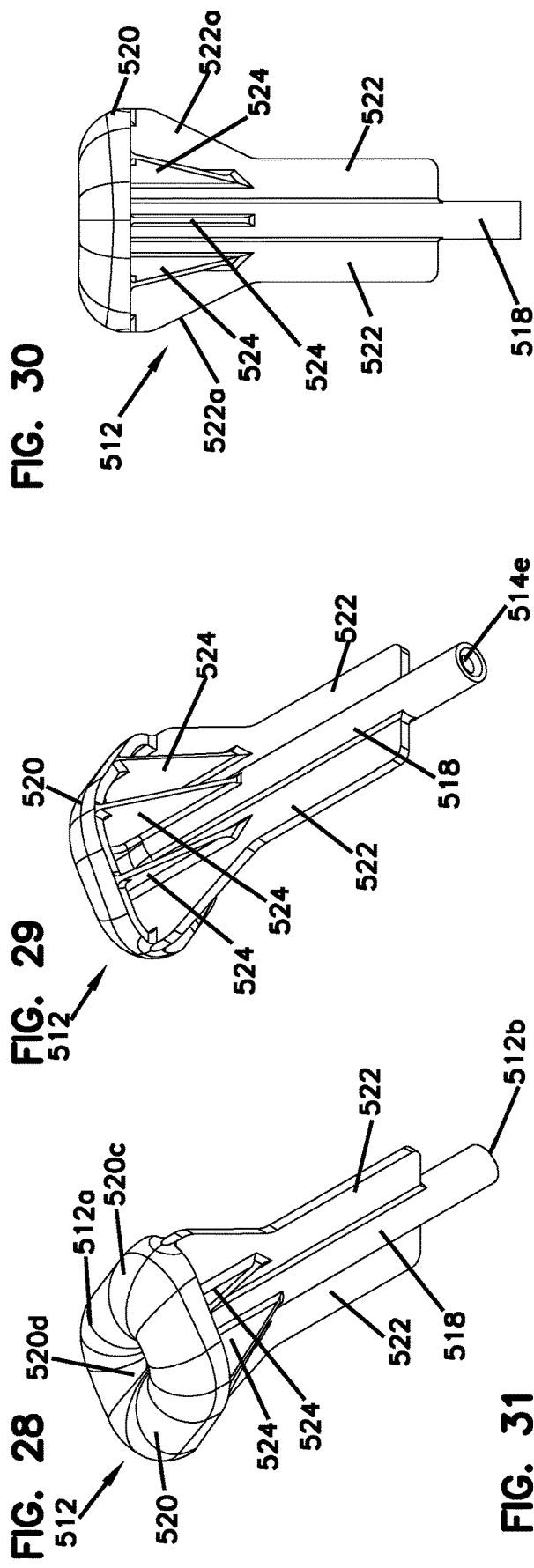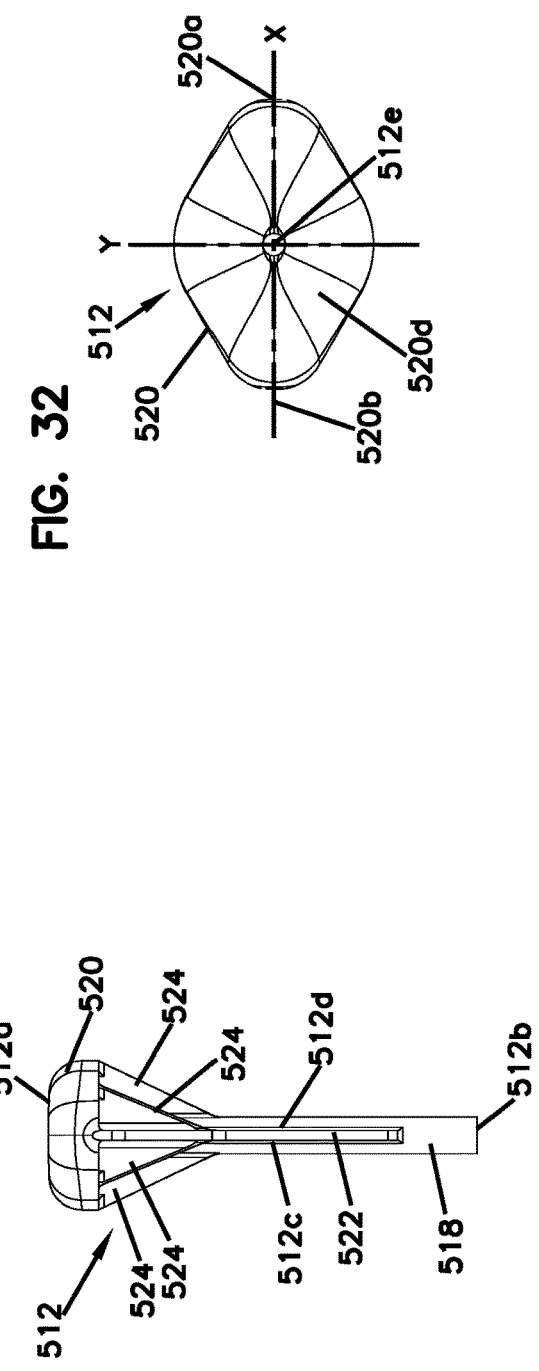

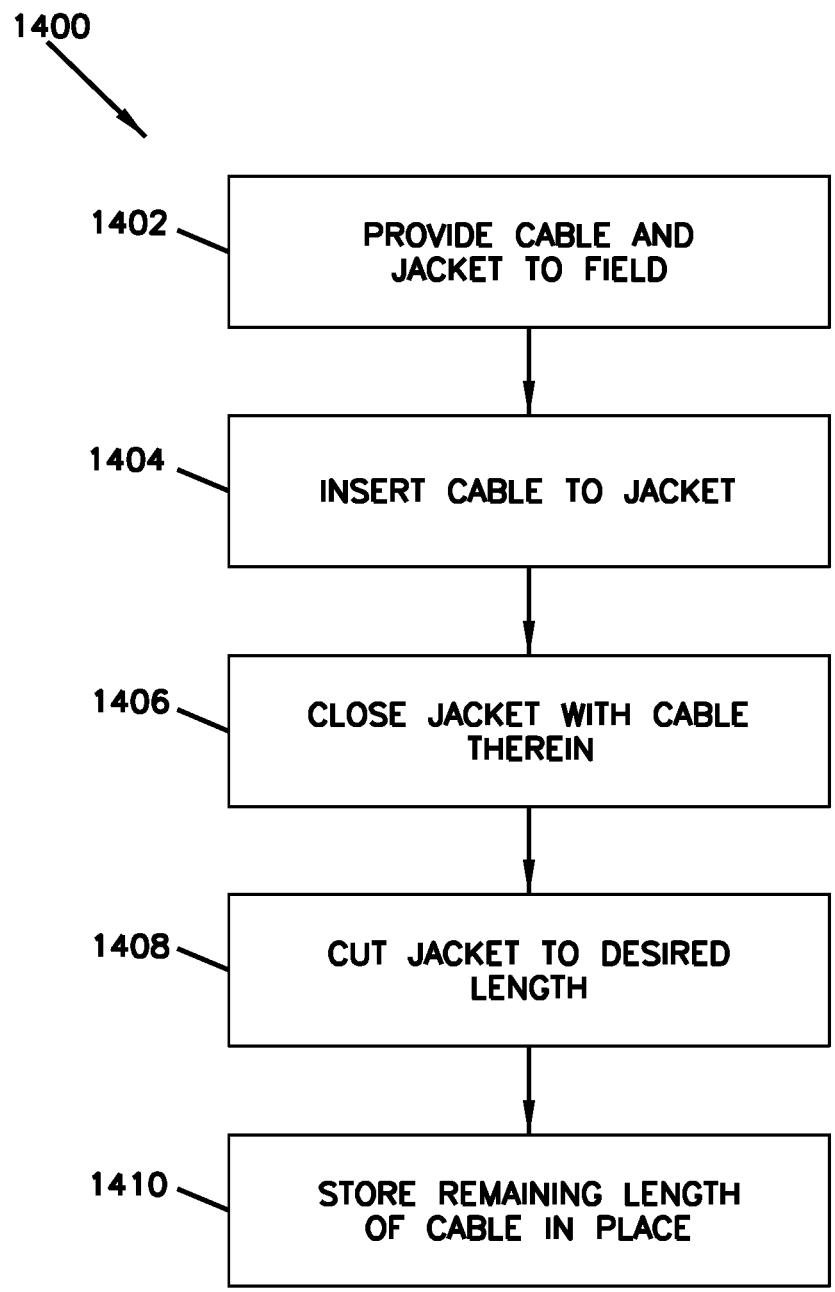

TELECOMMUNICATIONS CABLING SYSTEM

CROSS-REFERENCE TO RELATED APPLICATIONS

This application is a divisional application of U.S. patent application Ser. No. 15/815,196, filed Nov. 16, 2017, now U.S. Pat. No. 10,481,360. U.S. Ser. No. 15/815,196 claims the benefit of U.S. Patent Application Ser. No. 62/423,017 titled TELECOMMUNICATIONS CABLE JACKET INSERTION SYSTEM filed Nov. 16, 2016 and U.S. Patent Application Ser. No. 62/423,030 titled TELECOMMUNICATIONS CABLING SYSTEM filed Nov. 16, 2016. The disclosures of U.S. patent application Ser. No. 15/815,196; U.S. Patent Application Ser. No. 62/423,017; and, U.S. Patent Application Ser. No. 62/423,030 are hereby incorporated by reference in their entireties. A claim of priority is made to each of the above-referenced applications.

BACKGROUND

Fiber optic networks are increasingly being extended and expanded to satisfy customer demand for high speed voice, data and video services. Fiber optic cables are a fundamental building block for any fiber optic network. The structural design of fiber optic cables has been driven at least in part by the inherent fragility and breakability of optical fibers. Thus, a primary goal of a fiber optic cable design is to provide adequate protection to optical fibers such that the optical fibers are not broken or otherwise damaged in the field (e.g., during installation or with use over time).

To achieve this goal, fiber optic cables often include robust outer jackets and relatively stiff reinforcing elements (e.g., reinforcing rods formed by fiberglass reinforced polymers such as fiberglass reinforced epoxy) which provide effective protection for optical fibers contained within the jackets. This type of design is particularly prevalent for outdoor rated fiber optic cables, but generally applies to other types of fiber optic cables as well. While traditional fiber optic cable design are effective for providing optical fiber protection, such designs can cause difficulties or inefficiencies in the area of cable management. For example, many fiber optic cables are connectorized in the factory and are not customized to have a specific length equal to the intended length of cable ultimately needed in the field. Instead, fiber optic cables are typically selected with lengths longer than the intended or expected use length in the field. When installed, the excess fiber optic cable is typically coiled and stored, often in an enclosure. The bulky, robust nature of traditional fiber optic cable causes sections of cable that have been coiled for storage to be relatively large and awkward to store.

SUMMARY

This disclosure relates to a system for inserting a telecommunications cable. In one possible configuration and by non-limiting example, a telecommunications cable is deaggregated from a jacket, and the cable and the jacket are combined or merged in a field location where the cable is to be routed. In some examples, the cable is fed into the jacket as the jacket is deployed along a predetermined path.

As a telecommunication cable, such as a fiber optic cable, is delicate, the cable needs to be protected by a jacket or a protective outer layer. A jacket is used to receive and protect the cable along a desired path. In accordance with the present disclosure, a cable and a jacket is separately provided in a field location. As cables are relatively small in size (e.g., a cross sectional diameter), the cables can be stored in a small package and carried to field in the package. For example, cables can be stored in a dispenser (either rotating or non-rotating) or any other storage and dispensing device, such as a coil, reel, roller, or spool) and carried to field. In certain examples, different lengths of cables are prepared as different packages such that a technician or installer can select and use a package containing a desired length of cable. In certain examples, the cables are preconnectorized at either or both of the ends thereof.

The jacket in accordance with the present disclosure has structures for easily inserting a cable therein over a long distance in a field location. Further, the jacket is configured to be easily stored and carried to field, separately from a cable. In the field, the jacket can be fed with a cable as the jacket is deployed to a predetermined path. Once the cable is routed as desired, the jacket can be cut to length and any remaining length of the cable can be stored in place, such as an enclosure. Since the jacket can be cut to length after a desired length of cable is routed, a technician or installer does not need to know the exact length of cable to be routed along the path.

In certain examples, the system can further include a tool for facilitating the insertion of the cable into the jacket. The tool is configured to feed a cable into a jacket as the jacket is routed along a path by either pulling or pushing an assembly of the cable and the jacket.

In certain examples, the system for installing a cable includes a cable dispenser and a jacket insertion device associated with the cable dispenser and configured to insert a telecommunications cable laterally to an extruded jacket.

For example, one aspect is a system for inserting a telecommunications cable into a jacket. The system includes a non-rotating cable dispenser, a length of jacket, and a jacket insertion device. The non-rotating cable dispenser is configured to store a length of telecommunications cable and includes a cable outlet through which the telecommunications cable is dispensed. The cable dispenser is configured to wind the telecommunications cable into a coreless coil defining an interior winding surface and an exterior winding surface. The interior winding surface defines a hollow interior. The cable dispenser further includes a plurality of winding separators at least partially embedded within the coil. The length of telecommunications cable alternately passes on one of the first and second sides of one winding separator and on the other of the first and second sides of an adjacent winding separator. The length of jacket includes an interior passage and a slit running along the length of the jacket. The jacket insertion device includes a jacket guide defining a jacket feeder channel. The jacket feeder channel extends from a first end to a second end and is configured to receive a leading end of the length of jacket at the first end. The cable guide is configured to guide the length of telecommunications cable to pass at least a portion of the jacket feeder channel and extend out from the second end of the jacket feeder channel. The cable guide is configured to align the length of telecommunications cable with the slit of the length of jacket passing through the jacket feeder channel. At least a portion of the length of telecommunications cable is inserted into the interior passage of at least a portion of the length of jacket through at least a portion of the slit as the length of jacket and the length of telecommunications cable moves past the jacket insertion device in the travel direction.

Another aspect is a method of inserting a telecommunications cable into a jacket. The jacket having a longitudinal slit. The method includes engaging a portion of the telecommunications cable with a cable guide of a jacket insertion device such that the portion of the telecommunications cable is placed within a jacket feeder channel, the telecommunications cable being stored in and dispensed from a cable dispenser; inserting a portion of the jacket into the jacket feeder channel to align the portion of telecommunications cable with the slit of the jacket; and pulling the telecommunications cable and the jacket together to enable the telecommunications cable to be laterally inserted into the jacket through the slit of the jacket.

Yet another aspect is a system for inserting a telecommunications cable into a conduit. The conduit has a slot extending along a length of the conduit. The system includes a non-rotating cable dispenser storing a length of communications cable, and an insertion device configured to guide the communications cable from the cable dispenser to the conduit through the slot of the conduit.

Further, this disclosure relates to a cabling system and method.

One aspect of the present disclosure relates to a cabling system that can be configured to provide robust cabling sections for regions of a cable installation that require enhanced optical fiber protection and less robust, more flexible cabling sections for regions of a cable installation (e.g., a cable storage section) where less optical fiber protection is required). In one example, the cabling system can include a cable assembly that can be disaggregated into a robust outer jacketing portion and a manageable fiber optic cable portion. For regions of a cable installation where a robust cable construction is desired, the manageable fiber optic cable portion is sheathed or otherwise contained within the robust outer jacketing portion. For regions of a cable installation where a robust cable construction is not needed, the manageable fiber optic cable portion extends beyond or outside of the robust outer jacketing portion. For the regions of the cabling system that include the manageable fiber optic cable portion alone, excess length of the manageable fiber optic cable portion can be effectively managed by coiling or otherwise routing the excess length of manageable fiber optic cable in a small package (e.g., a small enclosure, a small spool, a small fiber holding unit, etc.).

In one example, the robust outer jacketing portion can include a polymeric outer jacket that may include one or more strength members within a wall of the outer jacket. The outer jacket can define a passage for receiving the manageable fiber optic cable portion. In one example the strength members can include relatively rigid rods such as fiberglass reinforced polymer rods, metal rods or like structures. Such rods can have sufficient stiffness to limit or prevent excessive bending of the outer jacket so that bend radius requirements of the manageable fiber optic cable portion present therein are maintained. Such rods can also have sufficient column strength to allow the outer jacket to be pushed along a routing path (e.g., through a conduit/sleeve) during installation and/or enough tensile strength to be pulled along a routing path (e.g., through a conduit/sleeve) during installation. More flexible strength members such as yarns or tapes (e.g., Aramid yarns or tapes) can also be used in some examples. In preferred examples the outer jacket defines a longitudinal slit (e.g., seam, slot, opening, etc.) that allows the outer jacket to be opened along its length such that the manageable fiber optic cable can be laterally loaded therein (e.g., zipped in, plowed in or otherwise inserted therein through a side of the outer jacket). In a preferred example, the longitudinal slit includes an interlocking longitudinal interface providing a mechanical interlock that retains the slit in a closed configuration after the manageable fiber optic cable has been loaded within the outer jacket. In one example, the outer jacket portion has a maximum cross-dimension that is at least 2, 3, 4 or 5 times as large as a corresponding maximum cross-dimension of the manageable fiber optic cable portion. In one example, the manageable fiber optic cable portion is at least 2, 3, 4 or 5 times more flexible than the outer jacketing portion.

It is preferred for the manageable fiber optic cable portion includes fiber optic cable that is smaller, more flexible and more lightweight (e.g., less robust) than the outer jacketing portion. In one example, the fiber optic cable portion is only a coated optical fiber. Such a coated optical fiber includes a core, a cladding layer and at least one polymeric coating (e.g., acrylate or other polymer). Such a coated optical fiber can also include a core, a cladding layer and multiple protective layers (e.g., an initial coating layer such as acrylate covered by an outer buffer layer). In certain examples, the manageable fiber optic cable is a micro-cable. In certain examples, the manageable fiber optic cable includes an optical fiber including a core, a cladding layer and a coating; and also includes a cable jacket and a tensile strength structure (e.g., one or more strength members or layers). The tensile strength structure can be positioned between the optical fiber and the cable jacket of the manageable fiber optic cable. The tensile strength member can be configured to provide tensile strength without providing meaningful compressive strength. The tensile strength member can be highly flexible to allow the manageable fiber optic cable to be bent along a relatively tight radius to enhance the ability to store the manageable fiber optic cable in a small volume or package. In certain examples the tensile strength member can include a yarn or yarn-like strength element (e.g., Aramid yarn) or a tape or tape-like strength element. In certain examples, the manageable fiber optic cable has a minimum bend radius less than 100 mm. In other examples, the manageable fiber optic cable has a minimum bend radius of around 2-5 mm. In certain examples, the manageable fiber optic cable has a maximum cross-dimension or outer diameter less than or equal to 4, 3, 2 or 1 millimeters. In certain examples, opposite ends of the manageable fiber optic cable can be preconnectorized (e.g., the connectors can be installed at the factory or in a controlled manufacturing setting) prior to installation of the cabling system in the field. In certain examples, the manageable fiber optic cable (e.g., the connectorized manageable fiber optic cable) can be managed separately from the outer jacketing structure by a storage device capable of storing the manageable fiber optic cable in a relatively small volume and capable of allowing the manageable fiber optic cable to be readily paid out from the storage device during deployment of the cabling system. In certain examples, the storage device can include a rotatable spool that rotates as the manageable fiber optic cable is paid out, or a containment device that allows the manageable fiber optic cable to be paid out without rotation of the containment device.

In use of the cabling system, the outer jacketing portion and the manageable fiber optic cable portion are delivered in disaggregated state to an installation site in the field. For example, the outer jacketing portion can be delivered coiled about a relatively large spool and the manageable fiber optic cable portion can be delivered within or on a separate management device. During installation, the manageable fiber optic cable portion is loaded laterally into the outer jacketing portion (e.g., through a longitudinal slit) to provide an aggregated portion of the cabling assembly. By aggregating the outer jacket portion and the manageable fiber optic cable portion, the robust nature of the outer jacket portion can be used to protect the manageable fiber optic cable portion during installation/routing and can also be used to effective push or pull the cabling system along the desired routing path (e.g., through a sleeve or other structure). Once the aggregated portion of the cabling system has been installed along the desired routing path, the outer jacketing portion can be cut to length. In this way, the length of the outer jacketing portion can be customized in the field so that excess length of the outer jacketing portion need not be managed and stored. After installation, the manageable fiber optic cable portion can extend beyond the ends of the outer jacketing portion. The flexible and small nature of the manageable fiber optic cable portion allows it to be efficiently and effectively managed and stored. The length of the manageable fiber optic cable portion need not be customized. Instead, the manageable fiber optic cable portion can be pre-connectorized with a standard length longer than the length of the intended installation path, and the excess length of the manageable fiber optic cable portion can he efficiently stored by a management device having a relatively small volume.

BRIEF DESCRIPTION OF THE DRAWINGS

FIG. 23 is a top perspective view of a winding separator of the packaged cable dispenser of FIG. 17.

FIG. 24 is a bottom perspective view of the winding separator shown in FIG. 23.

FIG. 25 is a top view of the winding separator shown in FIG. 23.

FIG. 26 is a first side view of the winding separator shown in FIG. 23.

FIG. 27 is a second side view of the winding separator shown in FIG. 23.

FIG. 28 is a top perspective view of a payout tube of the packaged cable dispenser of FIG. 23.

FIG. 29 is a bottom perspective view of the payout tube shown in FIG. 23.

FIG. 30 is a first side view of the winding separator shown in FIG. 23.

FIG. 31 is a second side view of the winding separator shown in FIG. 23.

FIG. 32 is a top view of the winding separator shown in FIG. 23.

FIG. 53 is a flowchart of an example method for installing a cable with a jacket in field.

DETAILED DESCRIPTION

Figure 1:
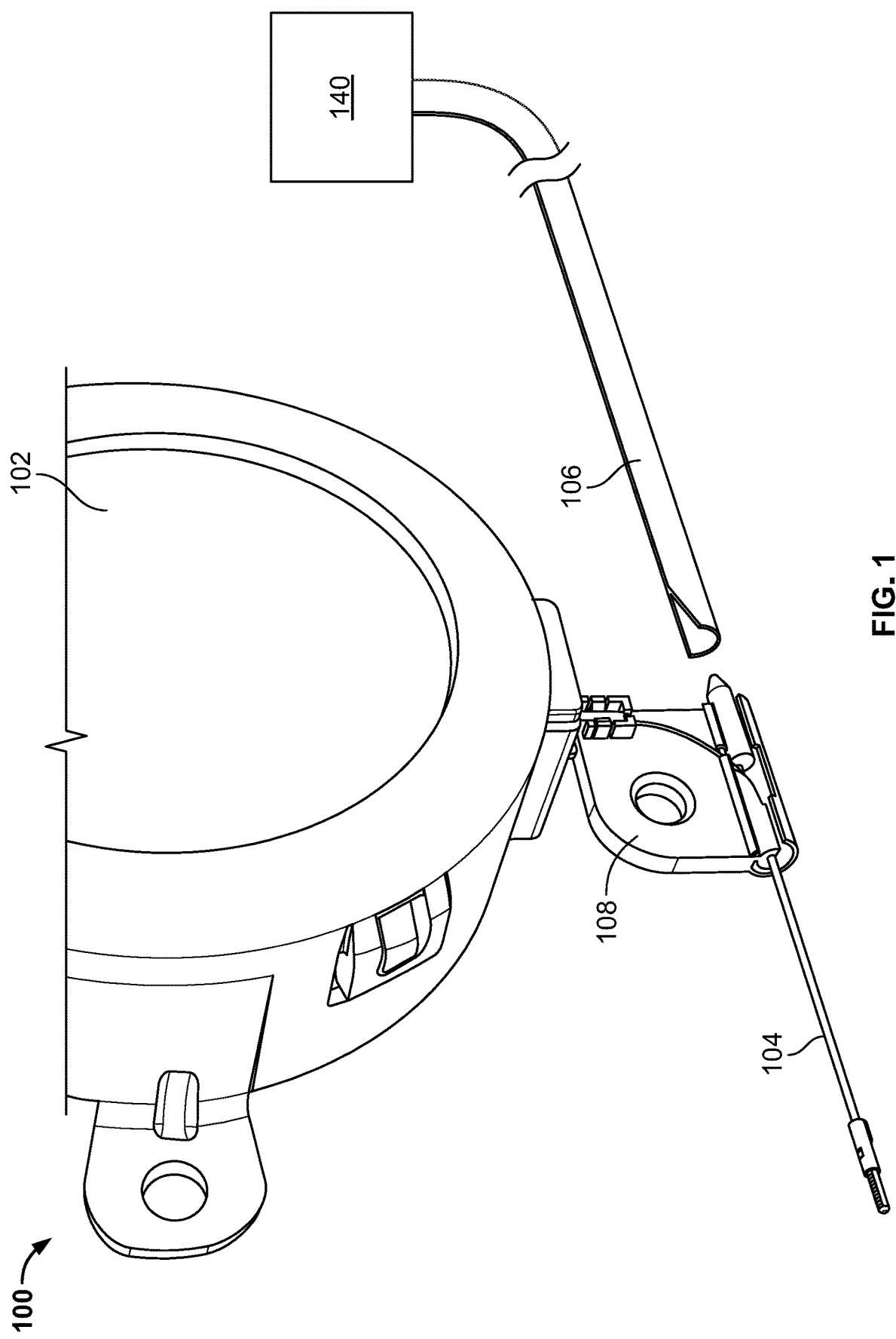
FIG. 1 schematically illustrates a system for inserting a telecommunications cable into a jacket in accordance with an exemplary embodiment of the present disclosure.

Various embodiments will be described in detail with reference to the drawings, wherein like reference numerals represent like parts and assemblies throughout the several views.

In general, the present disclosure relates to a system and method for inserting a telecommunication cable into a jacket after the jacket has been extruded. In some examples, the system includes a jacket having structures for easily inserting a cable therein over a long distance in a field location. The system can further include a tool for facilitating the insertion of the cable into the jacket. The jacket (as the flexible sleeve) can be provided as coiled on a large bulk roll for easy storage and transportation to a field location. Once carried to a field location, the jacket can be rolled out, and the cable can be inserted into the jacket or wrapped around by the jacket. In certain examples, a remaining cable that is not assembled with the jacket can be stored in a desired place, such as within a storage device or an enclosure.

In other examples, the system includes a cable dispenser and a jacket insertion device. A jacket is made of a flexible material and has a longitudinal slit through which the cable is inserted into the jacket. The jacket is configured such that the slit is flexed open as the cable is engaged with the slit, and returns to the original form once the cable is inserted into the jacket. The jacket can be stored in a spool. The jacket provides a conduit for distributing cables. The cable is pulled from the cable dispenser and engaged with the jacket insertion device. The jacket is pulled from the spool and inserted into the jacket insertion device. The cable and the jacket are simultaneously pulled through the jacket insertion device that laterally loads the cable into the jacket and presses the jacket closed. Once an appropriate length has been deployed, the jacket can be cut to length. While the various aspects of the present disclosure are useful for fiber optic cables, the aspects are also applicable to other types of telecommunications cables, such as copper cables. In other examples, a plurality of cables (e.g., fibers) can be installed within the extruded jacket in the same manner.

FIG. 1 schematically illustrates a system for inserting a telecommunications cable into a jacket in accordance with an exemplary embodiment of the present disclosure. The telecommunications cable jacket insertion system is generally designated as reference number 100. The system 100 includes a cable dispenser 102, a length of telecommunications cable 104, a length of jacket 106, and a jacket insertion device 108.

The cable dispenser 102 is configured to store a length of telecommunications cable and dispense at least a portion of the telecommunications cable. The cable dispenser 102 includes a cable outlet 112 (e.g., a payout tube 512 as described below) through which the telecommunications cable is dispensed. The cable dispenser 102 is configured in various manners. In some examples, the cable dispenser is a non-rotating dispenser. Examples of such non-rotating cable dispensers are described and illustrated with reference to FIGS. 12-41. In other examples, the cable dispenser 102 includes a reel or any rotatable device for winding a length of telecommunications cable and dispensing at least a portion of the cable.

In some examples, the telecommunications cable 104 includes a length of fiber optic cable. For example, the cable 104 can be a micro fiber optic cable. The telecommunications cable 104 can be ferrulized or connectorized with a connector 122 at a leading end of the cable. In other examples, the cable 104 can be of other types, such as copper cables.

The connector 122 (or a ferrule or subassembly thereof) is configured to have a small cross-sectional profile. One example of the connector 122 is disclosed in U.S. Pat. No. 9,182,567, titled FIBER OPTIC CONNECTOR WITH FIELD INSTALLABLE OUTER CONNECTOR HOUSING AND KEYED FERRULE HUB, issued Nov. 10, 2015, the disclosure of which is hereby incorporated by reference in its entirety. In general, the connector 122 includes a ferrule for receiving an optical fiber, a hub supporting the ferrule, a mounting block, a strain relief sleeve, and an outer connector housing. The ferrule has a front end face. The strain relief sleeve is configured to interlock with the mounting block and provide bend radius protection to the optical fiber. The outer connector housing has a front end forming a plug portion and a rear end configured to enable loading of the ferrule and the hub into the outer connector housing through the rear end. The front end of the outer connector housing provides access to the front end face of the ferrule when the ferrule and the hub have been loaded into the outer connector housing. The outer connector housing operates to interlock with the mounting block such that the mounting block is secured at the rear end of the outer connector housing and the ferrule and the ferrule hub are retained within the outer connector housing by the mounting block. The hub can be keyed with respect to the outer connector housing such that hub can be inserted into the outer connector housing in only one rotational orientation. The smaller ferrule or connector 122 at the tip of the cable 104 can improve operation of the insertion device 108.

The jacket 106 is configured to receive the cable 104 and hold, protect, and/or conceal the cable 104 therein. The jacket 106 is configured to be field-installable such that the cable and the jacket are brought separately to a field location and then the cable is inserted into the jacket as needed. Such jackets can create surface mounted pathways when existing concealed pathways cannot be obtained or created. In this document, the jacket 106 can also be referred to as an extrusion, conduit, raceway, or molding.

Figure 2:
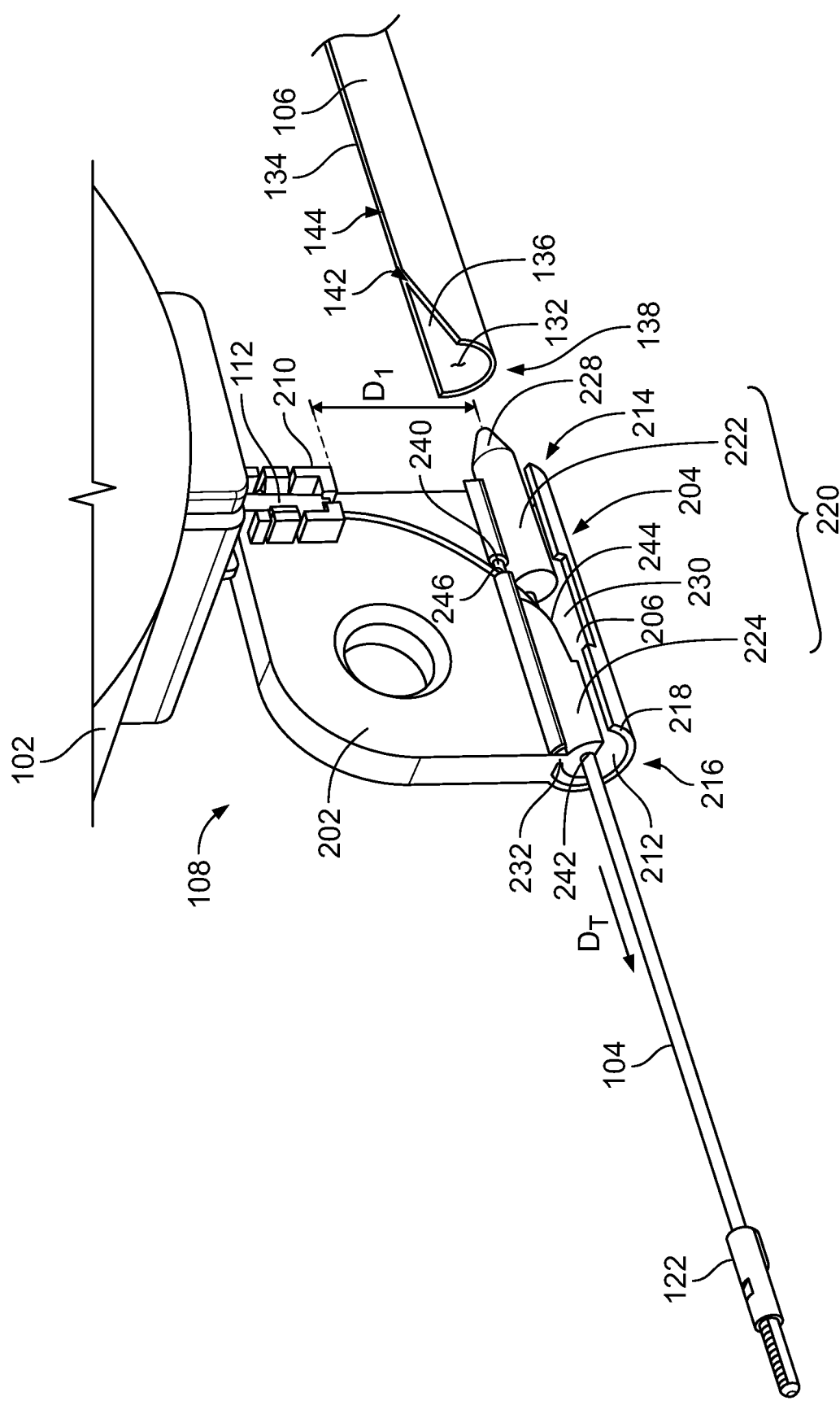
FIG. 2 schematically illustrates an example jacket insertion device of FIG. 1.

As also shown in FIG. 2, the jacket 106 is configured as a split tube to which a cable is laterally inserted. Once the cable is inserted, the jacket 106 surrounds the cable. In some examples, the jacket 106 defines an interior passage 132 along the length of the jacket 106 to receive the cable 104 therein. Further, the jacket 106 has a slit 134 that runs along the length of the jacket 106 for allowing post-extrusion insertion of the telecommunications cable 104 into the interior passage 132. The slit 134 allows the jacket 106 to be spread-apart to allow the cable 104 to be inserted within the interior passage 132 of the jacket 106. After insertion of the cable 104 into the passage 132, the slit 134 can be held closed by the inherent mechanical properties of the jacket 106, which bias the slit to a closed position. Additional structure can also be used to assist in holding the slit 134 closed after insertion of the cable 104. For example, adhesives or other bonding agents can be used to bond together the opposing portions of the jacket that define the slit 134. In other embodiments, a reinforcing sheath can be mounted over the jacket 106 after insertion of the cable 104 to prevent the slit from opening.

In some examples, the jacket 106 is manufactured from an extrudable base material such as an extrudable plastic material. Example base materials for the jacket include conventional thermoplastic polymers such as Alcryn® Melt-Processible Rubber sold by Advanced Polymer Alloys (a division of Ferro Corporation), polyethylene, polypropylene, ethylene-propylene, copolymers, polystyrene, and styrene copolymers, polyvinyl chloride, polyamide (nylon), polyesters such as polyethylene terephthalate, polyetheretherketone, polyphenylene sulfide, polyetherimide, polybutylene terephthalate, low smoke zero halogens polyolefins and polycarbonate, as well as other thermoplastic materials. Additives may also be added to the base material. Example additives include pigments, fillers, coupling agents, flame retardants, lubricants, plasticizers, ultraviolet stabilizers or other additives. The base material can also include combinations of the above materials as well as combinations of other materials.

In some examples, the jacket 106 is paid out from a spool 140 that stores the jacket 106. As described herein, the jacket 106 can be manufactured as an extrusion in a continuous length, and is wrapped about the spool 140 for storage. The continuous length of the jacket 106 is dispensed from the spool 140 at work site and can be cut to a desired custom length with or without the cable 104.

In some examples, the jacket 106 includes a cutout portion 136 at a leading end 138 of the jacket 106. As shown in FIG. 2, the cutout portion 136 is configured to widen the slit 134 in the travel direction $D_T$ so that the cable 104 is easily aligned with, and enters, the slit 134 as the jacket 106 moves in the travel direction through the jacket insertion device 108.

In some examples, the jacket 106 is used as a conduit, which can be routed to telecommunications distribution housings and/or panels. In one embodiment, the conduit is micro-conduit having a nominal internal diameter between about 3 millimeters and 10 millimeters. The telecommunications cable 104 can be pulled from either of the previously described and disclosed packaged cable dispensers 102.

The jacket insertion device 108 is guide the cable and the jacket and load the cable into the jacket as the cable and the jacket are dispensed. An example of the jacket insertion device 108 is illustrated and described in more detail with reference to FIG. 2.

FIG. 2 schematically illustrates an example of the jacket insertion device 108. The jacket insertion device 108 can include a body 202, a jacket guide 204, and a cable guide 206.

The body 202 supports the jacket guide 204 and the cable guide 206, and is configured to arrange the jacket guide 204 and the cable guide 206 in place with respect to the cable dispenser 102. In some examples, the body 202 includes a mounting device 210 configured to fit the cable outlet 112 of the cable dispenser 102. In the illustrated example, the body 202 is generally shaped as a plate and mounted to the cable outlet 112 through the mounting device 210 such that the body 202 lies in a plane in parallel with the cable outlet 112. Other configurations of the body 202 are also possible.

The jacket guide 204 is configured to guide the jacket 106 in a travel direction $D_T$. The travel direction $D_T$ can be generally transverse to the direction in which the cable outlet 112 extends (i.e., the direction in which a telecommunications cable 104 is dispensed). In the illustrated example, the travel direction $D_T$ is generally at a right angle to the direction in which the cable outlet 112 extends. In other examples, the travel direction $D_T$ can be generally in parallel with the cable outlet 112. The jacket guide 204 is arranged at a distance D1 from the end of the cable outlet 112. The distance D1 can be determined based on various factors, such as a minimum bend radius of the communications cable (e.g., a fiber optic cable) being dispensed through the cable outlet 112.

The jacket guide 204 includes a jacket feeder channel 212 extending from a first end 214 to a second end 216 of the jacket guide 204. In some examples, the jacket feeder channel 212 is defined by a hollow cylindrical wall 218 extending in the travel direction $D_T$ between the first end 214 and the second end 216. Other configurations are also possible in other examples. The jacket feeder channel 212 is configured to receive the leading end 138 of the jacket 106 at the first end 214. As described below, once the leading end 138 of the jacket 106 is engaged with the jacket feeder channel 212 at the first end 214, the jacket 106 can be pushed toward the second end 216 of the jacket feeder channel 212 in the travel direction $D_T$ until the leading end 138 of the jacket 106 exits the second end 216. The leading end 138 of the jacket 106 extending out from the second end 216 can be pulled out at the second end 216 in the travel direction $D_T$ together with the communications cable 104 while the cable 104 is contained within the interior passage 132 of the jacket 106.

Although it is illustrated that the jacket feeder channel 212 extends generally along a straight line or axis (i.e., the travel direction $D_T$ is generally straight), it is also possible that the jacket feeder channel 212 is at least partially curved (i.e., the travel direction $D_T$ can be at least partially curved).

In some examples, the jacket guide 204 includes a jacket alignment device 220 configured to be inserted into the interior passage 132 of the jacket 106 as the jacket 106 passes through the jacket feeder channel 212 in the travel direction $D_T$. As illustrated, the jacket guide 204 can be at least partially disposed within the jacket feeder channel 212.

In some examples, the jacket alignment device 220 includes a first jacket alignment element 222 and a second jacket alignment element 224. The first jacket alignment element 222 is arranged at or adjacent the first end 214 of the jacket guide 204, and the second jacket alignment element 224 is arranged at or adjacent the second end 216. As described below, the first jacket alignment element 222 and the second jacket alignment element 224 are arranged at least partially within the jacket feeder channel 212 such that the communications cable 104, which is routed through a cable inlet 240 of the cable guide 206, passes between the first jacket alignment element 222 and the second jacket alignment element 224 within the jacket feeder channel 212.

The first jacket alignment element 222 is configured to engage the interior passage 132 of the jacket 106 at the leading end 138 of the jacket 106. In the illustrated example, the first jacket alignment element 222 is configured as a cylindrical block extending along the travel direction $D_T$, which generally conforms to the interior passage 132 of the jacket 106. The first jacket alignment element 222 can include a cone portion 228 that faces the leading end 138 of the jacket 106 that is pushed in the travel direction $D_T$. The cone portion 228 is shaped to be easily inserted into the interior passage 132 of the jacket 106 as the jacket 106 is inserted into the jacket feeder channel 212 at the first end 214 of the jacket guide 204.

The second jacket alignment element 224 is configured to engage the interior passage 132 of the jacket 106 as the jacket 106 is pulled out from the second end 216 of the jacket feeder channel 212. As illustrated, the second jacket alignment element 224 is generally aligned with the first jacket alignment element 222 along the travel direction $D_T$. As described below, the second jacket alignment element 224 is configured to contribute to the configurations of the cable guide 206.

In some examples, the jacket guide 204 includes a window 230 for permitting a portion of the cable 104 to be laterally engaged into the jacket feeder channel 212. In the illustrated example, the window 230 is longitudinally formed to expose at least a portion of the jacket feeder channel 212. For example, the window 230 is configured to expose the second jacket alignment element 224 therethrough so that the cable 104 is laterally engaged with the cable guide 206 associated with the second jacket alignment element 224 as described below. The window 230 is further configured to open a cable inlet 240 of the cable guide 206 together with the second jacket alignment element 224 so that the cable inlet 240 and the second jacket alignment element 224 are simultaneously accessible through the window 230.

In some examples, the jacket guide 204 further includes a slit guide device 232 configured to align the slit 134 of the jacket 106 with the cable 104 routed into the jacket feeder channel 212. In some examples, the slit guide device 232 can also open the slit 134 so that the cable 104 is easily inserted therethrough. The slit guide device 232 can be configured to connect the wall 218 with the first jacket alignment element 222 and/or the second jacket alignment element 224. In some examples, the slit guide device 232 is aligned with the cable inlet 240 along the travel direction $D_T$ (or along a direction parallel with the travel direction $D_T$). In some examples, the slit guide device 232 can be continuously formed between the wall 218 and the first and second jacket alignment elements 222 and 224. In other examples, the slit guide device 232 have discrete portions that at least partially connect the wall 218 to the first jacket alignment element 222, and/or discrete portions that at least partially connect the wall 218 to the second jacket alignment element 224.

Referring still to FIG. 2, the cable guide 206 operates to guide at least a portion of the length of telecommunications cable 104 to pass at least a portion of the jacket feeder channel 212 and extend out from the second end 216 of the jacket feeder channel 212. The cable guide 206 is configured to route the communications cable 104 from the cable outlet 112 of the cable dispenser 102 into the jacket feeder channel 212 such that the communications cable 104 runs across the layer of the jacket 106 as the jacket 106 passes through the jacket feeder channel 212. In some examples, the cable guide 206 is configured to align the telecommunications cable 104 with the slit 134 of the jacket 106 passing through the jacket feeder channel 212. Accordingly, the cable guide 206 guides the communications cable 104 to be laterally inserted into the interior passage 132 of the jacket 106 through the slit 134 thereof.

As described below, when both of the leading end of the communications cable 104 and the leading end 138 of the jacket 106 project out from the second end 216 of the jacket feeder channel 212, the telecommunications cable 104 and the jacket 106 can be pulled out together from the jacket guide 204 in the travel direction $D_T$. As the cable 104 and the jacket 106 are pulled out, the telecommunications cable 104 continues to be dispensed from the cable dispenser 102 and the dispensed cable 104 is inserted into the interior passage 132 of the jacket 106, which is being supplied through the jacket guide 204, through the slit 134 of the jacket 106.

The cable guide 206 includes a cable inlet 240 through which the cable 104 that has been dispensed from the cable outlet 112 of the cable dispenser 102 is routed into the jacket feeder channel 212. In some examples, the cable inlet 240 is arranged between the first end 214 and the second end 216 of the jacket guide 204. In other examples, the cable inlet 240 is disposed such that the telecommunications cable 104 passes between the first and second jacket alignment elements 222 and 224 within the jacket feeder channel 212.

In some examples, the cable inlet 240 is arranged to be aligned with the slit 134 of the jacket 106 when the jacket 106 passes through the jacket feeder channel 212.

The cable inlet 240 is open on the same side of the window 230 of the jacket guide 204, so that the cable can be laterally inserted into the jacket feeder channel 212 through the window 230 and the cable inlet 240 simultaneously.

The cable guide 206 can further include a cable guide groove 242 configured to guide the telecommunications cable 104 within the jacket feeder channel 212 as the telecommunications cable 104 is pulled out from the second end 216 of the jacket feeder channel 212. In some examples, the cable guide groove 242 is provided in the second jacket alignment element 224. In the illustrated example, the second jacket alignment element 224 is shaped as a longitudinal cylindrical segment that extends along the travel direction $D_T$, and the cable guide groove 242 is formed on a flat surface (i.e., a surface facing downwards in FIG. 2) of the second jacket alignment element 224. In some examples, at least a portion of the cable guide groove 242 is aligned with a center of the jacket feeder channel 212 and extends along the travel direction $D_T$ so that the cable 104 is positioned at the center of the jacket feeder channel 212.

The cable guide 206 can further include a curved portion 244 adjacent the cable inlet 240. The curved portion 244 is provided in, or formed as part of, the second jacket alignment element 224. The curved portion 244 is configured to maintain the communications cable 104 at a predetermined curvature and lead the communications cable 104 toward the second end 216 of the jacket feeder channel 212. In some examples, the curvature is determined In some examples, the cable inlet 240 has an edge 246 that the cable 104 contacts as the cable 104 is pulled through the jacket feeder channel 212. The edge 246 can have a slanted surface that generally corresponds to the curvature of the curved portion 244 so that the cable 104 is smoothly conveyed along the cable inlet 240 and the curved portion 244.

As such, the cable inlet 240 and/or the curved portion 244 can define a sufficient curve to maintain a minimum bend radius of the cable 104 as the cable 104 are being paid out and fed into the jacket feeder channel 212.

In some examples, the cable guide groove 242 is also formed on the curved portion 244 of the second jacket alignment element 224 and extends toward the second end 216 of the jacket feeder channel 212.

Figure 3:
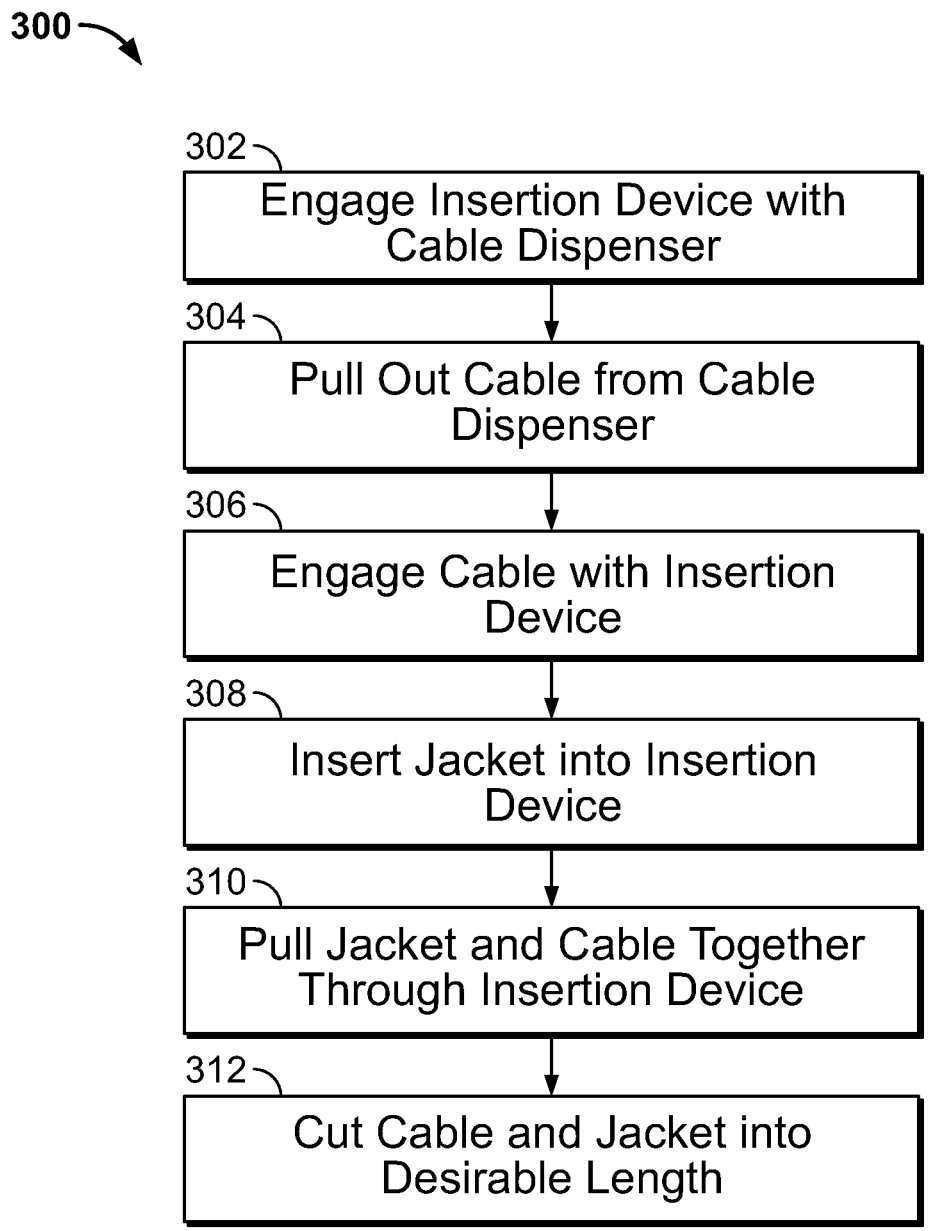
FIG. 3 is a flowchart illustrating an example method for inserting a telecommunications cable into a jacket using the system of FIG. 1.

Referring to FIGS. 3-9, an example method of inserting a telecommunications cable into a jacket. In particular, FIG. 3 is a flowchart illustrating an example method 300 for inserting the telecommunications cable 104 into the jacket 106 using the system 100 as described above. FIGS. 4-9 illustrate various steps of the method 300 of FIG. 3.

As shown in FIG. 3, the method 300 can begins with operation 302 in which the jacket insertion device 108 is engaged with the cable dispenser 102. In some examples, as illustrated in FIG. 2, the jacket insertion device 108 is assembled with the cable dispenser 102 by fitting the cable outlet 112 into the mounting device 210. Other coupling methods can be used in the other examples. In yet other examples, the jacket insertion device 108 is not connected or coupled with the cable dispenser 102, and merely disposed at a predetermined location apart from the cable dispenser 102.

At operation 304, a portion of the cable 104 is pulled out from the cable dispenser 102 through the cable outlet 112. When the cable 104 is dispensed, the cable 104 is terminated with a ferrule or connector 122. In other examples, the ferrule or connector 122 is provided to the cable 104 before the cable 104 is pulled out from the cable dispenser 102.

Figure 4:
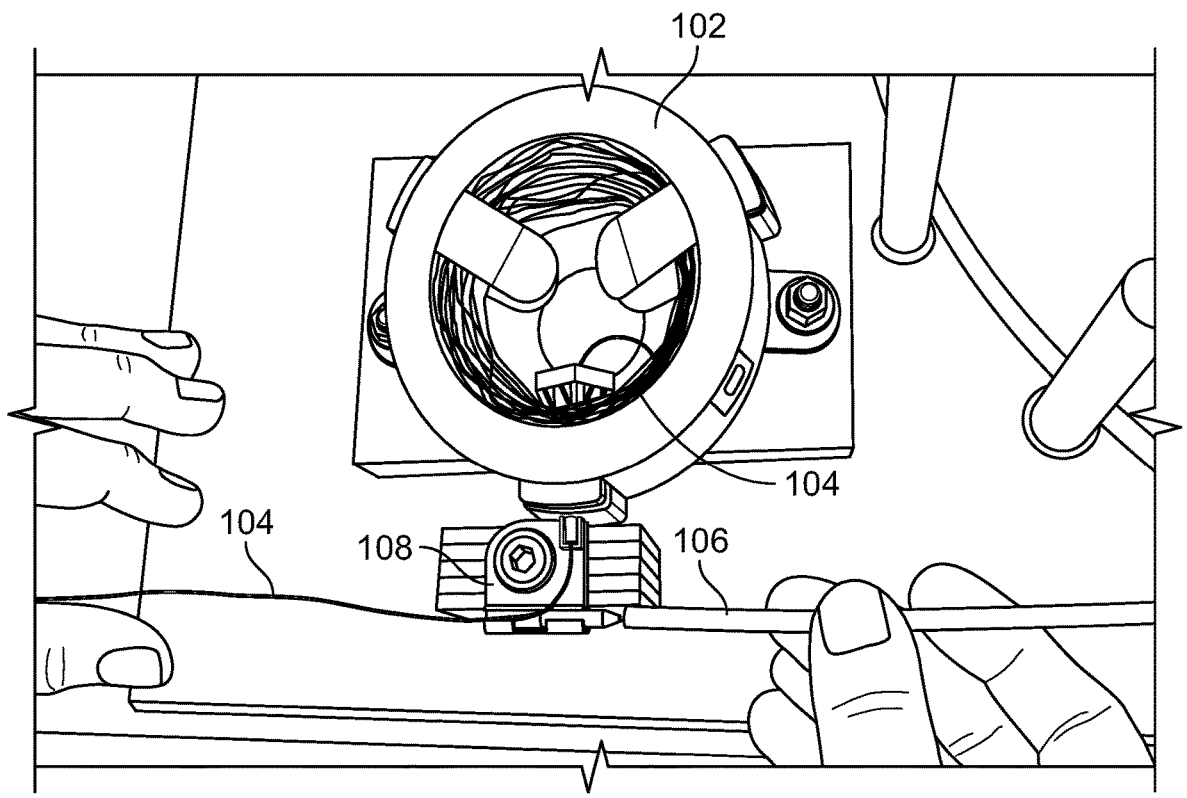
FIG. 4 illustrates an example step of the method of FIG. 3.

At operation 306, the portion the cable 104, which is pulled out from the cable dispenser 102, is engaged with the jacket insertion device 108. An example of this operation is illustrated in FIG. 4. In some examples, the portion of the cable 104 that is dispensed from the cable dispenser 102 is laterally inserted into the jacket feeder channel 212 through the window 230, so that the leading edge (e.g., the ferrule or connector 122) of the cable 104 is projected from the jacket insertion device 108.

Figure 5:
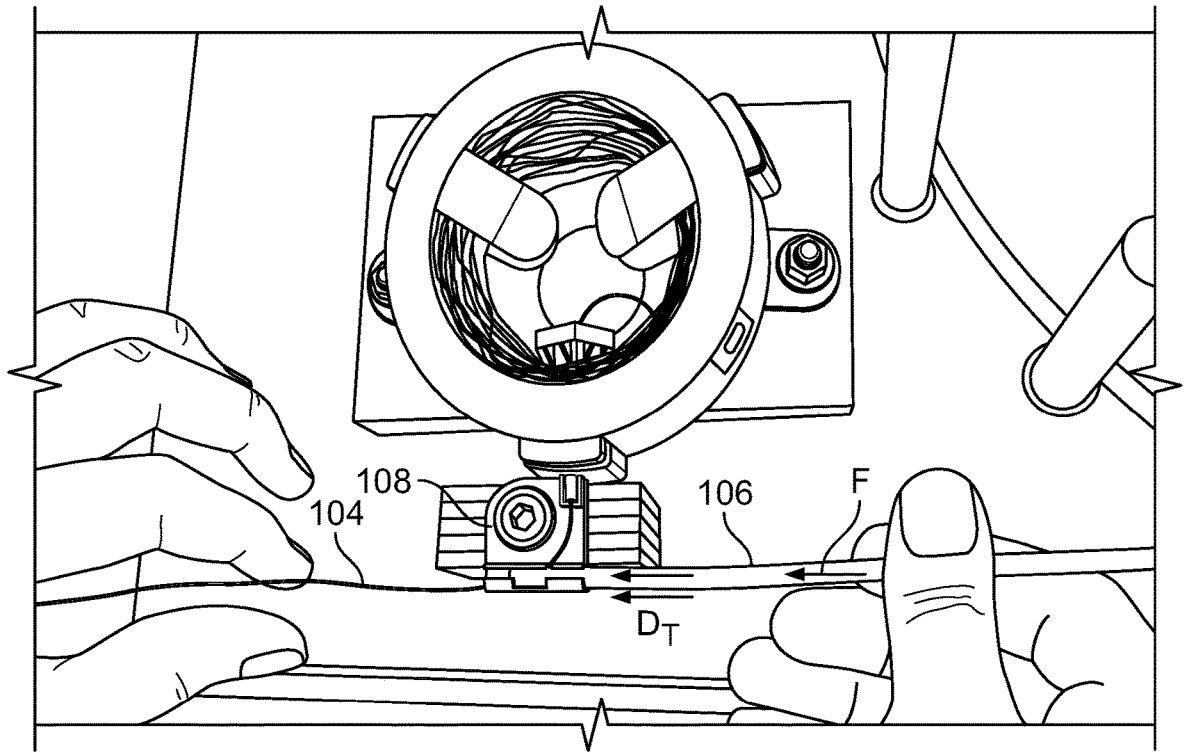
FIG. 5 illustrates an example step of the method of FIG. 3.
Figure 6:
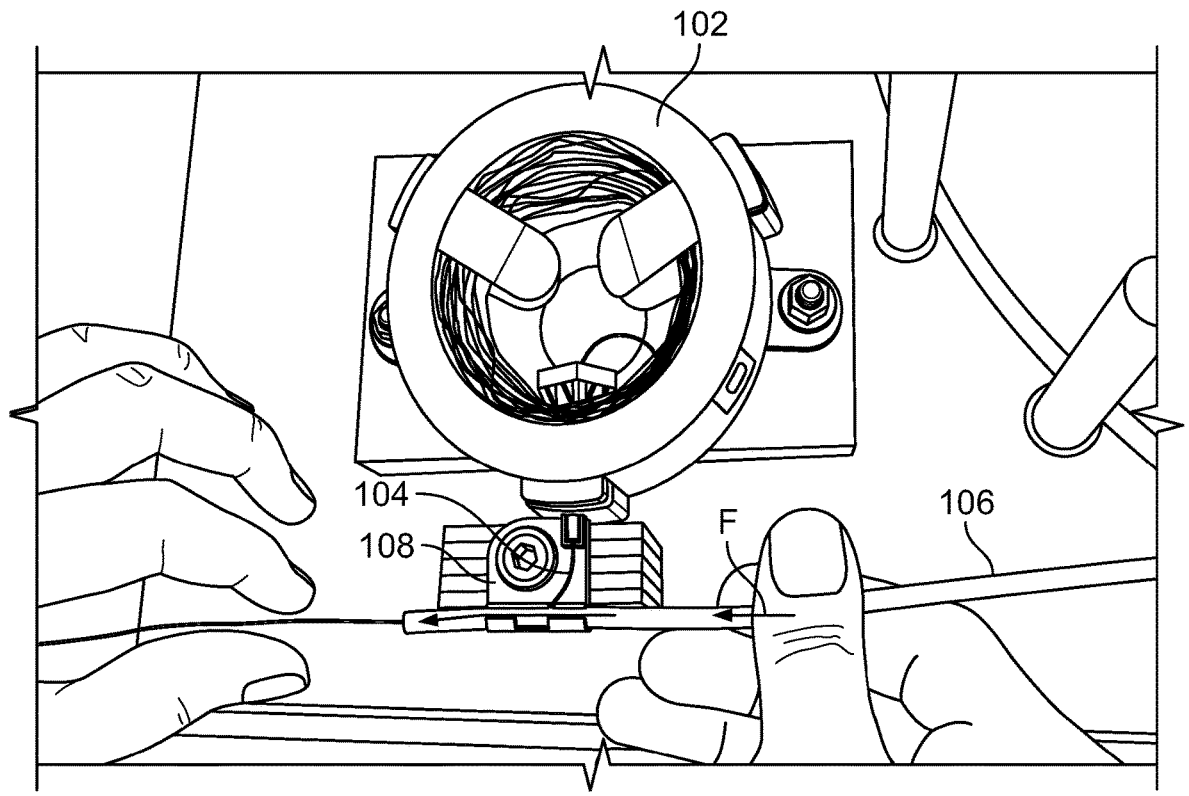
FIG. 6 illustrates an example step of the method of FIG. 3.

At operation 308, a portion of the jacket 106 is inserted into the jacket insertion device 108. An example of this operation 308 is illustrated in FIGS. 5 and 6. In some examples, as shown in FIG. 5, the leading end 138 of the jacket 106 is inserted into the jacket feeder channel 212 at the first end 214 of the jacket insertion device 108. The jacket 106 can be inserted by hand (in FIG. 5) or using a tool. As the jacket 106 passes through the jacket feeder channel 212, the cable 104, which has been routed through the cable inlet 240 and at least a portion of the jacket feeder channel 212, remains stationary, and the leading end 128 of the jacket 106 comes close to the cable 104 within the jacket feeder channel 212. As described above, the jacket 106 is arranged such that the slit 134 of the jacket 106 is aligned with the cable 104, using such as the slit guide device 232. As shown in FIG. 6, the jacket 106 is further pushed in the travel direction $D_T$ (by exertion of force F) so that the cable passage 132 of the jacket 106 receives the cable 104 therewithin. As described above, while the cable 104 is stationary, the jacket 106 is moved in the travel direction $D_T$ such that a portion of the cable 104 at or adjacent the cable inlet 240 is engaged with the slit 134 and a portion of the cable placed within the jacket feeder channel 212 is received within the cable passage 132 of the jacket 106. The jacket 106 is pushed until the leading end 138 is projected from the second end 216 of the jacket insertion device 108.

Alternatively, the jacket 106 can be inserted into the jacket insertion device 108 laterally through the window 230. For example, a portion of the jacket 106 is inserted through the window 230 so as to wrap around the first jacket alignment element 222 and/or the second jacket alignment element 224. As the jacket 106 is inserted laterally through the window 230, longitudinal lips 142 and 144 of the jacket 106 that face each other at the slit 134 flex apart and proceed into the jacket feed channel 212 around the first jacket alignment element 222 and/or the second jacket alignment element 224 in the opposite circular directions so that the jacket 106 wraps around the first jacket alignment element 222 and/or the second jacket alignment element 224 when the jacket 106 is fully inserted into the jacket insertion device 108.

Figure 7:
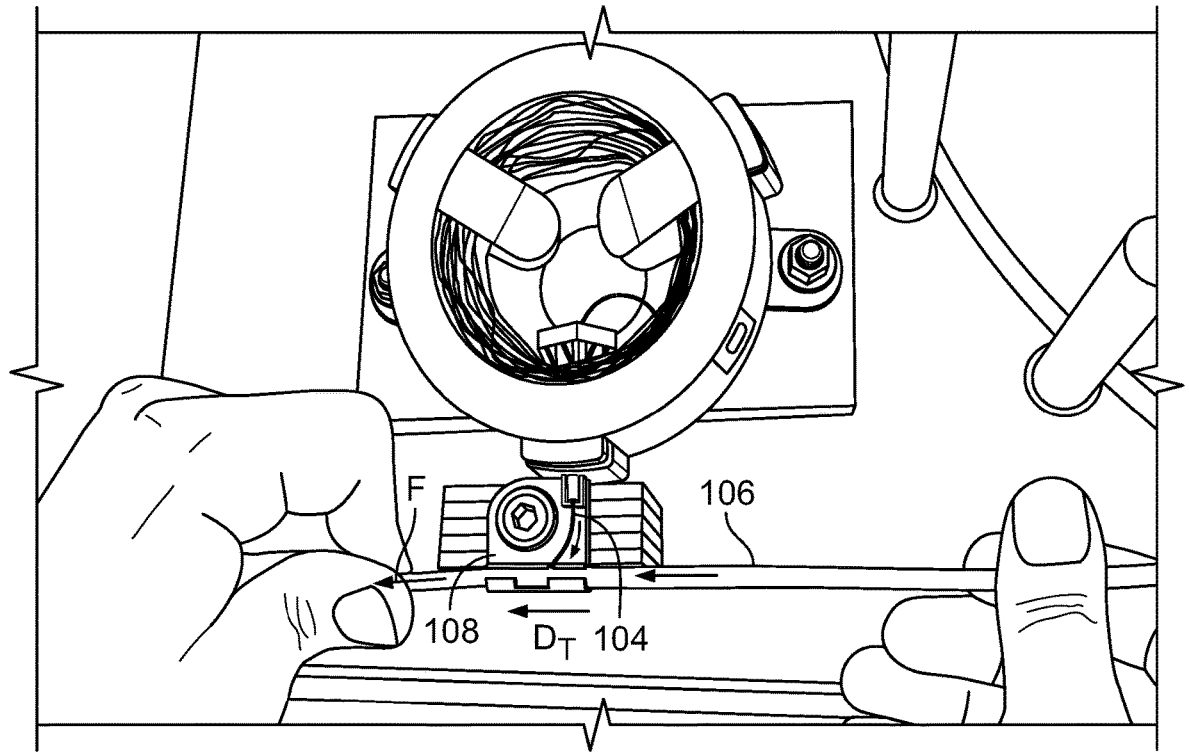
FIG. 7 illustrates an example step of the method of FIG. 3.
Figure 8:
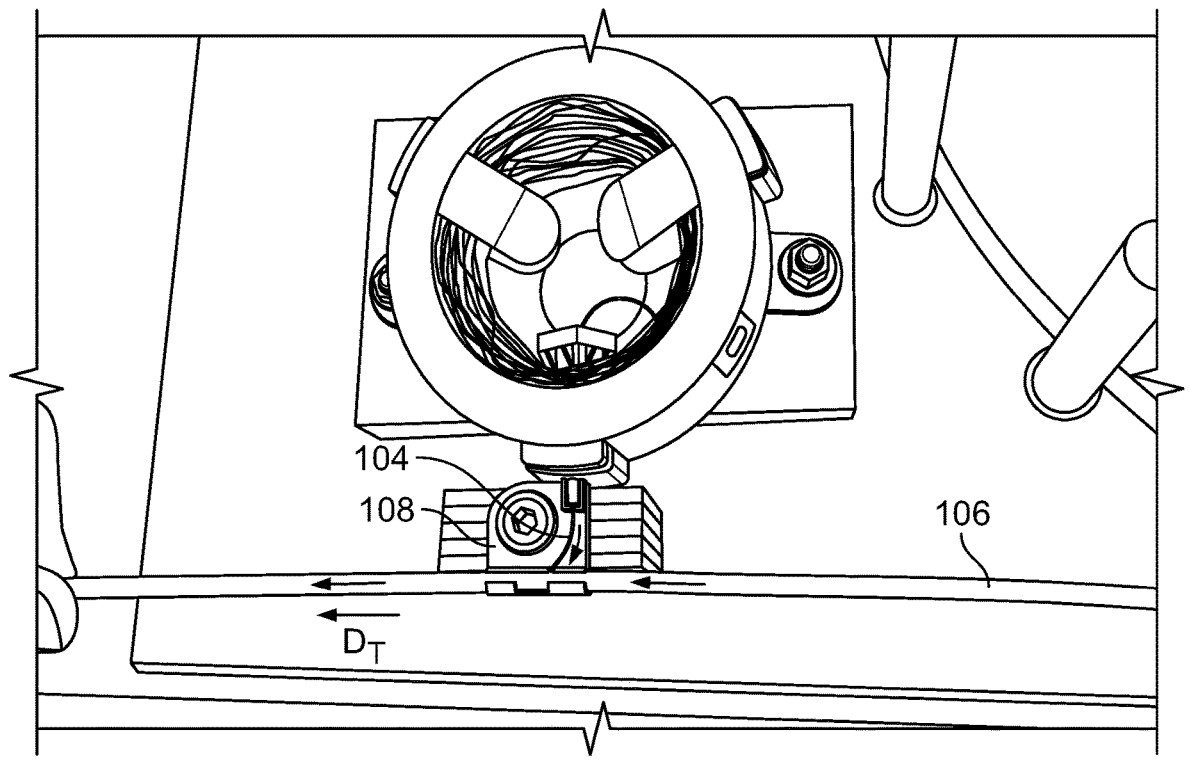
FIG. 8 illustrates an example step of the method of FIG. 3.

At operation 310, the cable 104 and the jacket 106 are pulled together away from the jacket insertion device 108. An example of this operation is illustrated in FIGS. 7 and 8. As the cable 104 and the jacket 106 are pulled in the travel direction $D_T$, the cable 104 and the jacket 106 are continuously supplied into the jacket insertion device 108, and the cable 104 is inserted into the cable passage 132 of the jacket 106 through the slit 134 within the jacket feeder channel 212 of the jacket insertion device 108. As described above, the jacket feeder channel 212 is configured loads the cable 104 into the jacket 106 through the slit 134 and enables the jacket 106 to be closed at the slit 134.

Alternatively, in some embodiments, the jacket 106 is pre-installed along a desired path, and the non-rotating cable dispenser 120 and the jacket insertion device 108 can be moved along the pre-installed jacket 106 to plow the cable 104 into the jacket 106.

Figure 9:
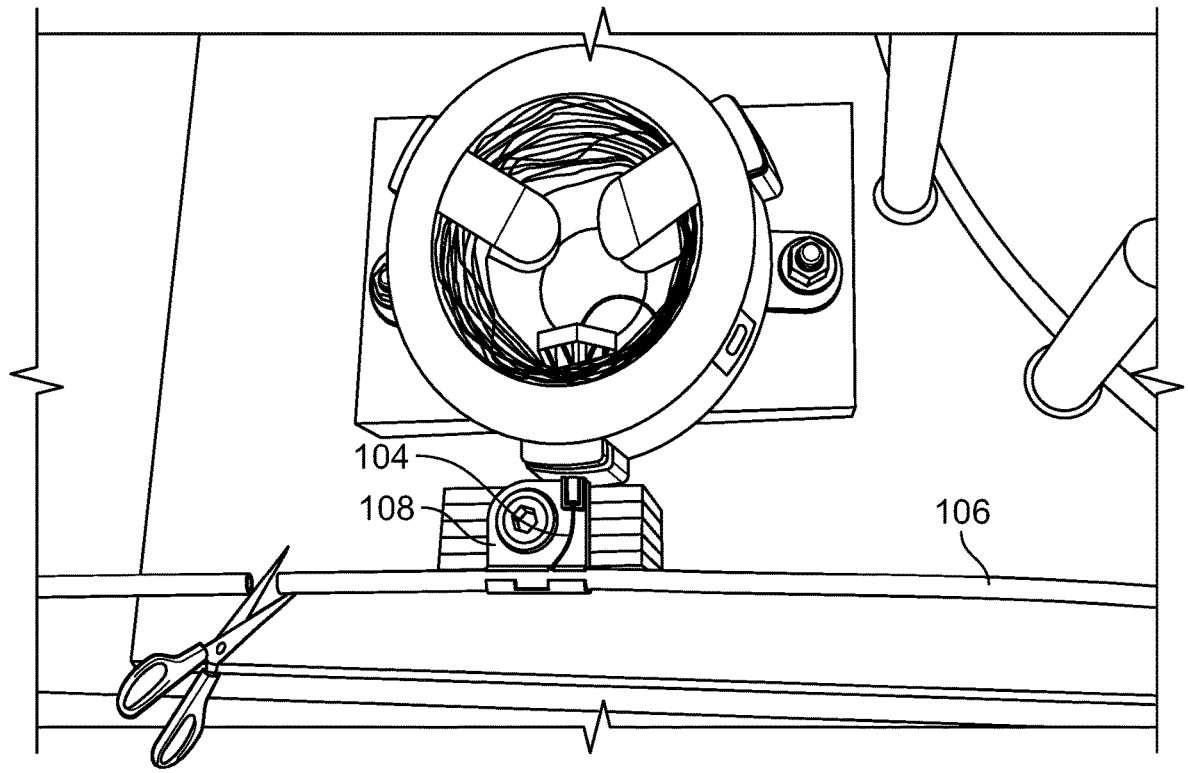
FIG. 9 illustrates an example step of the method of FIG. 3.

At operation 312, the cable 104 and the jacket 106 can be cut to an appropriate length once such a length is deployed through the jacket feeder channel 212. An example of this operation is illustrated in FIG. 9.

Alternatively, in some embodiments, the jacket 106 and the cable 104 are removed together laterally from the jacket insertion device 108 through the window 230. The cable 104 and the jacket 106 can be laterally removed through the window 230 with or without cutting the jacket and the cable to a length beforehand. For example, as the jacket 106 with the cable 104 is removed laterally through the window 230, the longitudinal lips 142 and 144 of the jacket 106 flex apart and are pulled out from the jacket feed channel 212 around the first jacket alignment element 222 and/or the second jacket alignment element 224 in the opposite circular directions. As such, the jacket 106 with the cable 104 can be removed from the jacket insertion device 108 without cutting the jacket 106 and the cable 104 beforehand.

Figure 10:
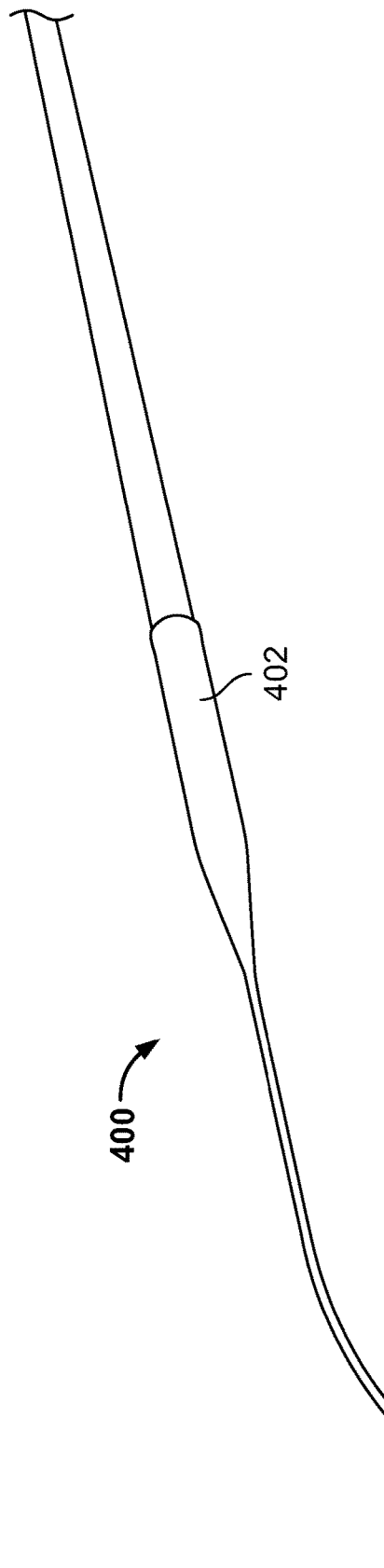
FIG. 10 illustrates an example cable cover.
Figure 11:
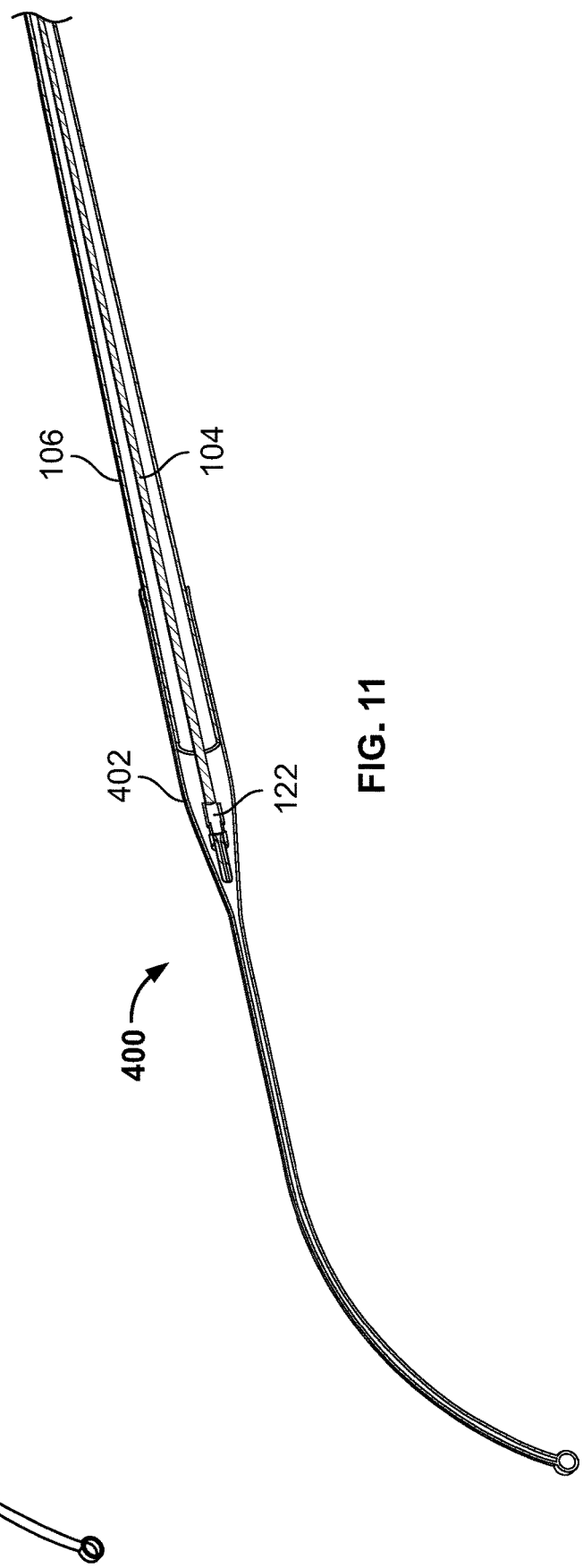
FIG. 11 is a cross sectional view of the cable cover of FIG. 10.

Referring to FIGS. 10 and 11, a cable cover 400 is provided to cover the connector 122 (i.e., the leading end of the cable 104) along with the jacket 106. In some examples, the cable cover 400 includes a pulling eye 402 configured to encase the end of the cable 104 inserted into the jacket 106.

In the illustration of FIGS. 4-11, the cable dispenser and the insertion device is mounted at a fixed location, and the jacket is pulled or moved relative to the cable dispenser and the insertion device, so that the cable is pulled from the dispenser and loaded into the jacket as the jacket moves past the cable dispenser and the insertion device. However, in an alternative example, the jacket or conduit can be pre-installed along a desired path within a building or any installation location, such as multi-dwelling units (MDUs). Then, the set of the cable dispenser and the insertion device can be moved, either manually or by another tool, along the pre-installed jacket to plow the cable stored in the dispenser into the conduit.

Referring to FIGS. 12-41, the cable dispenser 102 are described in more detail. As described herein, examples of the cable dispenser 102 are disclosed in U.S. Patent Application Publication No. 2016/0207723, titled Coreless Wound Coil Dispenser with Optional Cable Storage for an Optical Terminal Network, filed Dec. 18, 2015, the entirety of which is hereby incorporated by reference.

Figure 12:
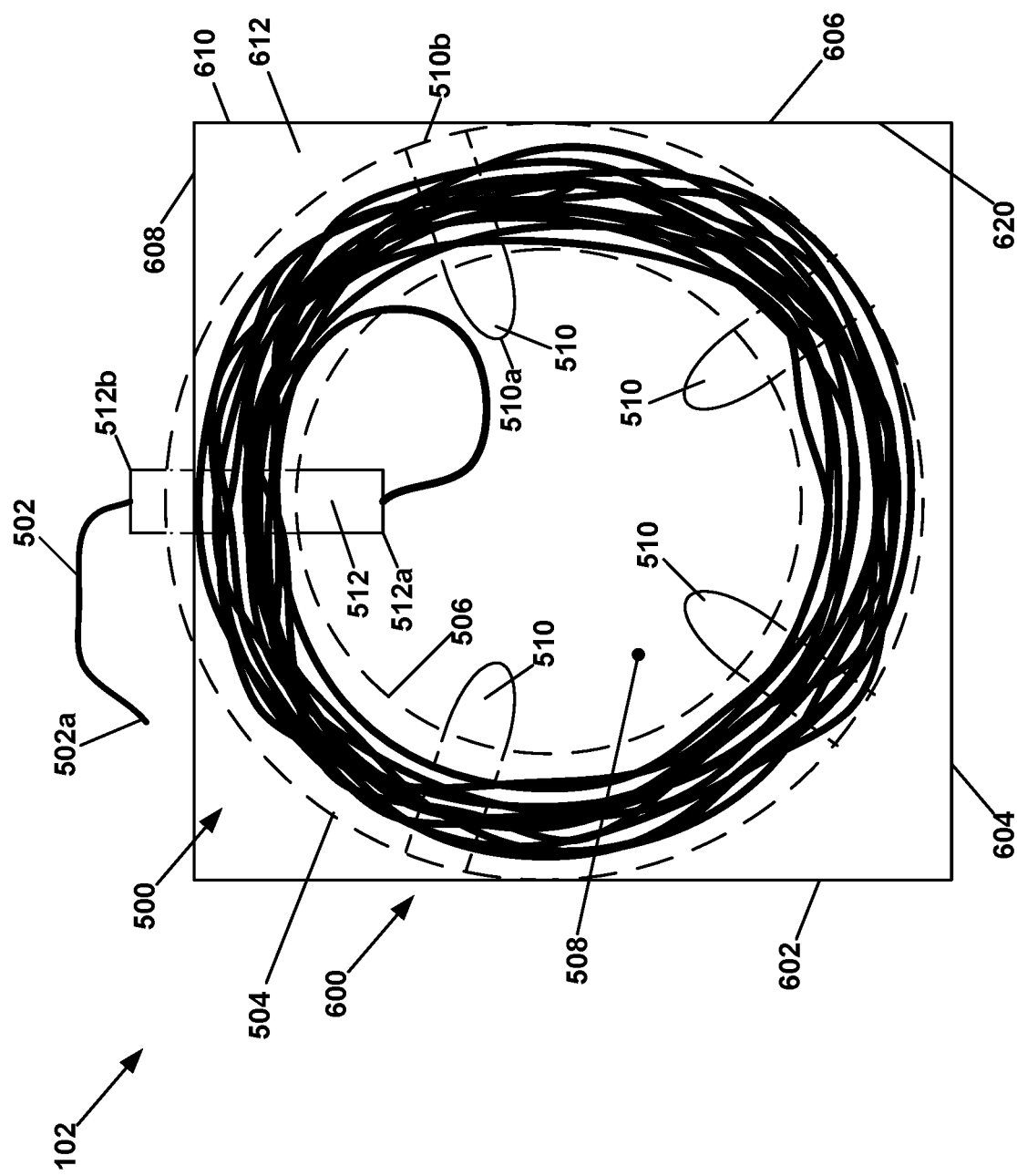
FIG. 12 is a schematic top view of a first embodiment of a packaged cable dispenser including a coreless wound coil disposed in a package having exemplary features of aspects in accordance with the principles of the present disclosure.
Figure 13:
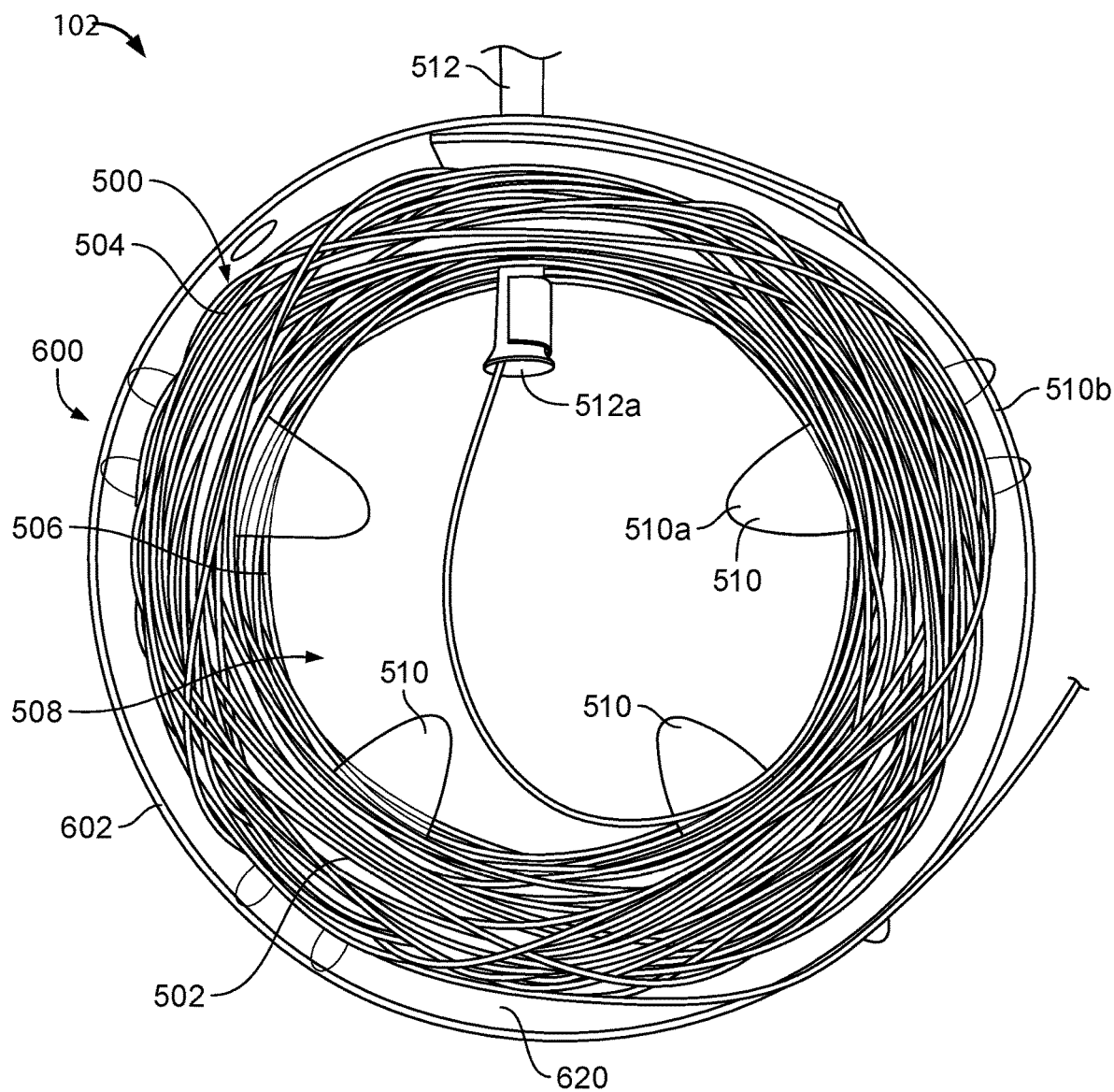
FIG. 13 is a perspective view of a packaged cable dispenser similar to that shown in FIG. 12, but with a round package.
Figure 14:
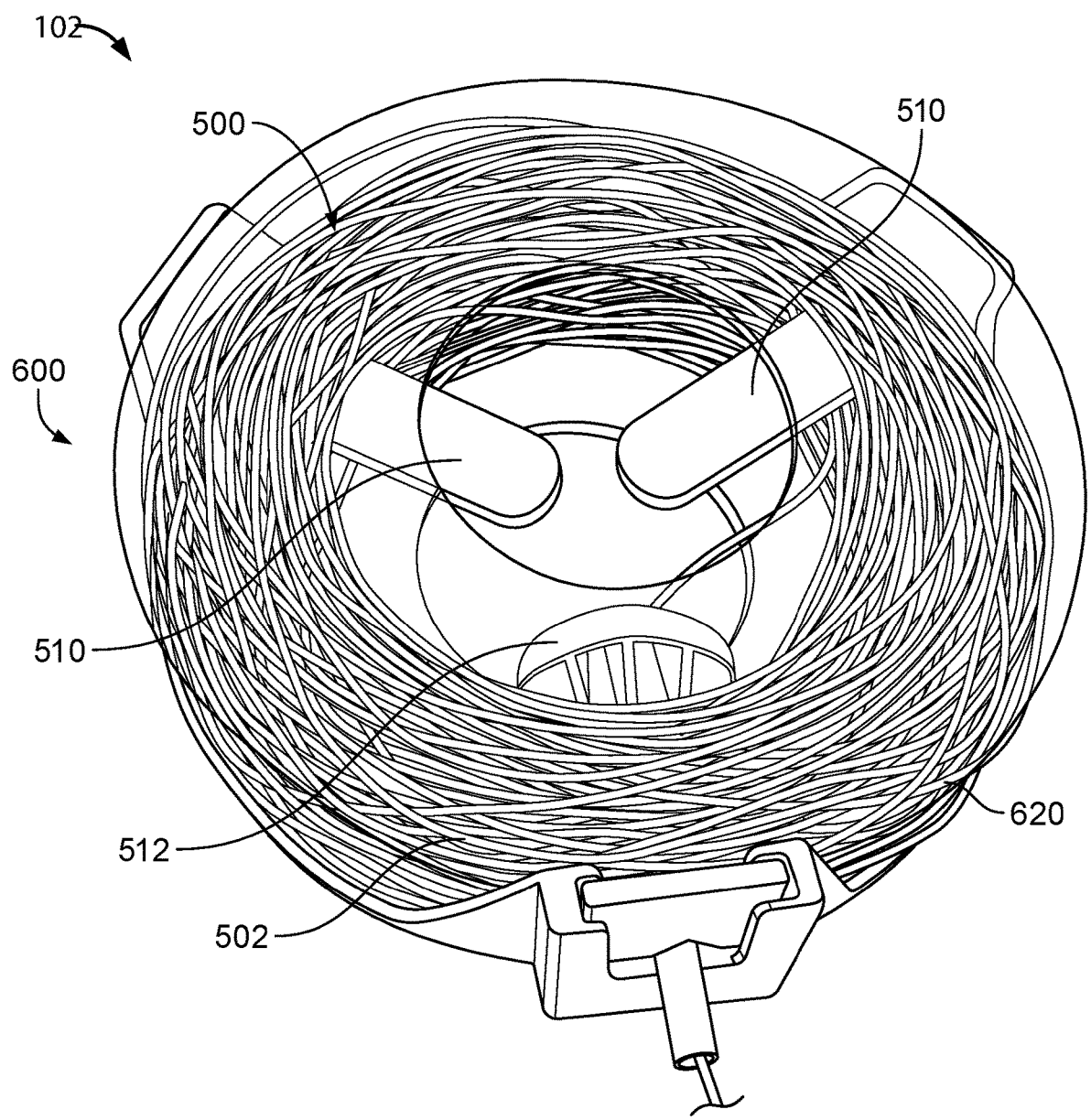
FIG. 14 is a perspective view of a packaged cable dispenser similar to that shown in FIG. 12, but with fewer winding separators.

Referring to FIG. 12, an example of the packaged cable dispenser 102 is disclosed. FIG. 13 also shows a generally similar packaged cable dispenser 102, but with a different packaging. As shown, the dispenser 102 can have a coreless wound coil 500 disposed in a package 600. In one aspect, the coreless wound coil 500 includes a length of telecommunications cable 502 wound to define an exterior winding surface 504 and an interior winding surface 506 which further defines a hollow interior 508. In some examples, the telecommunications cable 104 is configured as, or includes, the telecommunications cable 502. In one example, the wound coil 500 has an outside diameter equal to or less than about 5 inches, and preferably about 3 inches to about 3½ inches. In one example, the telecommunications cable 502 is a fiber optic cable. Because the disclosed teachings provide for the formation of a wound coil of fiber optic material that is coreless, the total length of cable 502 that can be wound into a single coil can be greater than what is obtainable for fiber optic cables wound about a core structure. This is due to the circumstances that cumulative hoop stresses exerted by the cable itself on more interior wound loops near the core structure limit the total length of the cable. As such forces are essentially entirely absent in a coreless wound coil, once removed from the mandrel about which it is formed, the disclosed teachings represent a significant improvement.

In one example, the cable 502 has a factory ferrulized end, such as is described in Patent Cooperation Treaty (PCT) patent application publication WO 2014/085459, the entirety of which is hereby incorporated by reference. In such a case, optical connectors can be later mounted to the ferrulized end of the cable 502, as explained in the WO '459 publication and as explained in United States patent application publication US 2014/0153878 A1, the entirety of which is hereby incorporated by reference. One or both ends of the cable 502 can also be connectorized as explained in U.S. Pat. No. 8,439,577, the entirety of which is hereby incorporated by reference. It is also noted that since the non-pulled end of the cable 502 can be pre-connectorized within the package 600, as the wound coil 500 does not rotate within the package 600 during dispensation.

In one example, the telecommunications cable 502 has a nominal diameter of less than 3 milimeters (mm), a diameter of less than 6 mm, and/or a diameter of less than 5 mm. In one example, the cable 502 has a nominal diameter from about 800 to about 900 microns and includes a plurality of individual optical fibers of about 650 microns. In one example, the telecommunications cable 502 has a pull rating sufficient to allow the cable 502 to be pulled through a conduit without damaging the fibers, for example a pull rating of about 300 Newtons. In one example, the telecommunications cable 502 is provided with sufficient stiffness to allow the cable 502 to be pushed through a conduit, for example the cable 502 can be provided with stiffening aramid fibers or steel wire.

In another aspect, the package 600 can include interconnected sidewalls 602, 604, 606, 608 extending between a top side 610 and a bottom side 612. The sidewalls 602, 604, 606, 608 can define an interior perimeter 620. As shown, the exterior winding surface 504 of the wound coil 500 is within the interior perimeter 620 of the package 600. The package 600 may be formed from a variety of materials, such as plastic or a paper product. The package 600 may be provided with a closable opening for inserting the wound coil 500 within the package 600. Referring to FIG. 13, the dispenser 102 is provided with a circular sidewall 602, in contrast to the square packaging shown in FIG. 12.

In the exemplary embodiment shown, the wound coil 500 further includes a plurality of winding separators 510, 512 embedded within the wound coil 500. The winding separators 510, 512 function to create and maintain the winding pattern of the wound coil 500 by preventing migration of the cable 502 across the width of the wound coil 500. In one example, the winding separators 510, 512 are provided with a curved or rounded profile to reduce friction between the cable 502 and the separators 510, 512 as the cable 502 is being unwound from the interior winding surface 506. As shown, each of the winding separators 510, 512 extends completely through the wound coil 500. To achieve this function, the winding separators 510, 512 can be provided with a respective first end 510*a*, 512*a* extending at least to the interior winding surface 506 and a second end 510*b*, 512*b* extending at least to the exterior winding surface 504. Each of the winding separators 510, 512 may also be provided with a respective first side 510*c*, 512*c* and a respective opposite second side 510*d*, 512*d*.

Figure 15:
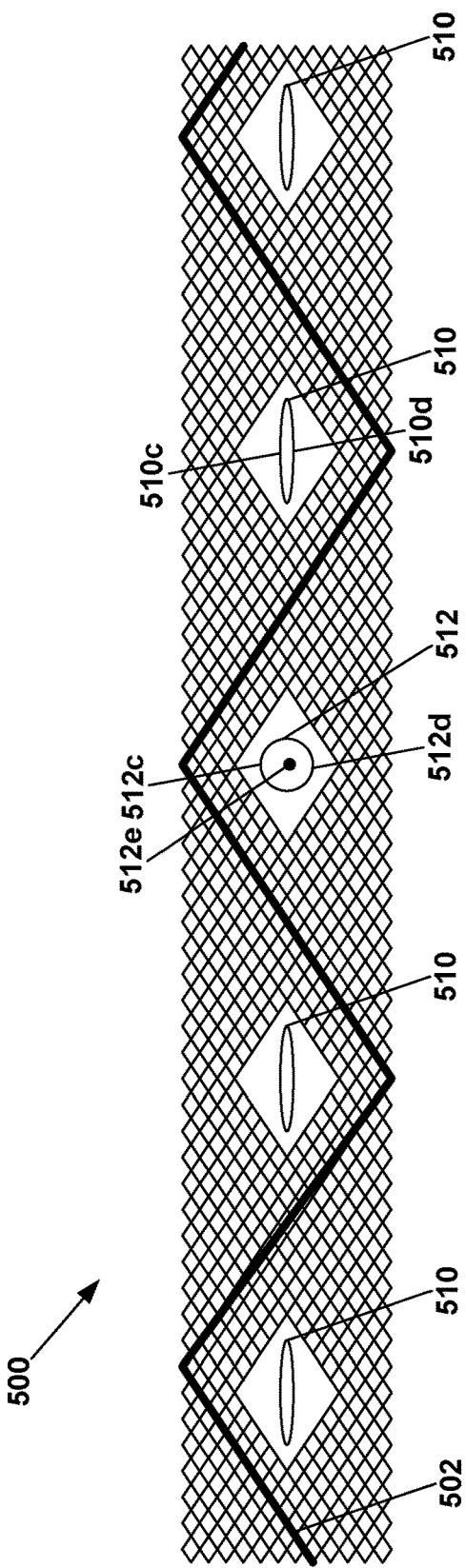
FIG. 15 is a schematic top view of a flat layout of the coreless wound coil shown in FIG. 12.
Figure 16:
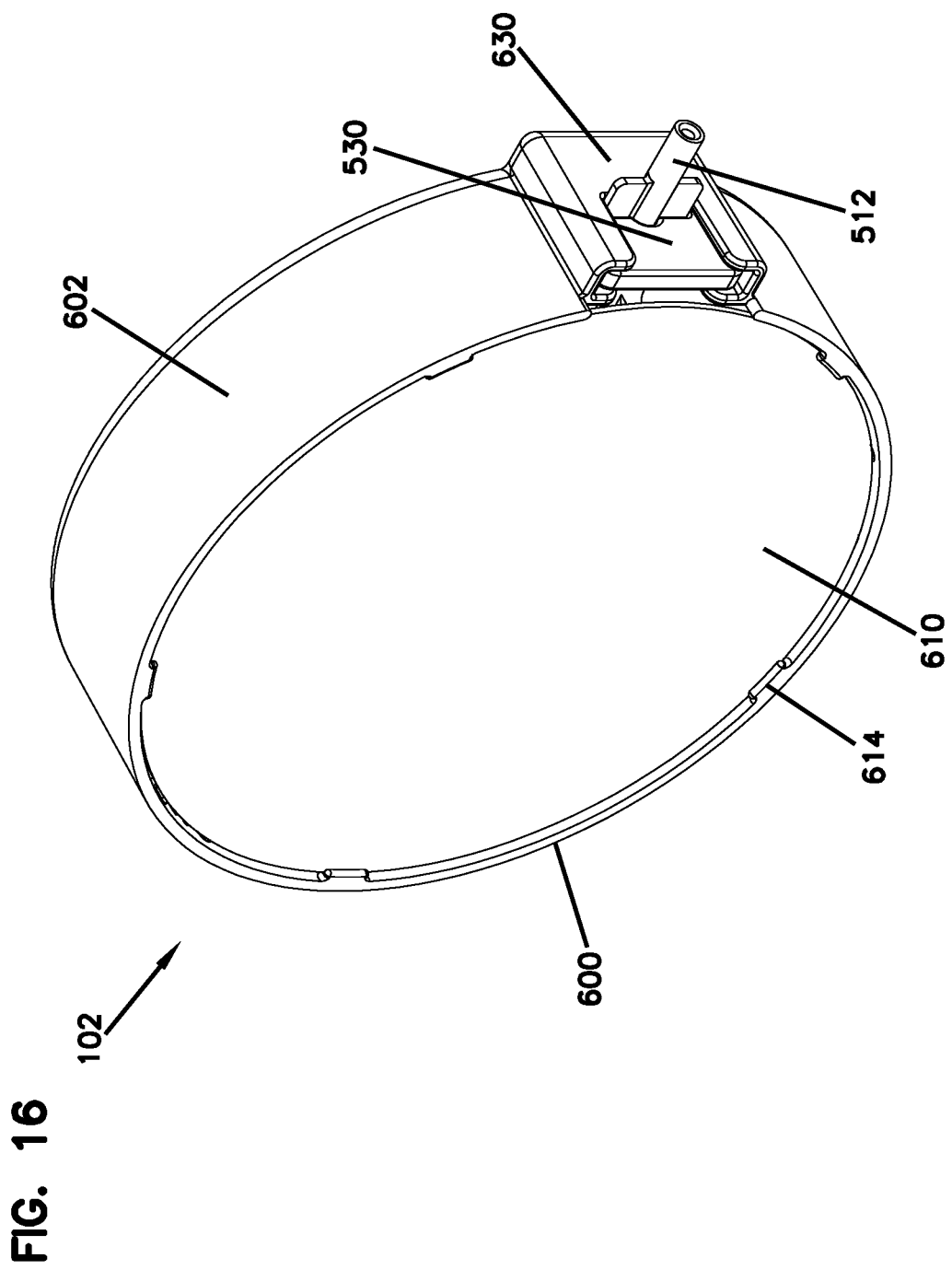
FIG. 16 is a perspective view of a physical example of the packaged cable dispenser of FIG. 12.
Figure 18:
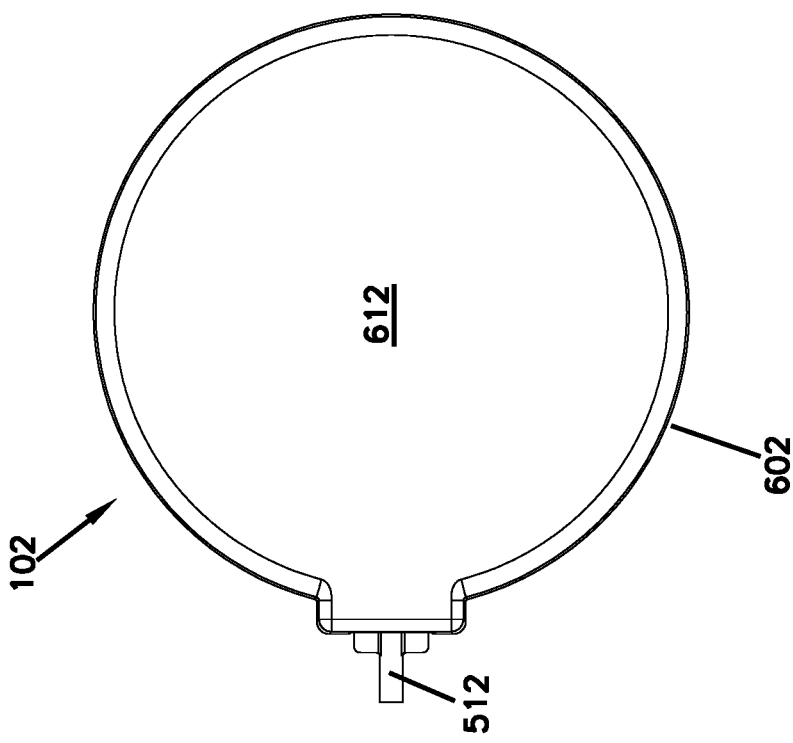
FIG. 18 is a bottom view of the packaged cable dispenser of FIG. 17.
Figure 17:
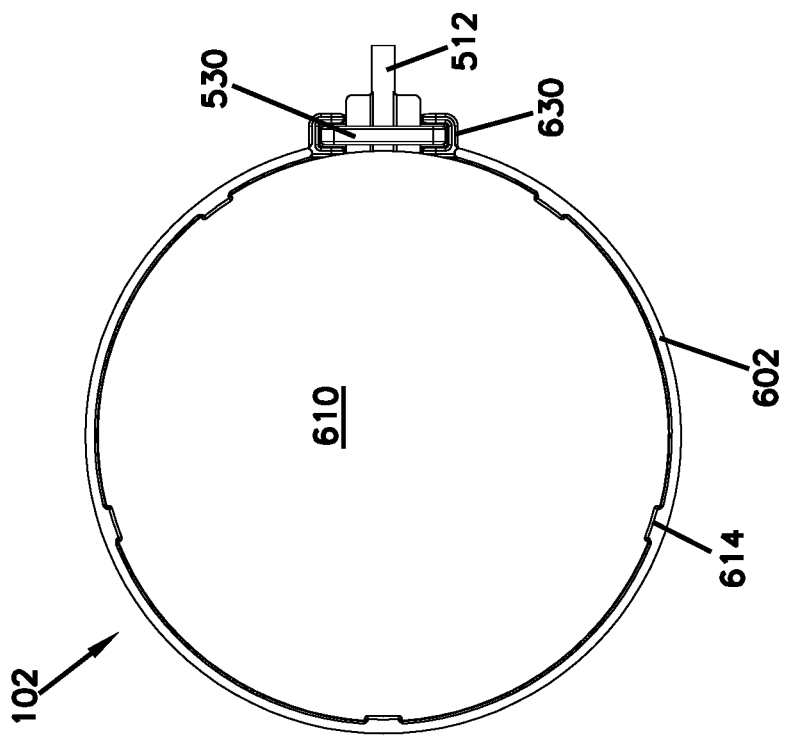
FIG. 17 is a top view of the packaged cable dispenser of FIG. 16.
Figure 19:
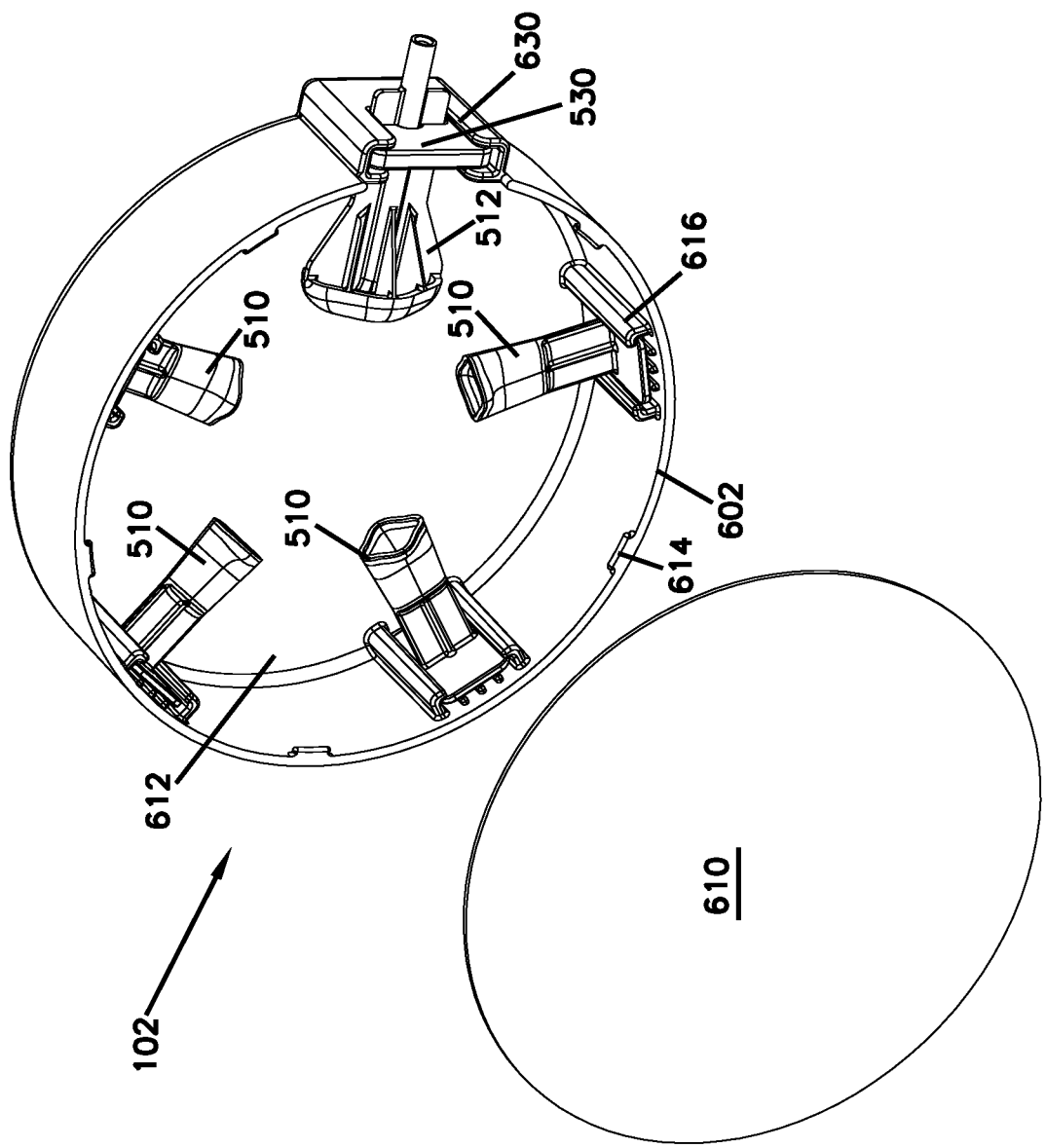
FIG. 19 is a perspective view of the packaged cable dispenser of FIG. 17 with the top wall removed from the housing.
Figure 20:
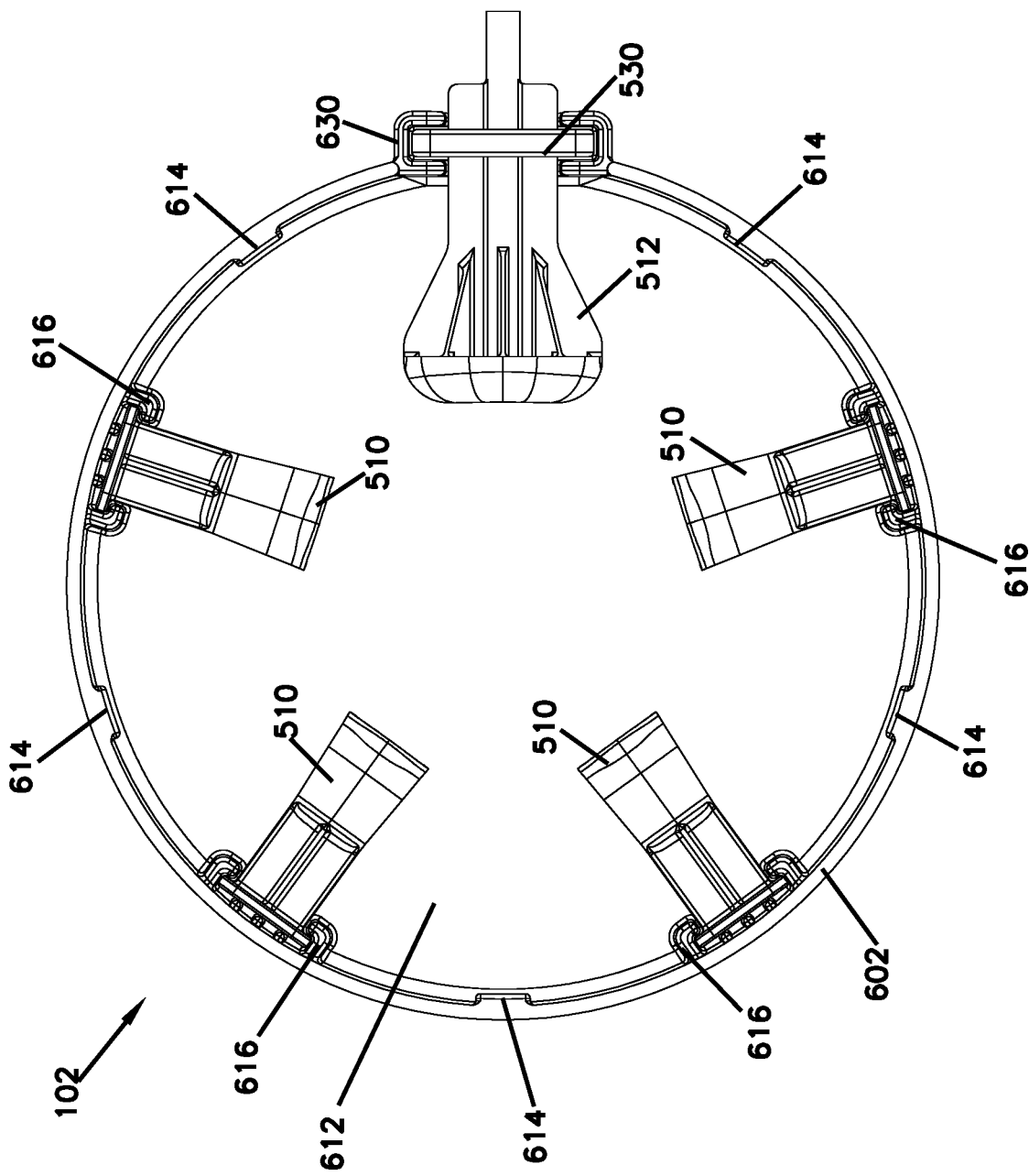
FIG. 20 is a top view of the packaged cable dispenser of FIG. 17 with the top wall removed from the housing.
Figure 21:
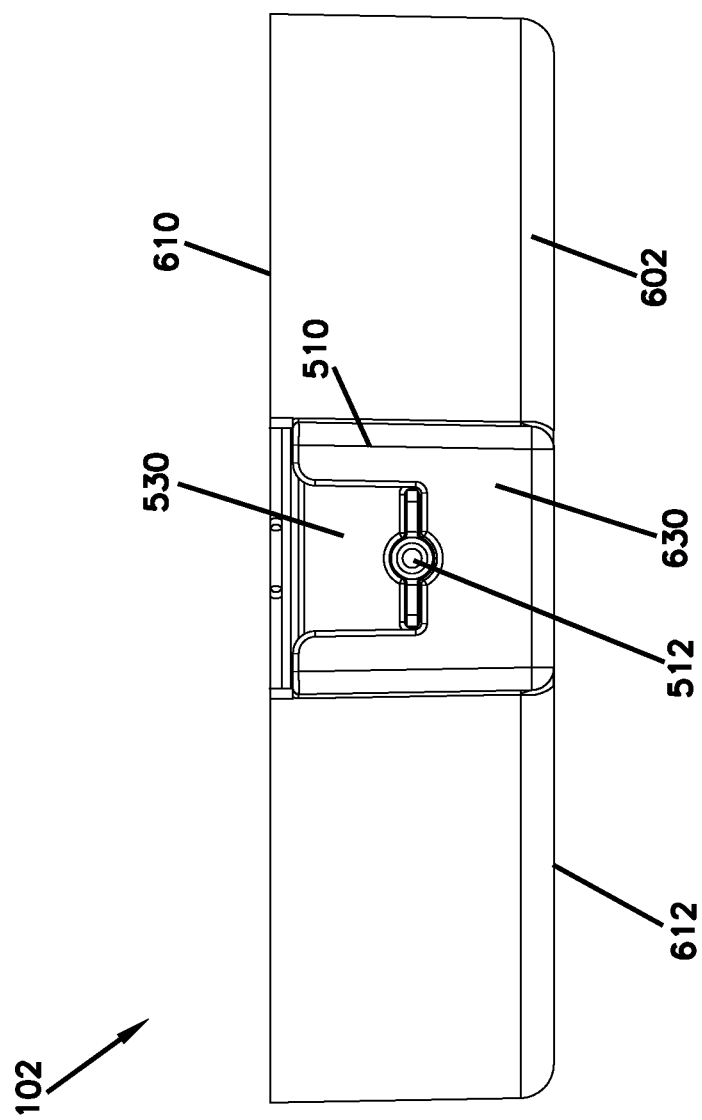
FIG. 21 is a side view of the packaged cable dispenser of FIG. 17.
Figure 22:
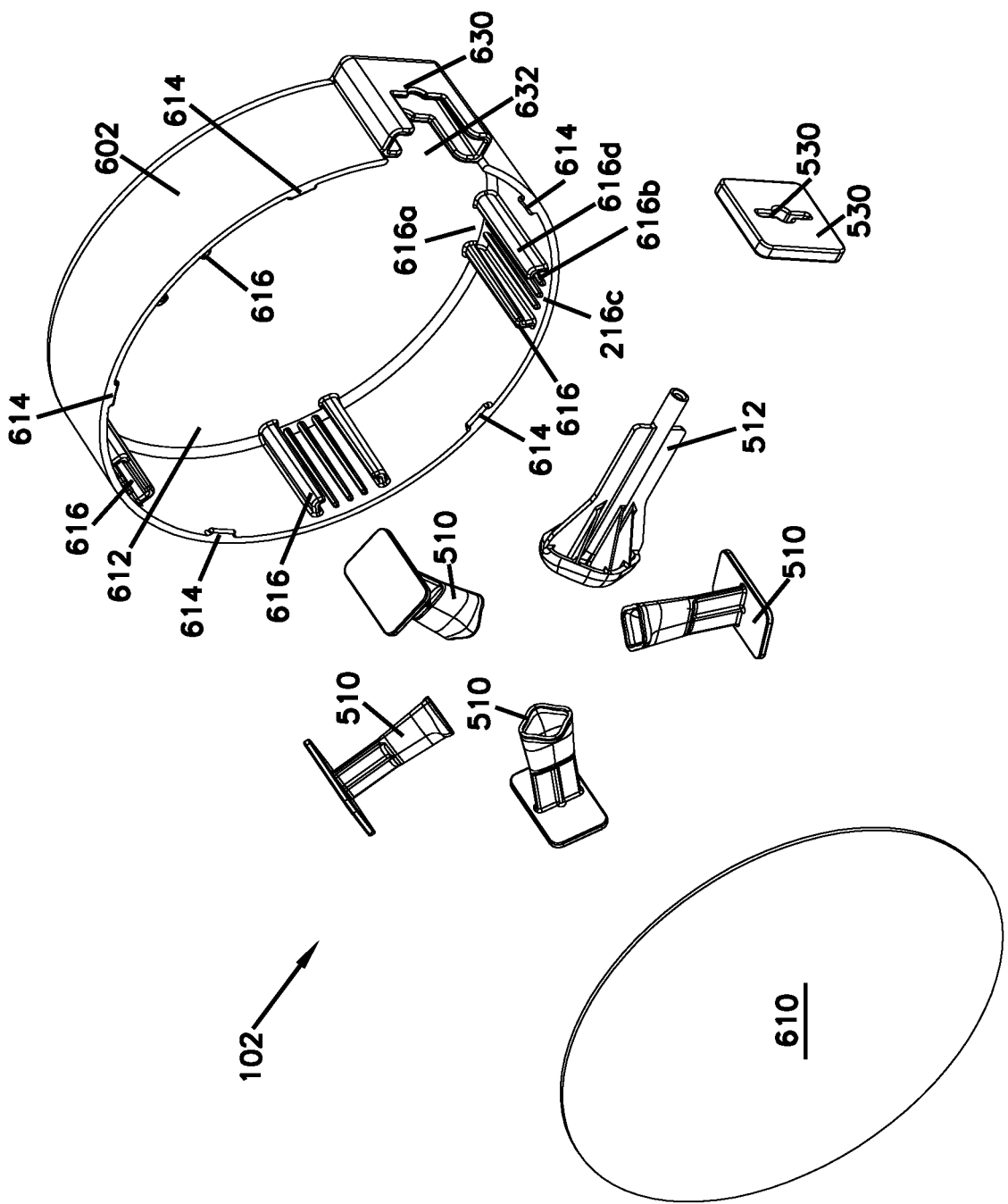
FIG. 22 is an exploded perspective view of the packaged cable dispenser of FIG. 17.
Figure 33:
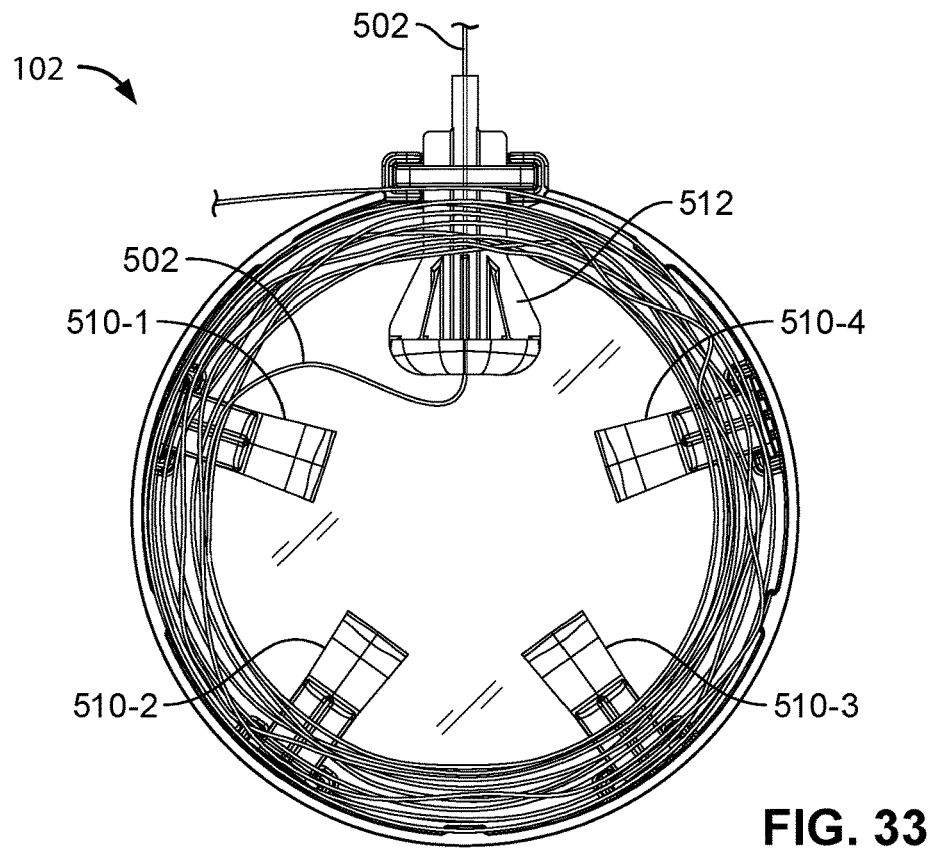
FIG. 33 is a perspective view of the packaged cable dispenser of FIG. 17 while dispensing cable in a first state.

With reference to FIG. 15, a flat layout schematic is presented of the wound coil 500 shown in FIG. 12 to illustrate the winding pattern of the coil 500 with respect to the winding separators 510, 512. As shown in FIG. 15, a plurality of wraps of the cable 502 are illustrated with a single wrap 502 being shown in bold for the purpose of discussion herein. During each wrap or pass of the winding process, the cable 502 is woven between the separators 510, 512 such that the cable 502 alternately passes on one of the first and second sides 510*c*, 512*c*, 510*d*, 512*d* of one winding separator 510, 512 and on the other of the first and second sides 510*c*, 512*c*, 510*d*, 512*d* of an adjacent winding separator 510, 512. Accordingly, for the embodiment shown in which five winding separators 510, 512 are provided, the cable 502 passes on the first side 510*c* of the first separator 510, then on the second side 510*d* of the next separator 510, then on the first side 510*c* of the next separator 510 (or 512*d* of separator 512), then on the second side 510*d* of the next separator 510, then on the first side 510*c* of the last separator 510. As the winding process is continuous, the cable 502 will then pass on the second side 510*d* of the first separator 510 and the cable 502 will continue to be woven on the opposite sides of the separators 510, 512 than the previous winding pass of the cable 502. As long as the total number of winding separators 510, 512 is an odd number, the cable 502 will wind on opposite sides of the separators with each alternating winding wrap. Such an approach which will ensure that half of the cable 502 in the fully wound coil 500 is wound onto each side of the separators 510, 512 in a balanced manner with the cable 502 crossing over the previously wound segment between each winding separator 510, 512 to prevent cable twist during removal of the cable 502. Although five winding separators 510, 512 are shown, it should be understood that more or fewer winding separators 510, 512 may be utilized, for example, three, seven, nine, and/or eleven winding separators 510, 512. In one example, and as presented in FIG. 6B, a packaged cable dispenser 102 having three winding separators, including a payout tube 512 and two separators 510, is shown. It is noted that the use of fewer separators 510, 512 will result in fewer cable cross-overs for each wound loop and a lower density winding, which can be beneficial for accommodating cables of larger diameters.

In the embodiment shown, winding separator 512 is shown as being formed as a hollow payout tube 512 having a hollow interior 512*e* and extending through the sidewall 602 of the package. As configured, the starting end 502*a* of the cable 502 is pulled from the interior winding surface 506 of the wound coil and through the interior 512*e* of the payout tube 512. Accordingly, the cable 502 can be pulled from the package through the payout tube 512 such that the wound coil is paid out from the interior winding surface 506 towards the exterior winding surface 504. As the cable 502 has been wound in the above manner, the cable 502 can be pulled from the wound coil 500 without a twist being imparted onto the cable 502. In one aspect, the hollow interior 512*e* has an interior dimension that is large enough to not unduly restrict the cable 502 as it is being pulled, but not so large that a potentially kinked or knotted cable 502 could enter into the interior 512e. In one example, the hollow interior 512e is no greater than twice the diameter of the cable 502.

Referring to FIGS. 17-32, a physical example of the packaged cable dispenser 102 schematically shown at FIGS. 12-16 is presented. As shown, package 600 is configured as a generally cylindrical-shaped housing 600. However, it should be appreciated that numerous housing shapes are useful with the disclosed teachings, for example, housings that have any of a number of geometric shapes (e.g. ovular, triangular, square, rectangular, pentagonal, hexagonal, octagonal, etc.). As shown, housing 600 has a continuous sidewall 602 defining the interior perimeter 620. The housing 600 is also provided with a bottom wall 612 adjoining the sidewall 602. As shown, the bottom wall 612 and the sidewall 602 are integrally formed as a single component. However, the bottom wall 612 could be formed as a separate component which is either permanently or removably joined to the sidewall 602. The housing 600 can also be provided with a top wall 610. As shown, the top wall 610 is removably attached to the sidewall 602, but could also be permanently attached, if desired. The top wall 610 can be secured to the sidewall 602 by tabs 614 provided on the sidewall 602 and by the first ends or top edges 616b of mounting or channel members 616 (discussed later) provided on the sidewall 602. In one aspect, the top wall 610 is connected to the sidewall 602 with a snap-fit type of connection. Together, the sidewall 602, the top wall 610, and the bottom wall 612 form an interior volume 614 within which the coreless wound coil 500 can be stored.

In one aspect, the winding separators 510 can be provided with a first end 510a, a second end 510b, a first side 510c, and a second side 510d. In the example shown at FIGS. 17-32, each of the winding separators 510 can be provided with a stem portion 514 extending from a base portion 516. The stem portion 514 is shown as extending between the first and second ends 510a and having the base portion 516 attached at the second end. As shown, the stem portion 514 and the base portion 516 are integrally formed as a single component, but may be formed as separate components that are later joined together.

The stem portion 514 of the winding separator 510 is flared at the first end 510a such that the first end 510a has a thickness t1 that is greater than a thickness t2 of the stem portion 514 at the second end 510b. The flared first end 510a operates to retain the cable 502 onto the winding separators 510 such that the cable 502 does not prematurely unravel with only one loop coming off the separator 510 at a time. In one aspect, the flared first end 510a can be provided with sloped portions 510e transitioning between the first and second thicknesses t1, t2. The sloped portions 510e, 510f can be configured to gently guide the cable 502 past the first end 510a while also preventing the cable 502 from becoming hung up or caught on the first end 510a. Each winding separator 510 may also be provided with rounded portions 510f that provide rounded transitions between the first and second sides 510c, 510d. As the cable 502 is passing from one side 510c, 510b of one separator 510 to the other side 500c, 510d of the adjacent separator 510, the rounded portions 510f help to ensure that the cable is gently guided along the pathway and is not exposed to any sharp edges. In one aspect, the separators 510 are hollow or partially hollow at the first end 510a in order to form the sloped portions 510e and the rounded portions 510f. However, the winding separator 510 can be provided as an entirely solid structure without departing from the concepts presented herein.

As shown, the base portion 516 of each winding separator 510 can be defined as having a top side 516a and a bottom side 516b extending between opposite sides 516c,d and between opposite sides 516e,f. In the example shown, the base portion 516 is provided with a generally rectangular shape, although other shapes are possible. During the winding process, the base portion 516 enables a greater amount of cable 502 to be wound into a coil 500 in comparison to a winding separator 510 not having a base portion 516. The top side 516a of the base portion 516 provides a positive surface against which the cable 502 can be wound and retained thereby allowing cable 502 to be wound all the way to the second end 510b of the winding separator. Where no base portion 516 is provided, the winding process must be stopped at a point such that at least a portion of the second end 510b of the winding separators 510 remains exposed such that the cable 502 cannot unintentionally unwind beyond the separator 510.

The base portion 516 also provides a mounting location for the wound coil 500 to be mounted within the housing 600. As stated previously, the housing 600 is provided with a plurality of channel members 616 at the sidewall 602. In one configuration, the each of the channel members 616 extends between a first end 616a adjacent the bottom wall 612 towards a second end 616b adjacent the top wall 610. In one aspect, the second end 616b is recessed from the top edge 602a of the sidewall 602 to accommodate the thickness of the top wall 610. The channel members 616 may be each provided with a first side member 616c and a second side member 616d that extend between the first and second ends 616a, 616b. Together, the side members 616c, d and the sidewall 602 define a channel that receives and retains the base portion 516 of a winding separator 510. As configured, the wound coil 500 can be formed on a winding apparatus and then mounted within the housing 600 by aligning and then sliding the base members 516 of each winding separator 510 into the corresponding channel member 616. Although the use of base members 516 and channel members 616 are a useful configuration for providing a connection between the wound coil 500 and the housing 600, it should be appreciated that other cooperating structures may be used without departing from the concepts described herein.

A payout tube 512, which also functions as a winding separator, is also provided in the packaged cable dispenser 102 shown in FIGS. 9-22. In some examples, the cable outlet 112 of the cable dispenser 102 is configured as, or includes, the payout tube 512. In one aspect, the payout tube 512 has a first end 512a, a second end 512b, a first side 512c, and a second side 512d. The payout tube 512 can also be configured with a stem portion 518, a head portion 520, side flanges 522 and buttresses 524. In the example shown, the payout tube is a single molded component. In combination, the head portion 520 and the stem portion 518 define the hollow interior 512e through which the cable 502 can extend from the interior of the wound coil 500 to the exterior of the housing 600. As shown, the side flanges 522 are provided to define the first and second sides 512c, 512d and enable the payout tube 512 to function as a winding separator in the same manner as the winding separators 510. The side flanges 522 are also provided with sloped regions 522a that gently slope to the head portion 520 and allow a segment of unwinding cable 502 to be guided up to the head portion 520 without excessive bending or catching of the cable 502 on the head portion 520. As shown, the buttresses 524 extend from the side flanges and the stem portion 518 on the first and second sides 512c, 512d towards the head portion 520.

In one aspect, the buttresses 524 provide a transition from the sides 512c, 512d and stem portion 518 to gently guide the cable 502 up to the head portion 520 while also preventing the cable 502 from becoming hung up or caught on the head portion 520.

The head portion 520 is also shaped to prevent the cable 502 from becoming bent too sharply or kinked as the cable 502 is being pulled through the payout tube 512 and passing by one side 512c, 512d of the payout tube 512. The head portion 520 can be described as having a rounded outer surface 520c for guiding the cable 502 about the payout tube 512 as the cable 502 passes by the payout tube 512. The head portion 520 can also be described as having a funneling surface 520d that smoothly guides the cable into the hollow interior 512e. In one example, the head portion 520 is provided as a toroidal shape having two axes of symmetry. For example, and as most easily viewed at FIG. 32, the head portion 520 is symmetrical about an axis X and symmetrical about an axis Y. In one aspect, the head portion 520 is elongated along the X axis relative to the Y axis to create a rounded diamond-shape with a leading edge 520a and a trailing edge 520b. The rounded leading edge 520a aids in guiding the cable 502 to the appropriate side 512c, 512d of the payout tube 512 as the cable 502 is unwinding off of the winding adjacent winding separators 510 which prevents kinking or tangling of the cable 502. The outer surface 520c and the funneling surface 520d also function as a bend radius limiter for the cable 502. In one aspect, the outer surface 520c and funneling surface 520d can be configured to define a radius of about ¼ inch to about ½ inch.

In one aspect, the payout tube 512 can be secured to the housing with a clip member 530 that inserts into a corresponding receptacle 630 provided at a notch 632 in the sidewall 602. As shown, the clip member 530 is formed as a plate having an aperture 532 having a profile that matches at least a portion of the payout tube 512. In the example shown, the aperture 532 is shaped to allow the stem portion 518 and the side flanges 522 to be inserted through the clip member 530. As shown, the clip member 530 is formed as a separate component that can be mounted and secured onto the payout tube 512 either before or after the cable 502 has been wound to form the wound coil 500. Alternatively, the clip member 530 can be formed integrally with the rest of the payout tube 512. As the payout tube 512 is slidable relative to the clip member 530, the position of the payout tube 512 can be adjustable relative to the housing 600 to optimize the location of the head portion 520 with respect to the interior of the wound coil 500. Such adjustability would allow for the same constituent parts to be used in multiple applications where differing cable dimensions and properties and/or wound coil diameters may be associated with different optimal locations for the head portion 520 within the housing 600. In one embodiment, index positions can be provided on the clip member 530 and/or the payout tube 512 such that the desired position of the payout tube with respect to the housing 600 can be readily achieved during assembly. This general construction is also advantageous in that different payout tubes 512 having different lengths and head styles may be used with the same housing 600.

Figure 34:
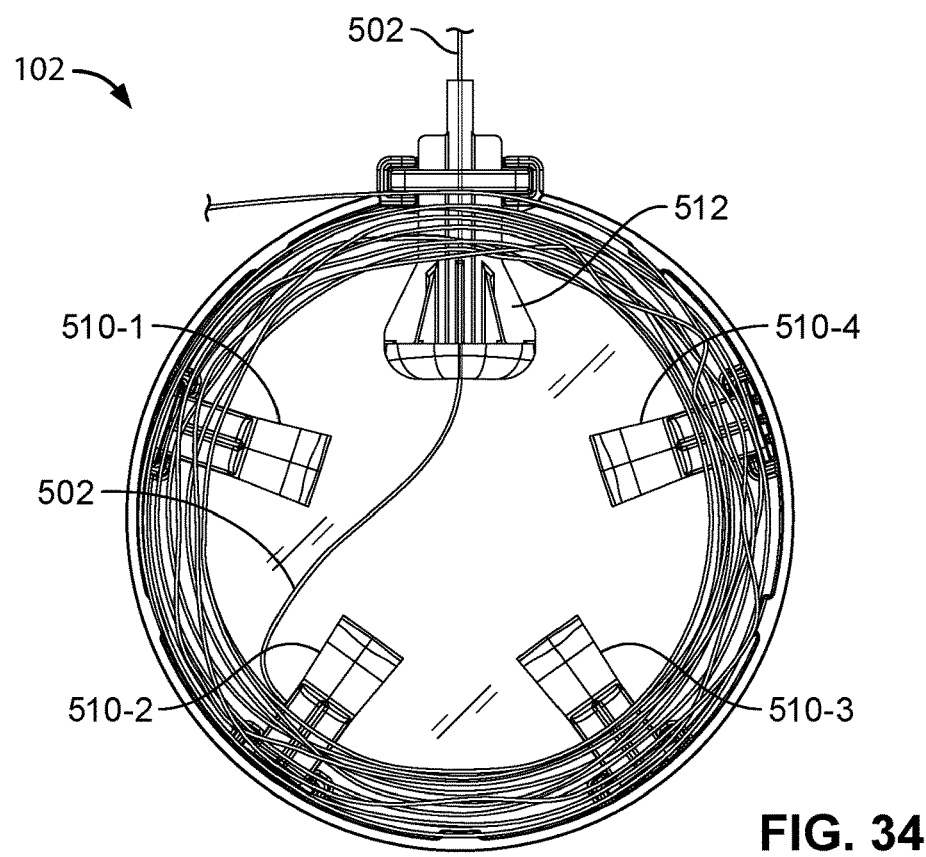
FIG. 34 is a perspective view of the packaged cable dispenser of FIG. 17 while dispensing cable in a second state.
Figure 35:
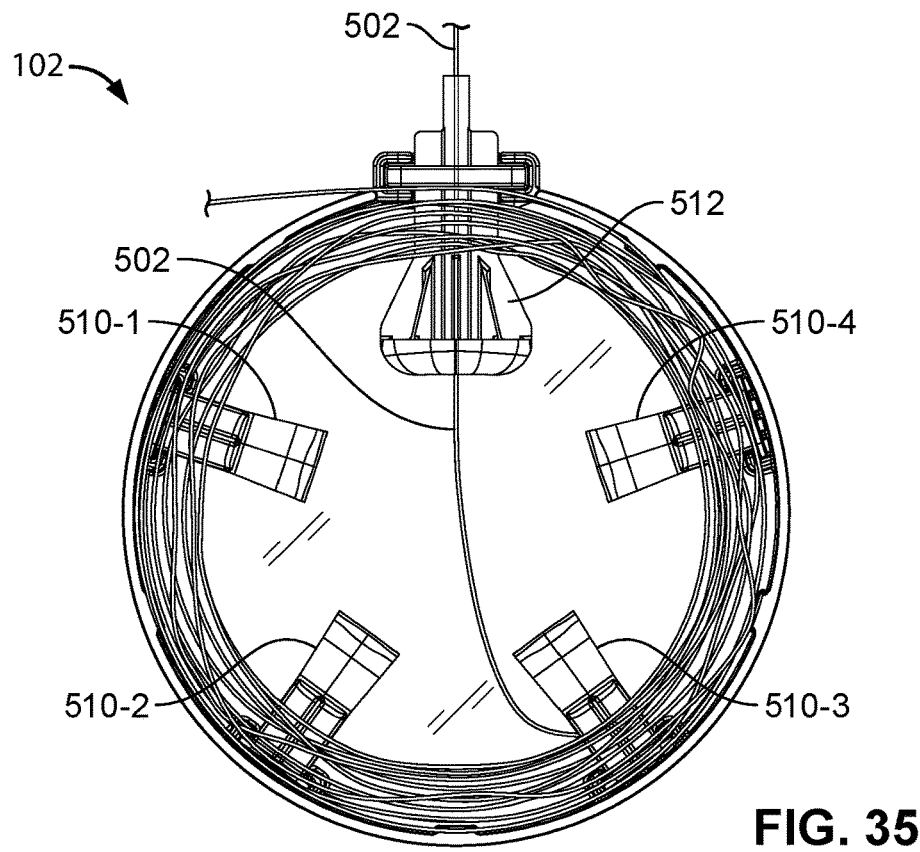
FIG. 35 is a perspective view of the packaged cable dispenser of FIG. 17 while dispensing cable in a third state.
Figure 36:
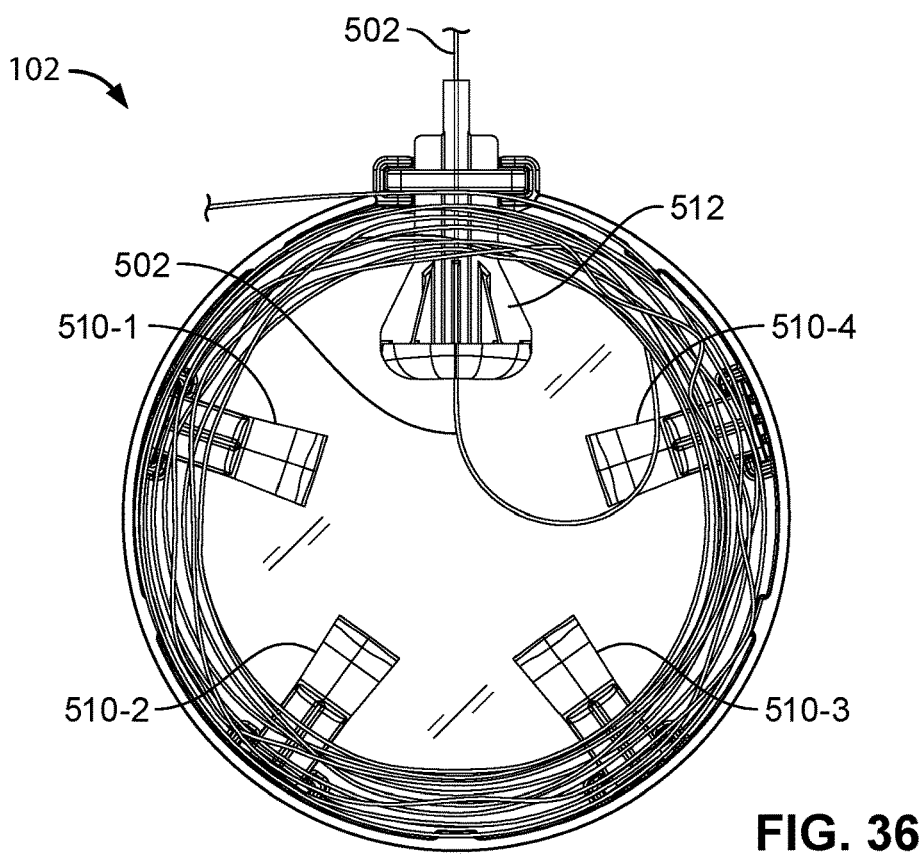
FIG. 36 is a perspective view of the packaged cable dispenser of FIG. 17 while dispensing cable in a fourth state.

Referring to FIGS. 33-41, depictions of a cable 502 being dispensed from a dispenser 102 having a clear package 600 at different stages are shown in which the above described features of the winding separators 510 and payout tube 512 are illustrated. In FIG. 28, the cable 502 has just been unwound past the payout tube 512 second side 512d and is maintained on the first side 510c of the adjacent winding separator 510-1 by the flared first end 510a of the winding separator 510-1. FIG. 34 shows the cable 502 having been pulled further through the payout tube 512 such that the cable 502 has lifted off of the winding separator 510-1 but is still retained on the second side 510d of the next winding separator 510-2 by the flared first end 510a. Similarly, FIG. 35 shows the cable 502 now having been lifted off of the winding separator 510-2 while still being maintained on the first side 510c of the adjacent winding separator 510-3 by the flared first end 510a of the winding separator 510-3. FIG. 68 shows the cable 502 having been pulled further through the payout tube 512 such that the cable 502 has lifted off of the winding separator 510-3 but is still retained on the second side 510d of the next winding separator 510-4 by the flared first end 510a.

Figure 37:
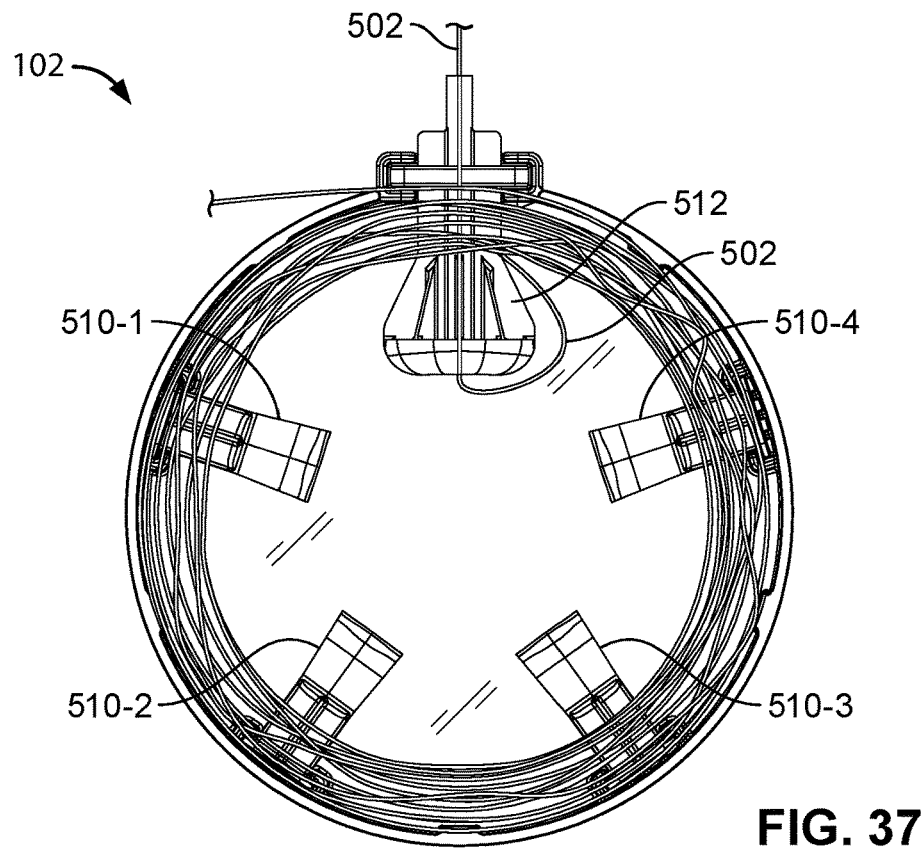
FIG. 37 is a perspective view of the packaged cable dispenser of FIG. 17 while dispensing cable in a fifth state.
Figure 38:
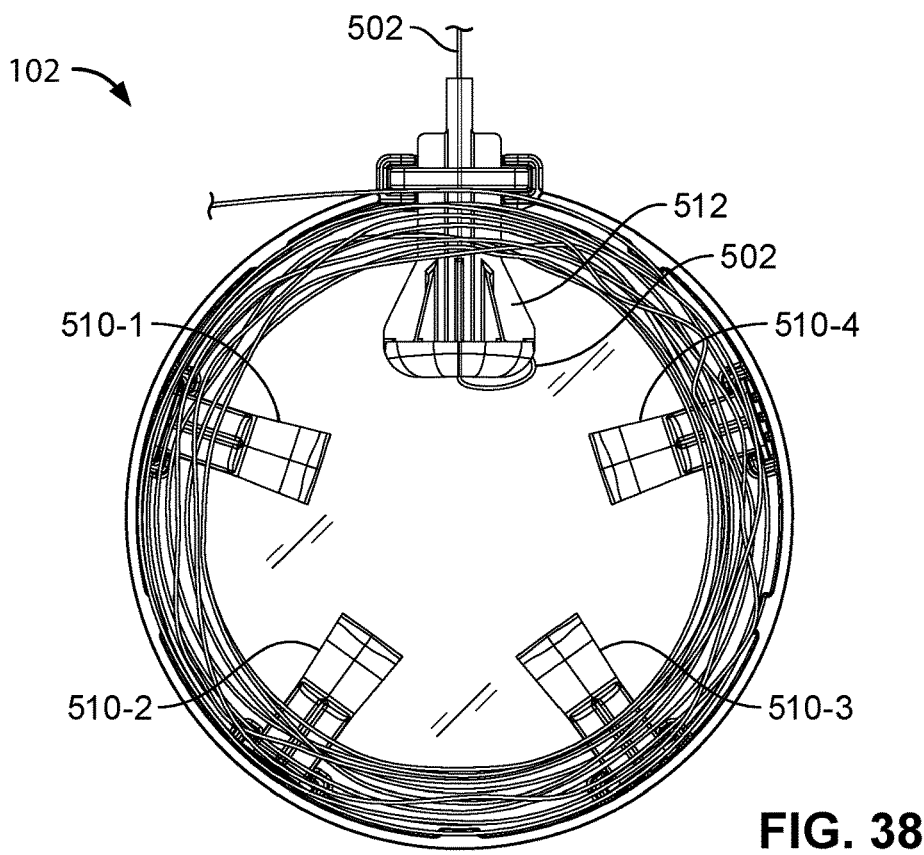
FIG. 38 is a perspective view of the packaged cable dispenser of FIG. 17 while dispensing cable in a sixth state.
Figure 39:
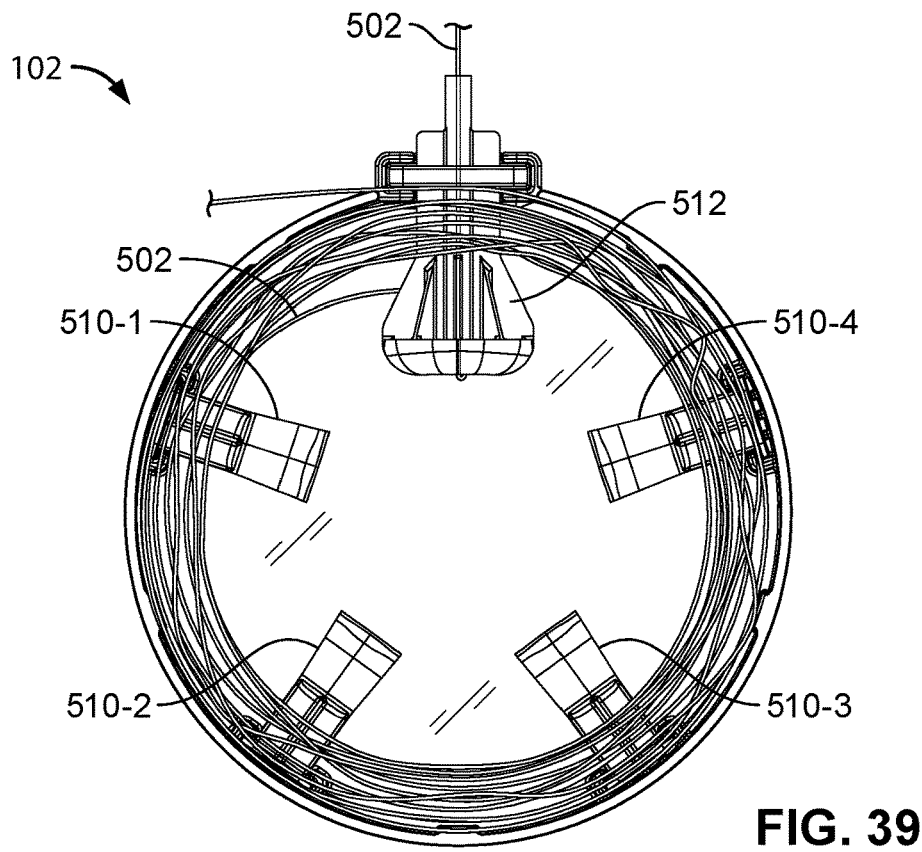
FIG. 39 is a perspective view of the packaged cable dispenser of FIG. 17 while dispensing cable in a seventh state.
Figure 40:
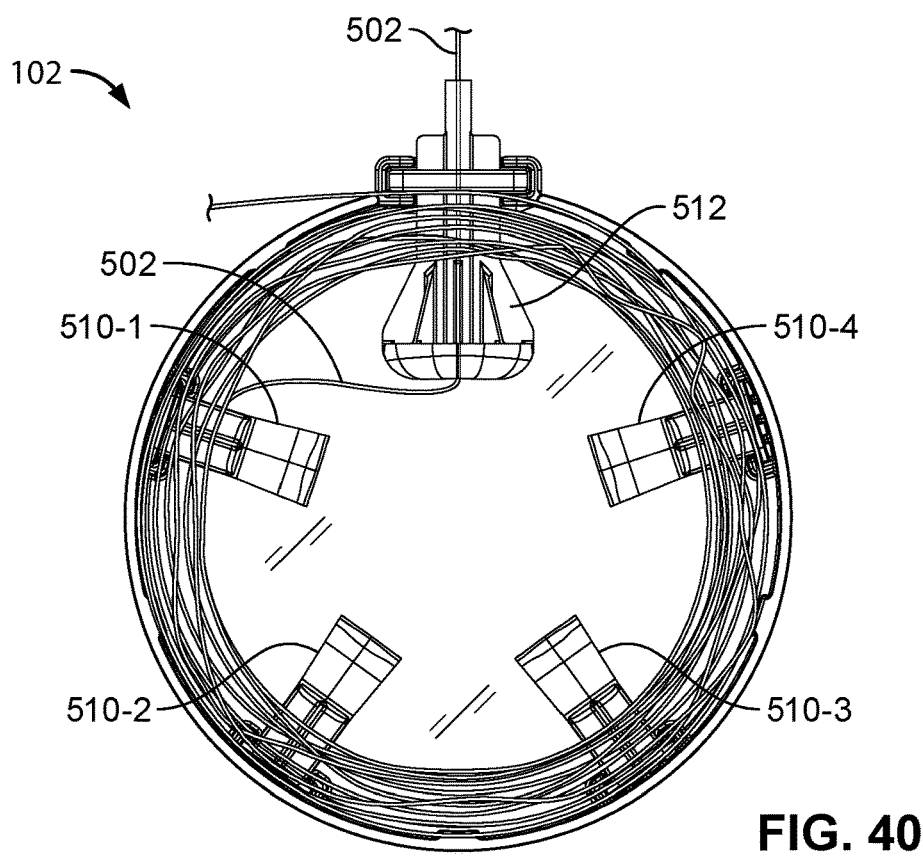
FIG. 40 is a perspective view of the packaged cable dispenser of FIG. 17 while dispensing cable in an eighth state.
Figure 41:
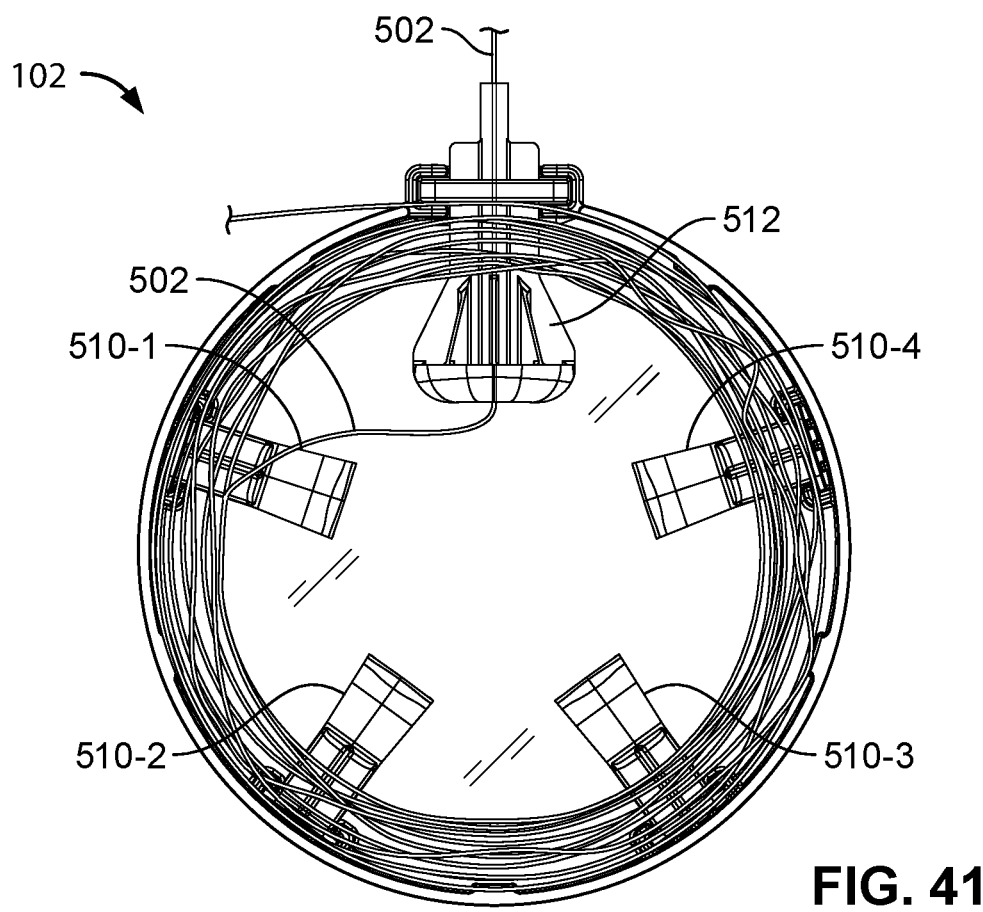
FIG. 41 is a perspective view of the packaged cable dispenser of FIG. 17 while dispensing cable in a ninth state.

Unlike the winding separators 510, the cable 502 is simultaneously drawn through and past the payout tube 512 which necessitates that the cable 502 flips over from one plane one side of the payout tube 512 to another plane on the other side of the payout tube 512. FIG. 37 shows the cable 502 at the beginning of this process wherein the cable has lifted from the winding separator 510-3 with the flared end 510e of the separator 510-3 having kicked the cable 502 out of plane such that the cable 502 can be transferred over from the second side 510d of separator 510-4 to the first side 512c of the payout tube 512. At the same time, the rounded leading edge 520a of the payout tube head portion 520 is ensuring that the cable 502 continues to flip over to the first side 512c as the cable draws nearer the payout tube 512. FIGS. 38-40 show the cable 502 as it traces around the outer portion 520c of the head portion and along the first side 520c of the payout tube 512 until the cable 502 finally flips over and is again engaged by the winding separator 510-1, but this time on the second side 510d. The unwinding process continues in the same manner for the next loop of cable 502 pulled through the payout tube 512, but on opposite sides of the winding separators 510 and the payout tube 512.

As described herein, the present disclosure provides a system and method for inserting a telecommunications cable into a slotted conduit. The conduit has a slot extending along a length of the conduit. The system includes a non-rotating cable dispenser configured to store a length of communications cable and dispense the cable without need of rotating any element. The system further includes a plow-like insertion device configured to guide the communications cable from the cable dispenser to the conduit through the slot of the conduit. The non-rotating cable dispenser and the plow-like insertion device are described above.

In one example, the conduit can be pre-installed along a desired path within a building or any installation location, such as multi-dwelling units (MDUs). Then, the system of the present disclosure including the non-rotating cable dispenser and the insertion device can be moved along the pre-installed conduit to plow the cable stored in the dispenser into the conduit. In another example, the system including the non-rotating cable dispenser and the insertion device can be mounted at a fixed location, and the conduit can be pulled or otherwise moved relative to the system such that the cable is pulled from the dispenser and loaded into the conduit as the conduit moves past the system (i.e., the cable dispenser and the insertion tool).

Referring now to FIGS. 42-53, example cabling systems and methods are described and illustrated.

Figure 42:
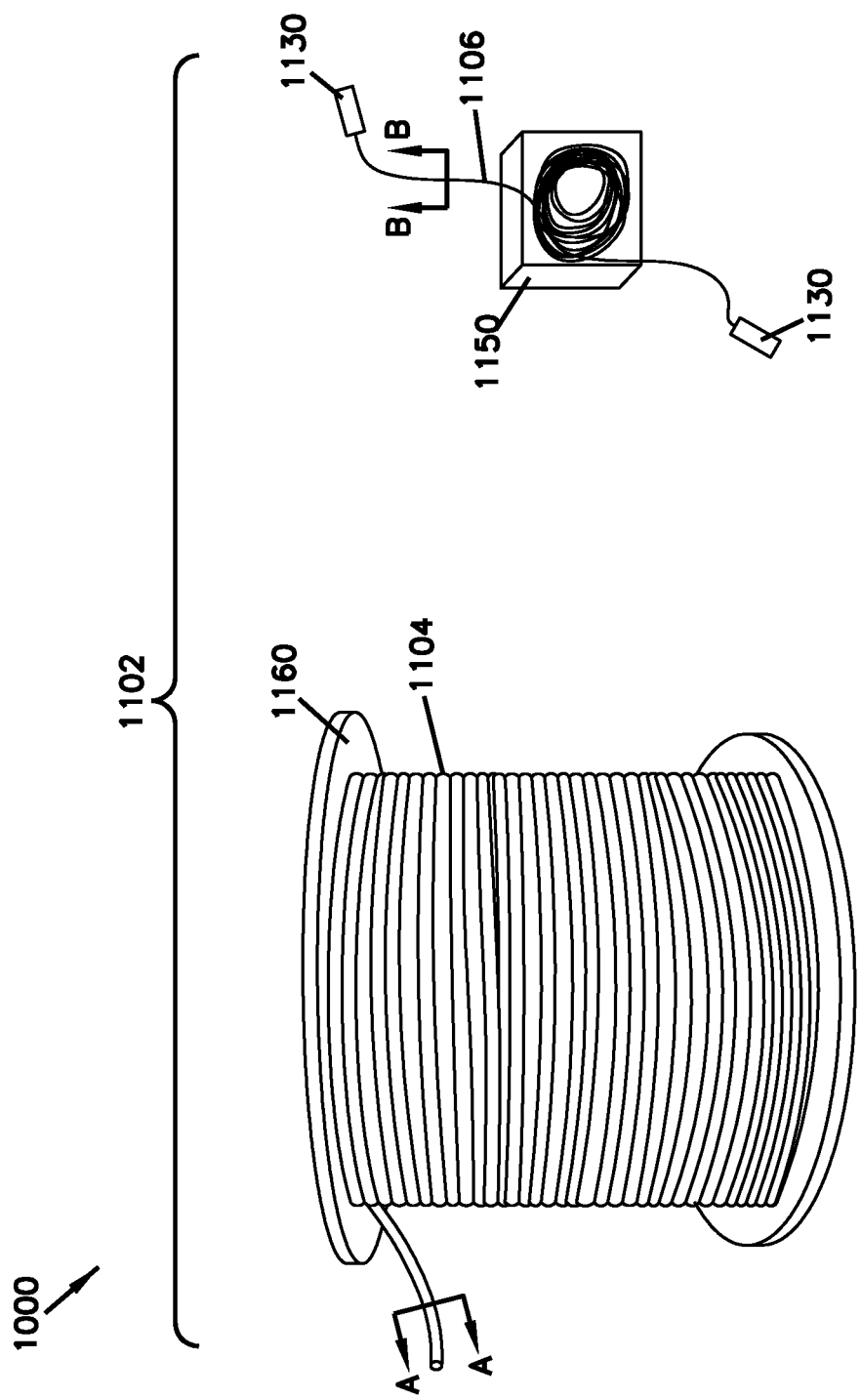
FIG. 42 schematically illustrates a cabling system in accordance with an exemplary embodiment of the present disclosure.

Referring to FIG. 42, a cabling system 1100 is described in accordance with an exemplary embodiment of the present disclosure. The cabling system 1100 includes a cable assembly 1102, which is disaggregated into a jacket portion 1104 and a fiber optic cable portion 1106. As described herein, the jacket portion 1104 and the fiber optic cable portion 1106 are separately provided and aggregated into the cable assembly 1102 in field.

Figure 43:
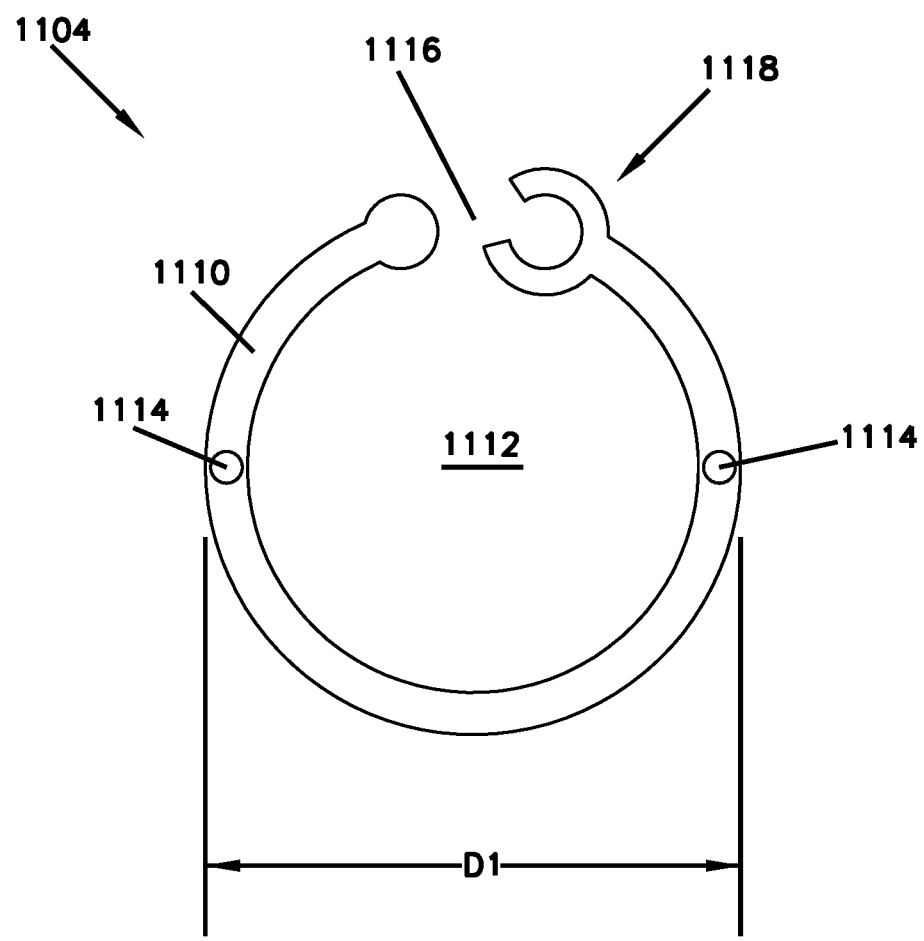
FIG. 43 is a schematic cross sectional view of an example jacket portion of the cabling system, taken along line A-A of FIG. 42.

Referring to FIG. 43, the jacket portion 1104 of the cable assembly 1102 is configured to provide a robust outer jacket for the fiber optic cable portion 1106. The jacket portion 1104 is designed to be installed in field (i.e., a field installable jacket). The jacket portion 1104 includes an outer protective layer or jacket 1110 that defines a passage 1112 for receiving the fiber optic cable portion 1106.

In some examples, the outer jacket 1110 includes one or more strength members 1114 embedded in a wall of the jacket 1110. The strength members 1114 can be made of various materials. For example, the strength members 1114 include relatively rigid rods, such as fiberglass-reinforced polymer rods, metal rods, or like structures. The strength members 1114 can have sufficient stiffness to prevent excessive bending of the outer jacket 1110 and thus maintain the bend radius requirement of the fiber optic cable portion 1106 received within the jacket portion 1104. The strength member 1114 can also have sufficient column strength to allow the outer jacket 1110 to be pushed or pulled along a routing path 1180 (FIG. 4) during installation. In addition or alternatively, the strength member 1114 includes more flexible elements, such as yarns or tapes (e.g., Aramid yarns or tapes).

In some examples, the jacket portion 1104 includes a longitudinal slit 1116 configured to permit the outer jacket 1110 to be opened along its length and receive the fiber optic cable portion 1106 into the passage 1112 as the fiber optic cable portion 1106 is laterally loaded through the slit 1116. The longitudinal slit 1116 can have various configurations, such as seam, slot, opening, and any suitable structures. As described below, the longitudinal slit 1116 can be closed in various ways. For example, the fiber optic cable portion 1106 can be laterally inserted into the jacket portion 1104 and zipped in to accommodate the fiber optic cable portion 1106 within the jacket portion 1104. In other examples, the fiber optic cable portion 1106 can be plowed into the jacket portion 1104. In yet other examples, other methods can be used to insert the fiber optic cable portion 1106 into the jacket portion 1104. Such insertion of the fiber optic cable portion into the jacket portion can be manually performed with or without a tool, or automatically conducted with an automated tool.

In some examples, the jacket portion 1104 includes an interlocking longitudinal interface 1118 configured to provide a mechanical interlock that retains the longitudinal slit 1116 in a closed configuration after the fiber optic cable 1106 has been loaded within the outer jacket 1110.

Figure 45:
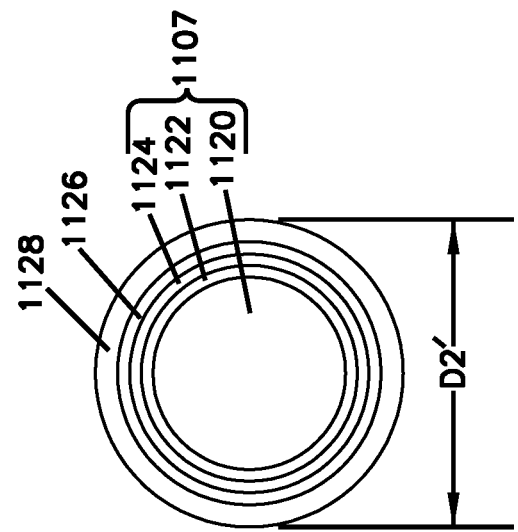
FIG. 45 is a schematic cross sectional view of another example cable portion of the cabling system, taken along line B-B of FIG. 42.
Figure 44:
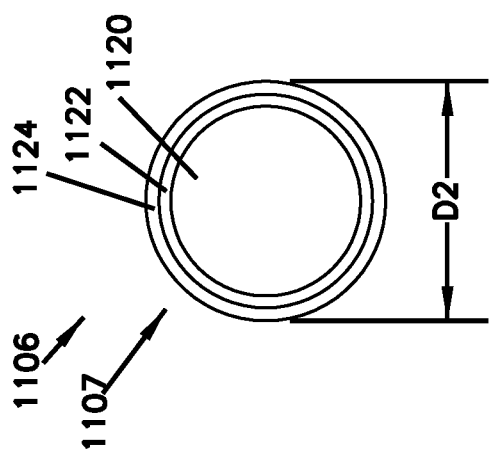
FIG. 44 is a schematic cross sectional view of an example cable portion of the cabling system, taken along line B-B of FIG. 42.

The jacket portion 1104 has a maximum cross sectional diameter D1 that is larger than a maximum cross sectional diameter D2, D2' of the fiber optic cable portion 1106 (FIGS. 44 and 45). In one example, the maximum diameter D1 of the jacket portion 1104 is about 2 to 5 times as large as the maximum diameter D2, D2' of the fiber optic cable portion 1106. In other examples, the maximum diameter D1 of the jacket portion 1104 is about more than 5 times as large as the maximum diameter D2, D2' of the fiber optic cable portion 1106.

In some examples, the fiber optic cable portion 1106 is configured to be more flexible and lightweight than the jacket portion 1104. In one example, the fiber optic cable portion 1106 is about 2 to 5 times more flexible than the jacket portion 1104. In other examples, the fiber optic cable portion 1106 is about more than 5 times more flexible than the jacket portion 1104.

Referring to FIGS. 44 and 45, the fiber optic cable portion 1106 includes a manageable fiber optic cable that is smaller, more flexible, and more lightweight than the jacket portion 1104. As illustrated in FIG. 44, in some examples, the fiber optic cable portion 1106 is merely a coated optical fiber 1107. For example, the fiber optic cable portion 1106 includes a core 1120, a cladding layer 1122, and a coating layer 1124. The coating layer 1124 can include at least one polymeric coating, such as acrylate or other polymer. In other examples, the coating layer 1124 includes a plurality of protective layers, such as an initial coating layer (e.g., acrylate) covered by an outer buffer layer.

In some examples, the fiber optic cable portion 1106 is a micro-cable.

As illustrated in FIG. 45, in some examples, the fiber optic cable portion 1106 includes a tensile strength structure 1126 and a cable jacket 1128, as well as an optical fiber 1107 including the core 1120, the cladding layer 1122, and the coating layer 1124. The tensile strength structure 1126 can include one or more strength members or layers. The tensile strength structure 1126 can be positioned between the optical fiber 1107 and the cable jacket 1128 of the manageable fiber optic cable.

The tensile strength structure 1126 can be configured to provide tensile strength without providing meaningful compressive strength. The tensile strength structure 1126 can be highly flexible to allow the manageable fiber optic cable 1106 to be bent along a relatively tight radius to enhance the ability to store the manageable fiber optic cable 1106 in a small volume or package.

In some examples, the tensile strength structure 1126 can include a yarn or yarn-like strength element (e.g., Aramid yarn) or a tape or tape-like strength element.

In some examples, the manageable fiber optic cable 1106 has a minimum bend radius less than 100 mm. In other examples, the manageable fiber optic cable has a minimum bend radius of around 2-5 mm. In certain examples, the manageable fiber optic cable 1106 has a maximum cross-dimension or outer diameter D2, D2' of between about 4 and about 1 millimeters.

Figure 46:
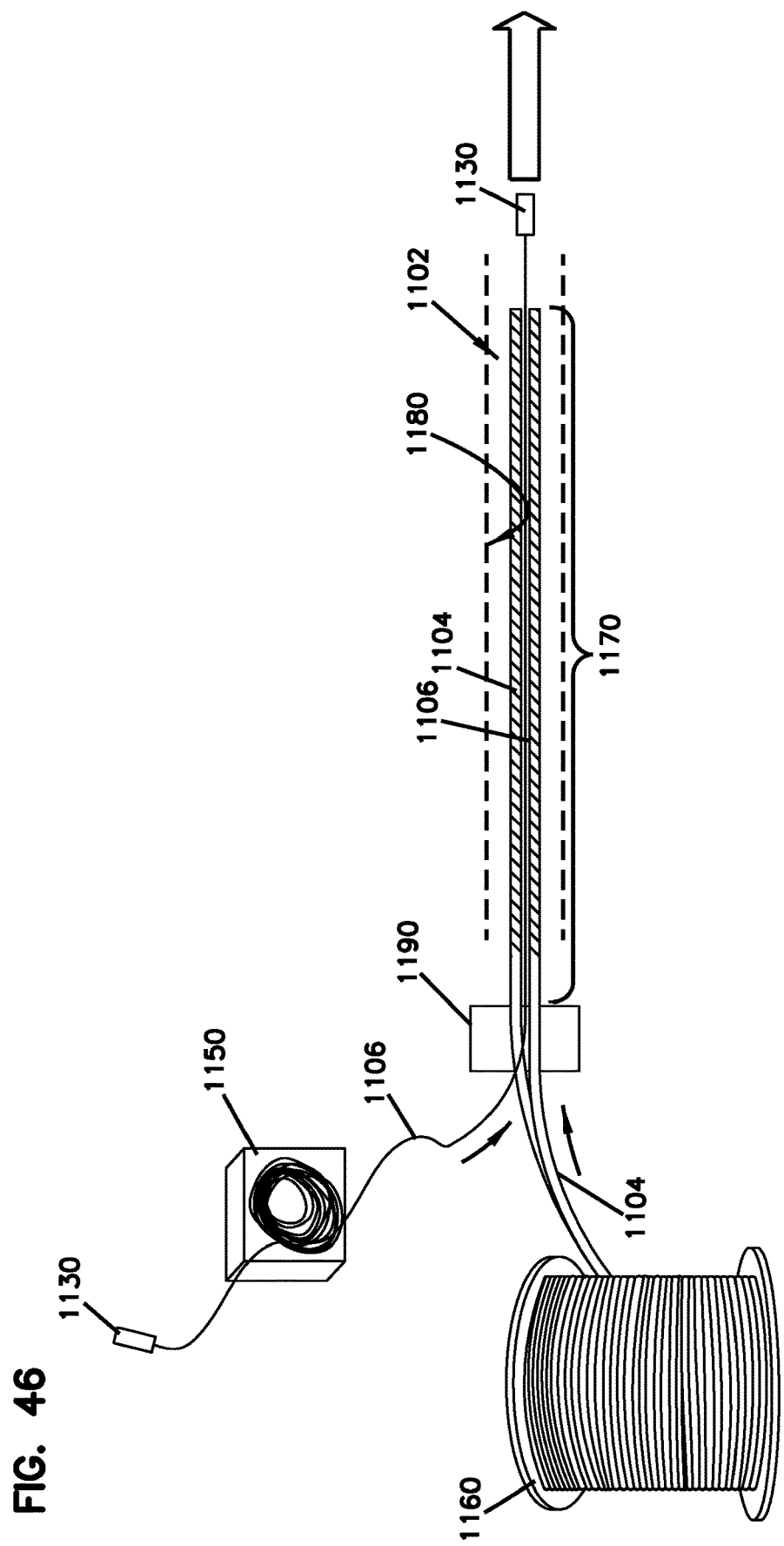
FIG. 46 schematically illustrates an example application of the cabling system of FIG. 42.
Figure 47:
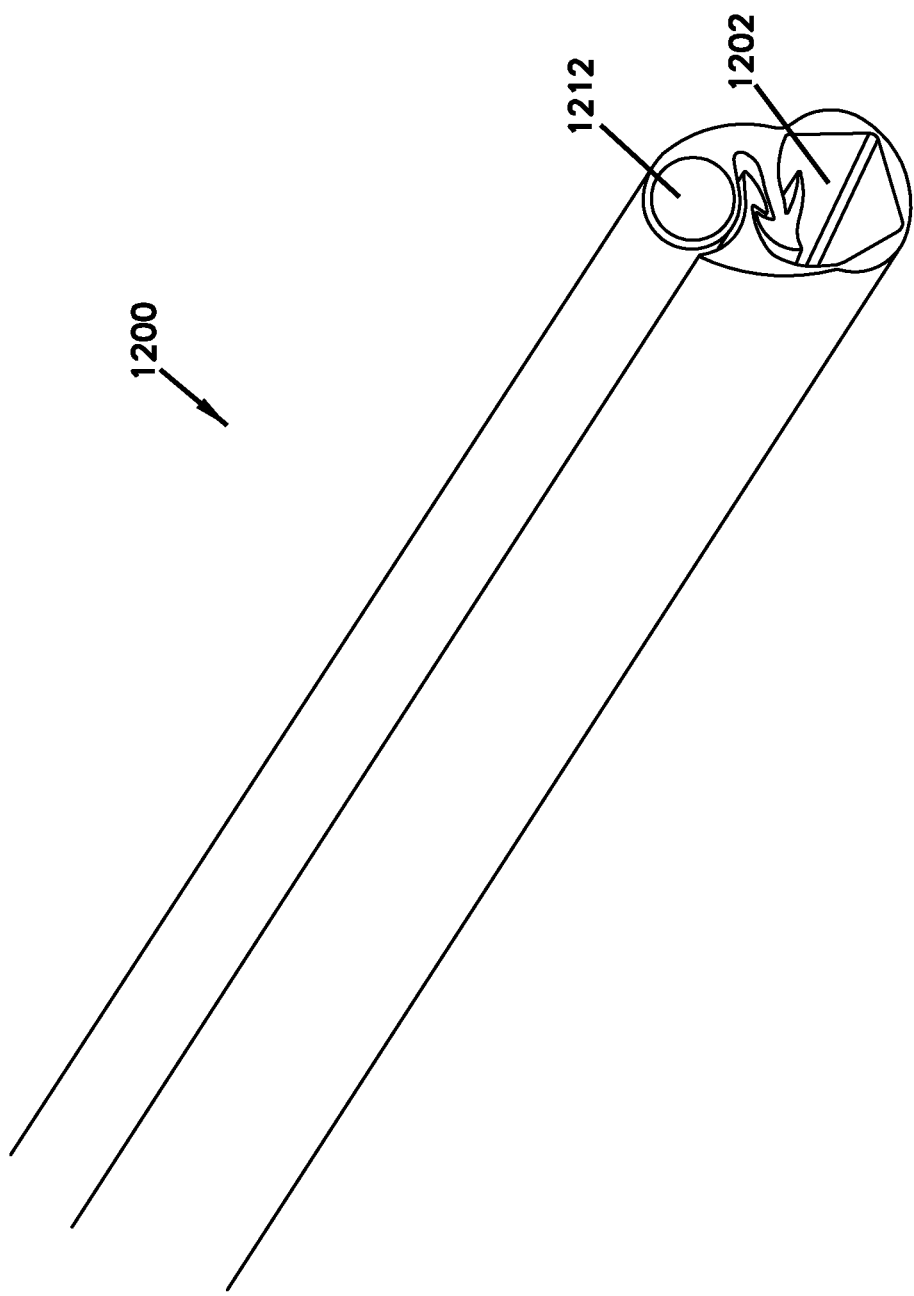
FIG. 47 is a perspective view of yet another example of a jacket in accordance with the present disclosure.
Figure 48:
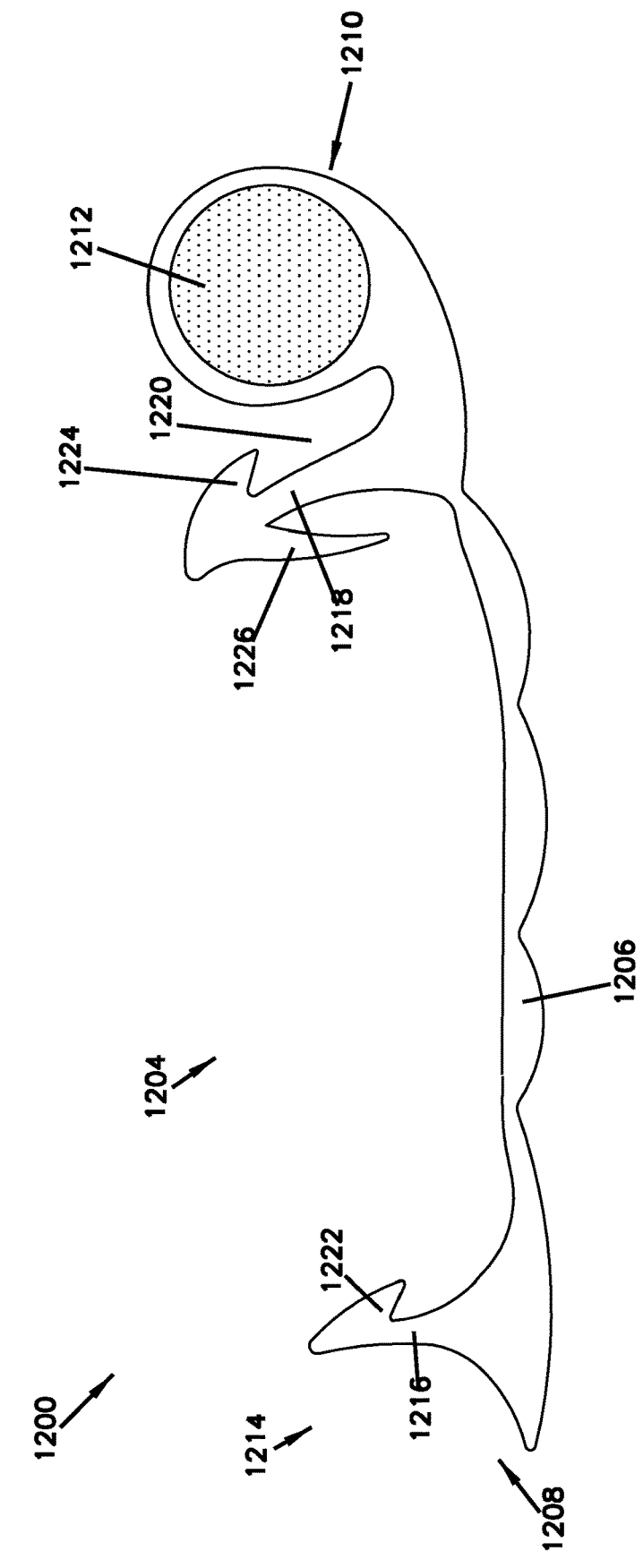
FIG. 48 is a cross sectional view of the jacket of FIG. 47 where the jacket is expanded.

As shown in FIGS. 42 and 46, in some examples, at least one of opposite ends of the manageable fiber optic cable 1106 can be pre-connectorized prior to installation of the cabling system in the field. For example, connectors 1130 can be installed to the ends of the fiber optic cable 1106 at the factory or in a controlled manufacturing setting.

The manageable fiber optic cable 1106 can be managed separately from the outer jacket portion 1104 before, during, and/or after installation. In some examples, a storage device 1150 is used to store the fiber optic cable 1106, as illustrated in FIGS. 42 and 46. The storage device 1150 is configured to store the manageable fiber optic cable 1106 in a relatively small volume and allow the manageable fiber optic cable to be readily paid out from the storage device during deployment of the cabling system. In this document, therefore, the storage device 1150 is also referred to as a cable dispenser.

The storage device 1150 can have various configurations. In some examples, the storage device 1150 includes a rotatable spool that rotates as the manageable fiber optic cable is paid out. Examples of the rotatable spool are described in U.S. Pat. No. 7,715,679, titled Fiber Optic Enclosure with External Cable Spool, issued May 11, 2010, U.S. Pat. No. 7,756,379, titled Fiber Optic Enclosure with Internal Cable Spool, issued Jul. 13, 2010, and U.S. Pat. No. 7,869,682, titled Fiber Optic Enclosure with Tear-Away Spool, issued Jan. 11, 2011, the disclosures of which are hereby incorporated by reference in their entireties.

In other examples, the storage device 1150 includes a containment device that allows the manageable fiber optic cable to be paid out without rotation of the containment device. Examples of such a non-rotating containment device are described in U.S. Patent Application Publication No. 2016/0207723, titled Coreless Wound Coil Dispenser with Optional Cable Storage for an Optical Terminal Network, filed Dec. 18, 2015, the entirety of which is hereby incorporated by reference.

In yet other examples, other types of the storage device 1150 are also possible. For example, the storage device 1150 does not include a rotatable or non-rotatable spool or reel around which the fiber optic cable portion 1106 is wrapped. The fiber optic cable portion 1106 can be contained in the storage device 1150 without support.

Referring now to FIG. 46, an example method for installing a fiber optic cable using the cabling system 1100 is described. In some examples, the outer jacket portion 1104 and the fiber optic cable portion 1106 are delivered in disaggregated state to an installation site in the field. For example, the outer jacketing portion 1104 can be delivered as being coiled about a relatively large spool 1160 and the manageable fiber optic cable portion 1106 can be delivered within or on a separate management device, such as the storage device 1150.

During installation, the manageable fiber optic cable portion 1106 is loaded laterally into the outer jacket portion 1104 to provide an aggregated portion 1170 of the cable assembly 1102. In some examples, the fiber optic cable portion 1106 is inserted into the jacket portion 1104 through the longitudinal slit 1116.

By aggregating the outer jacket portion 1104 and the manageable fiber optic cable portion 1106, the fiber optic cable portion 1106 can be protected by the robust nature of the outer jacket portion 1104 during installation and/or routing. The jacket portion 1104 can also be used to effectively push or pull the aggregated cable assembly 1102 along a desired routing path 1180. Examples of the routing path 1180 include conduits, sleeves, tubes, ducts, risers, plenums, or any other routing passages between various places, such as a location between a distribution pedestal and a subscriber location, a place on a cell tower, a place inside a building, an underground location, a location along wires, and any other interior or exterior locations.

Once the aggregated portion 1170 of the cable assembly 1102 has been installed along the desired routing path 1180, the outer jacket portion 1104 can be cut to length. In this way, the length of the outer jacket portion 1104 can be customized in the field so that excess length of the outer jacket portion 1104 need not be managed and stored.

After installation, the manageable fiber optic cable portion 1106 can extend beyond the ends of the outer jacket portion 1104. The flexible and small nature of the manageable fiber optic cable portion 1106 allows it to be efficiently and effectively managed and stored. The length of the manageable fiber optic cable portion 1106 need not be customized. Instead, the manageable fiber optic cable portion 1106 can be pre-connectorized with a standard length longer than the length of the intended installation path, and the excess length of the manageable fiber optic cable portion 1106 can he efficiently stored by a management device having a relatively small volume. Such a management device includes the storage device 1150 and a fiber optic enclosure in the field.

In some examples, the cabling system 1100 includes a tool 1190 for facilitating the insertion of the fiber optic cable portion 1106 into the jacket portion 104. The tool 1190 can have various configurations. One example of the tool 1190 includes the jacket insertion device 108 as described and illustrated herein. Other examples of the tool 1190 are described below.

Referring to FIGS. 47-50, another example of the jacket portion is described. In this example, the jacket portion is generally designated as reference 1200. Similarly to the jacket 1104 above, the jacket 1200 is configured to receive a cable therein once the jacket and the cable are carried to a field location.

Figure 49:
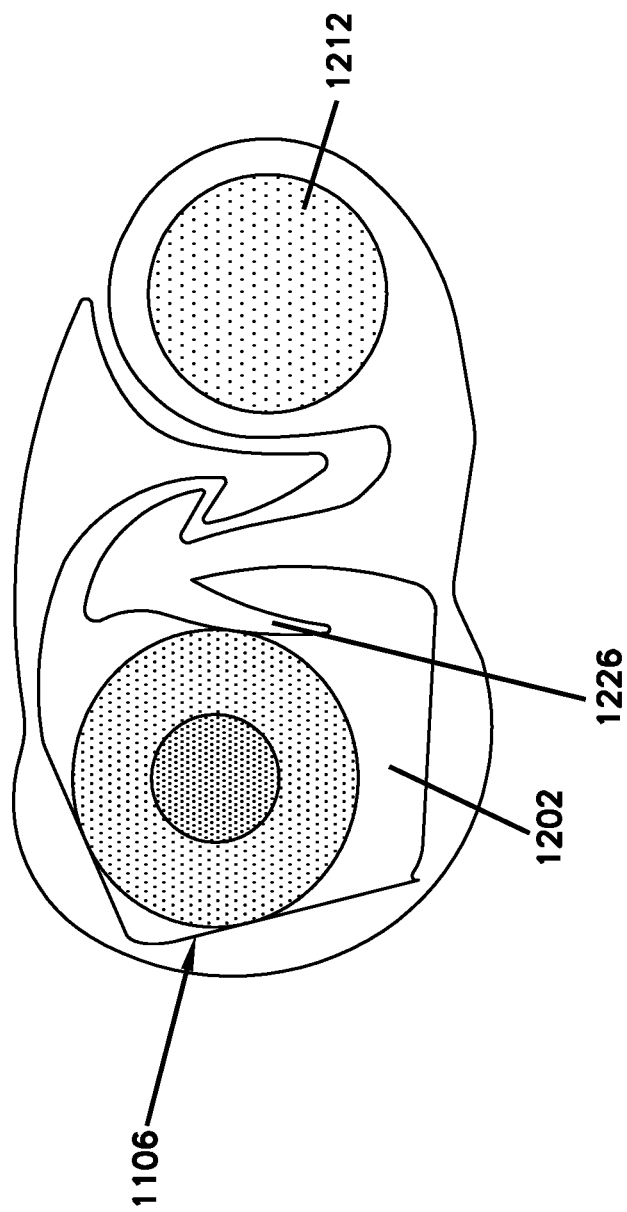
FIG. 49 is a cross sectional view of the jacket of FIG. 47 where the jacket is assembled with a cable.

The jacket 1200 is configured to define an interior passage 1202 for receiving a cable 1106, as shown in FIG. 49. As shown in a cross-sectional view of FIG. 48, the jacket 1200 is formed as a split sleeve 1204 having a flexible section 1206 and mating edges 1208, 1210 of the flexible section 1206. In some embodiments, the jacket 1200 is manufactured by extrusion. The jacket 1200 is snapped around the cable 1106 by mating a first edge 1208 with a second edge 1210.

The jacket 1200 includes the flexible section 1206 before wrapping a cable. Since the jacket 1200 remains flat as extruded, the jacket 1200 can be wound on a large bulk roll for transportation to a field location. Once carried to a field location, the flat sleeve 1204 is rolled out (or paid out from a roller, reel, or spool), and is wrapped around a cable.

In some examples, the jacket 1200 includes a stiffening element 1212 configured to provide a longitudinal strength to an assembled cable product (i.e., the jacket including the cable). The stiffening element 1212 makes it easier to carry or push the assembled cable product through conduits, tubes, ducts, risers, plenums, or any other routing passages. In the illustrated example, the stiffening element 1212 is shaped as a rod and provided at the second edge 1210. Other locations are also possible in other examples. The stiffening element 1212 is made of various materials. One example material is fiberglass or other fiber-reinforced plastic. Another example material is metal.

The jacket 1200 includes a clamp device 1214 to mate the first edge 1208 and the second edge 1210 together. In some examples, the clamp device 1214 includes a pushing edge 1216 formed at the first edge 1208 and a receiving edge 1218 formed at the second edge 1210. The receiving edge 1218 defines a socket 1220 by cooperating with a portion containing the stiffening element 1212 at the second edge 1210. The socket 1220 is configured to receive and hold the pushing edge 1216 therein. In some examples, the pushing edge 1216 and/or the receiving edge 1218 include hook elements 1222, 1224 that engage each other to mate the pushing edge 1216 and the receiving edge 1218 together. In some examples, at least one of the pushing edge 1216 and the receiving edge 1218 is made to be flexible or deflectable for improved mating.

In some examples, the pushing edge 1216 and the receiving edge 1218 can be sealed with adhesives (e.g., gel). In other examples, the pushing edge 1216 and the receiving edge 1218 are just mechanically mated.

As shown in FIG. 49, the jacket 1200 is dimensioned to lightly squeeze the cable radially when a cable 1106 is placed in the interior passage 1202 of the jacket 1200. Accordingly, the cable 1106 is prevented from sliding along the length of the jacket 1200. In some examples, the jacket 1200 includes a cable holding element 1226 configured to abut with the cable 1106 when the jacket 1200 wraps around the cable 1106. In the illustrated example, the cable holding element 1226 is formed at the receiving edge 1218 opposite to the hook element 1224. The cable holding element 1226 is configured to be flexible to accommodate different sizes of cable 1106 received in the jacket. The cable holding element 1226 operates to grip the cable as the cable is plowed into the jacket, and prevent or limit the amount of free translation of the cable longitudinally within the jacket. This configuration reduces a risk to pull on one end of the cable and cause it to telescope out of the entire jacket, thereby possibly damaging the arrangement at the other end.

In other examples, the jacket includes a fixation device that holds or retains the manageable fiber optical cable relative to the outer jacket as the manageable fiber optic cable is plowed into the outer jacket. In this way, the cable cannot slide axially or longitudinally relative to the jacket during the insertion process. In some examples, the rollers (e.g., a tool 1230 below) can be used to achieve this feature. For example, the rollers can pinch the jacket hard enough to clamp the manageable fiber optic cable to prevent it from sliding.

Figure 50:
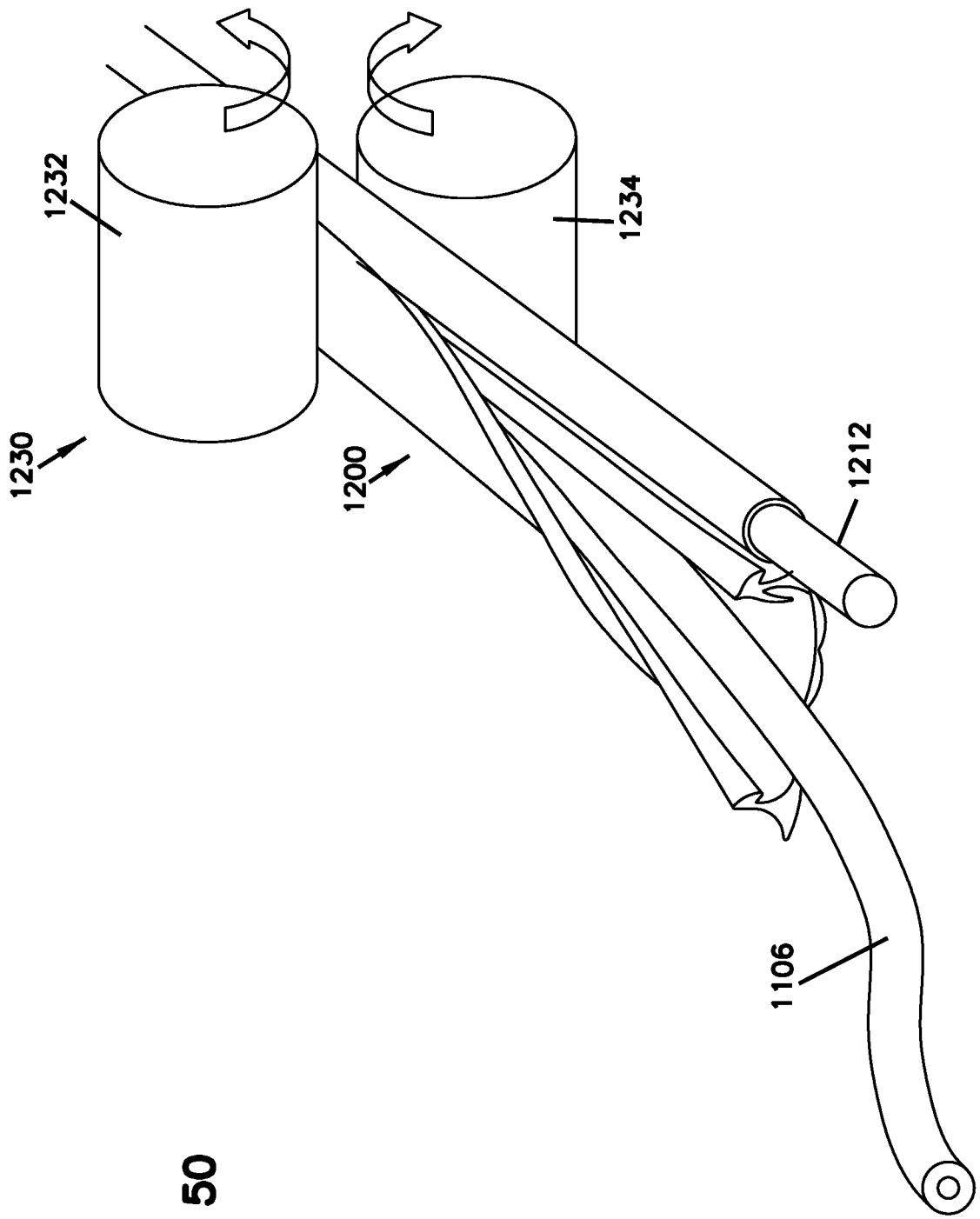
FIG. 50 schematically illustrates an example tool for facilitating the assembly of the jacket with a cable.

Referring to FIG. 50, a tool 1230 can be used to zip the jacket 1200 around a cable 1106. Once a cable 1106 is fed on the split sleeve 1204 (e.g., on or above the flexible section 1206 between the mating edges 1208, 1210), at least one of the pushing edge 1216 and the receiving edge 1218 is grabbed and moved close to each other. The tool 1230 is used to snaps the pushing edge 1216 into the socket 1220 of the receiving edge 1218 so that the pushing edge 1216 and the receiving edge 1218 are held together.

In some examples, the tool 1230 includes a pair of rollers 1232, 1234 (also referred to herein as pinch rollers) that are spaced apart to define a passage through which the jacket 1200 passes. The rollers 1232, 1234 rotates in the opposite directions and squeezes the jacket 1200 therebetween such that the pushing edge 1216 is mated with the receiving edge 1218 (e.g., the socket 1220 thereof). The motion of the rollers 1232, 1234 that roll to pinch the jacket 1200 can also propel the zipped jacket forward to a desired location (for example, through another larger conduit). In other examples, other types of tool can be used to zip the jacket with a cable therein. The tool 1230 can be manually operated. In other examples, the tool 1230 can be electronically operated.

Figure 51:
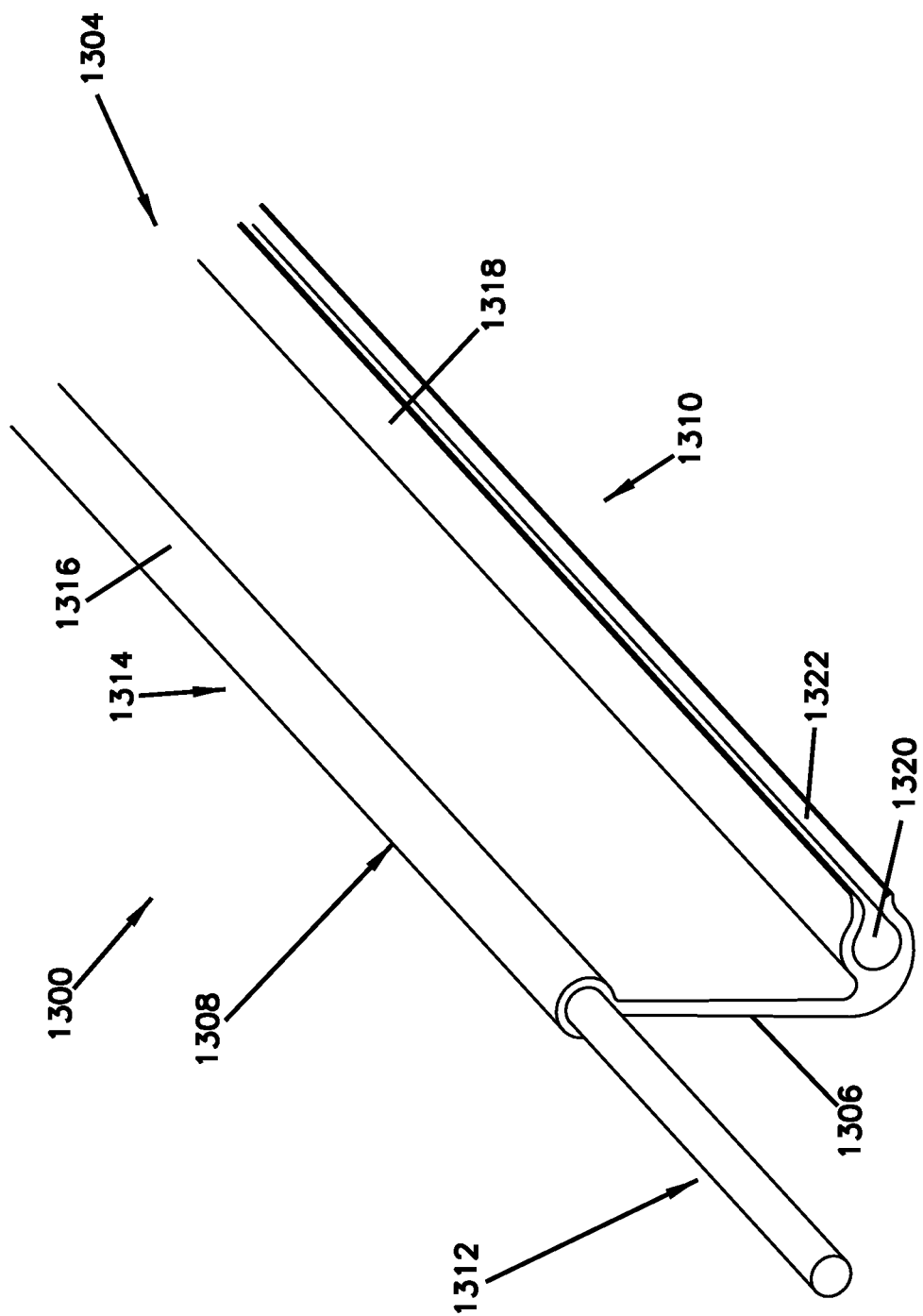
FIG. 51 is a perspective view of yet another example of a jacket in accordance with the present disclosure.
Figure 52:
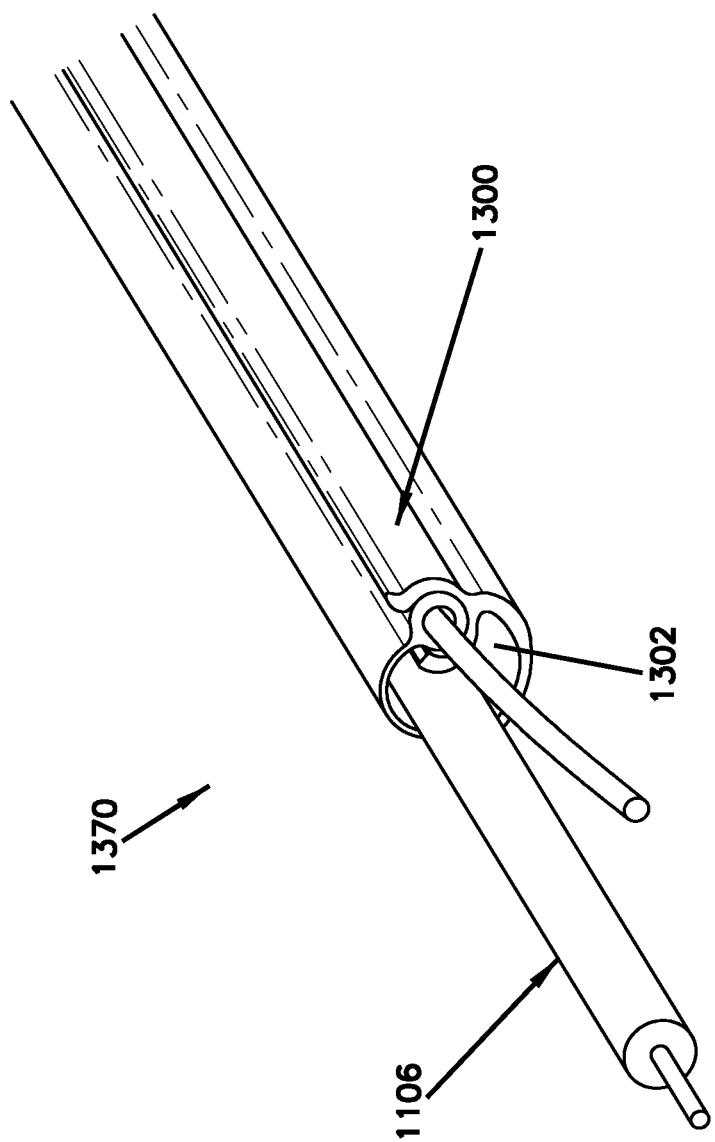
FIG. 52 is a perspective view of the jacket of FIG. 51 where the jacket is assembled with a cable.

Referring to FIGS. 51 and 52, yet another example of the jacket portion is described. In this example, the jacket is generally designed as reference 1300. Similarly to the jackets 1104 and 1200 above, the jacket 1300 is configured to receive a cable 1106 therein once the jacket and the cable are carried to a field location.

Similarly to the jacket 1200, the jacket 1300 is configured to define an interior passage 1302 for receiving a cable 1106, as shown in FIG. 52. The jacket 1200 is formed as a split sleeve 1304 having a flexible section 1306 and mating edges 1308, 1310. In some embodiments, the jacket 1300 is manufactured by extrusion. The jacket 1300 is snapped around the cable 1106 by mating a first edge 1308 with a second edge 1310.

The jacket 1300 includes the flexible section 1306 before wrapping a cable. Since the jacket 1300 remains flat as extruded, the jacket 1300 can be wound on a large bulk roll for transportation to a field location. Once carried to a field location, the flat sleeve 1304 is rolled out (or paid out from a roller, reel, or spool), and is wrapped around a cable.

In some examples, the jacket 1300 includes a stiffening element 1312 configured to provide a longitudinal strength to an assembled cable product (i.e., the jacket including the cable). The stiffening element 1312 makes it easier to carry or push the assembled cable product through a conduit, tube, or any other routing passage. In the illustrated example, the stiffening element 1312 is provided at the first edge 1308. Other locations are also possible in other examples. The stiffening element 1312 is made of various materials. One example material is fiberglass or other fiber-reinforced plastic. Another example material is metal.

The jacket 1300 includes a clamp device 1314 to mate the first edge 1308 and the second edge 1310 together. In some examples, the clamp device 1314 includes a pushing edge 1316 formed at the first edge 1308 and a receiving edge 1318 formed at the second edge 1310. The receiving edge 1318 defines a socket 1320 that is open though a longitudinal slit 1320. The socket 1320 is configured to receive the pushing edge 1316 through the slit 1320 and hold the pushing edge 1316 therein. In some examples, the receiving edge 1318 is made to be flexed open as the pushing edge 1316 is inserted into the socket 1320. As such, the pushing edge 1316 and the receiving edge 1318 are zipped together, just as a continuous ziplock, to enclose a cable therein.

In this example, the stiffening element 1312 is used to reinforce the pushing edge 1316 so that the pushing edge 1316 is effectively engaged with the receiving edge 1318. Further, as described with respect to the jacket 1200, the edges 1316 and 1318 are combined with a cable therein as the jacket 1300 (e.g., the split sleeve 1304) is pushed toward a desired destination, or through a larger conduit. The jacket 1200 can be zipped either manually, or by a tool which can be either manually or electronically operated. Such a tool can be similar to the tool 1230 as described above.

In some examples, the pushing edge 1316 and the receiving edge 1318 can be sealed with adhesives (e.g., gel). In other examples, the pushing edge 1316 and the receiving edge 1320 are just mechanically mated. In some examples, the receiving edge 1318 (with the pushing edge 1316) abuts with the cable received in the jacket, and slightly exerts pressure against the cable. This configuration functions similarly to the cable holding element 1226 above.

With this configuration, the jacket 1104, 1200, 1300 provides a structure for easily inserting a cable 1106 therein over a longer distance in a field location where the cable 1106 is installed and/or routed. The field location can be various places, such as a location between a distribution pedestal and a subscriber location, a place on a cell tower, a place inside a building, an underground location, a location along wires, and any other interior or exterior locations.

The clamping feature of the jacket, such as the pushing and receiving edges, allows a significantly long length of the jacket to be zipped without accumulating tension on the cable. The cable is clamped within the jacket (or the split sleeve) as it is assembled with a cable, and a longitudinal slippage between the cable and the jacket (or the split sleeve) is reduced. Therefore, no significant tension can accumulate. The jacket of the present disclosure provides improved ability to push a cable for a longer distance while retaining sufficient flexibility to go around bends in a piping system into which the jacket with the cable is pushed.

In some examples, the jacket is configured such that the cable inserted within the jacket has a slight serpentine shape as the cable is contained inside the jacket. Over long distances, the serpentine shape of the cable allows the cable to elongate without being tensioned if the jacket is stretched. For example, the jacket includes structures that cause the cable to have a serpentine shape when the cable is placed within the jacket.

For example, in FIG. 49, the cable holding element 1226 can be extruded such that it is wavy along the longitudinal axis. In yet other examples, the cable holding element 1226 can be formed intermittently along the longitudinal axis. For example, the cable holding element 1226 is alternatingly present in a pattern along the longitudinal axis. By way of example, the cable holding element 1226 is present for certain length (e.g., a few inches) and then not present for certain length (e.g., a few inches) along the longitudinal axis, and this pattern is repeated along the entire length of the jacket 1200. Such a wavy or intermittent profile of the cable holding element 1226 can induce a serpentine shape in the fiber once the fiber is inserted in the jacket. Further, the wavy or intermittent shape of the cable holding element 1226 can provide a light axial grip.

In other examples, a serpentine shape can be formed by extruding the entire profile of a jacket such that the jacket is slightly serpentine as it is extruded. As such, the entire structure of the jacket has ability to expand without tensioning the fiber portion.

In some examples, such serpentine structures in the jacket permit the manageable fiber optic cable to define a sinusoidal wave-like shape or path within the outer jacket. This provides excess manageable cable length within the outer jacket so that if the jacket is stretched axially/longitudinally, the excess cable length will be taken up (i.e., the manageable fiber optic cable will straighten within the outer jacket). Without the excess cable length, the cable may break or be damaged when the outer jacket is stretched.

As described herein, the jacket can be made of various materials, such as a soft plastic-like polyethylene over a pre-made fiberglass rod. By way of example, the cable 1106 has a diameter of about 1 mm. In some examples, the fiberglass rod 1212 has a diameter similar to the diameter of the cable. In other example, the fiber glass rod can have different sizes to create the jacket of different stiffness for different applications.

As described herein, the split tube jacket 1104, 1200, 1300 is used to conveniently install different lengths of cable at various locations. Referring to FIG. 53, a method 1318 is described for installing a fiber optic cable in field. In some examples, a fiber optic cable 1106 and a field-installable jacket 1104, 1200, 1300 are provided at a field location (operation 1402). Then, the cable can be inserted or placed into the interior passage of the field-installable jacket (operation 1404). For example, the cable can be wrapped by the jacket. In some examples, the cable is fed to the jacket as the jacket is deployed along a desired path. The assembly of the cable and the jacket can be either pushed or pulled along the path as the cable is inserted into the jacket.

Once the cable is placed inside the jacket, the field-installable jacket is closed such that the interior passage encloses the cable (operation 1406). As described herein, in some examples, a tool can be used to close the jacket. In other examples, the jacket is closed manually. The jacket can be cut to a length as desired in the field (operation 1408). A remaining length of the cable can be stored in a desired place, such as an fiber optic enclosure (operation 1410).

In other examples, the cable can be placed inside the jacket before delivered to a field location.

In some examples, the split tube jacket 1104, 1200, 1300 (i.e., the split sleeve thereof) is pre-loaded with a water-blocking gel therein. For example, a water-blocking gel can be loaded into the split tube jacket 1104, 1200, 1300 prior to coiling the split tube jacket 1104, 1200, 1300 on a spool during a manufacturing stage (e.g., at the factory). The pre-loading water-blocking gel can help to make the split tube jacket 1104, 1200, 1300 resistant to water intrusion once the split sleeve has been zipped closed. In this way, the system may be used for outdoor fiber installations. In some examples, a small size would be ideal for outdoor underground applications. For example, once a pre-ferrulized optical fiber has been loaded into the gel-containing jacket 1104, 1200, 1300 and the jacket 1104, 1200, 1300 (i.e., the split sleeve thereof) has been zipped shut, the jacket 1104, 1200, 1300 can be installed in a micro-trench.

As such, the cabling system of the present disclosure provides a telecommunications cable and a jacket separately. The cable can be inserted into the jacket once they are delivered to the field. In some examples, the system includes a jacket having structures for easily inserting a cable therein over a long distance in a field location. The system can further include a tool for facilitating the insertion of the cable into the jacket. In certain examples, the jacket is extruded as a flexible sleeve or section having a clamping structure. The clamping feature can be provided at a pushing edge and a receiving edge of the flexible section. Since the jacket is flat as extruded in the form of flexible sleeve, the jacket (as the flexible sleeve) can be wound on a large bulk roll for easy storage and transportation to a field location. Once carried to a field location, the flexible sleeve can be rolled out and is wrapped around a cable. In certain examples, a remaining cable that is not assembled with the jacket can be stored in a desired place, such as within a storage device or an enclosure. In certain examples, a stiffening element is provided to either or both of the pushing edge and the receiving edge. The stiffening element can improve ability to push the jacketed cable for a longer distance while retaining sufficient flexibility to go around bends in a piping system into which the jacket with the cable is pushed or pulled.

As described herein, a telecommunications cable, such as a fiber optic cable, is deaggregated from a jacket, and the cable and the jacket are combined or merged in a field location where the cable is to be routed. In some examples, the cable is fed into the jacket as the jacket is deployed along a predetermined path.

As a telecommunication cable, such as a fiber optic cable, is delicate, the cable needs to be protected by a jacket or a protective outer layer. A jacket is used to receive and protect the cable along a desired path. In accordance with the present disclosure, a cable and a jacket is separately provided in a field location. As cables are relatively small in size (e.g., a cross sectional diameter), the cables can be stored in a small package and carried to field in the package. For example, cables can be stored in a dispenser (either rotating or non-rotating) or any other storage and dispensing device, such as a coil, reel, roller, or spool) and carried to field. In certain examples, different lengths of cables are prepared as different packages such that a technician or installer can select and use a package containing a desired length of cable. In certain examples, the cables are preconnectorized at either or both of the ends thereof.

The jacket in accordance with the present disclosure has structures for easily inserting a cable therein over a long distance in a field location. Further, the jacket is configured to be easily stored and carried to field, separately from a cable. In the field, the jacket can be fed with a cable as the jacket is deployed to a predetermined path. Once the cable is routed as desired, the jacket can be cut to length and any remaining length of the cable can be stored in place, such as a storage device or an enclosure. Since the jacket can be cut to length after a desired length of cable is routed, a technician or installer does not need to know the exact length of cable to be routed along the path.

In certain examples, the system can further include a tool for facilitating the insertion of the cable into the jacket. The tool is configured to feed a cable into a jacket as the jacket is routed along a path by either pulling or pushing an assembly of the cable and the jacket.

In certain examples, the jacket is extruded as a flexible sleeve or section having a clamping structure. The clamping feature can be provided at a pushing edge and a receiving edge of the flexible section. Since the jacket is flat as extruded in the form of flexible sleeve, the jacket (as the flexible sleeve) can be wound on a large bulk roll for easy storage and transportation to a field location. Once carried to a field location, the flexible sleeve can be rolled out and is wrapped around a cable. In certain examples, a remaining cable that is not assembled with the jacket can be stored in a desired place, such as within an enclosure.

The clamping feature of the jacket may allow a significantly long length of the jacket to be zipped without accumulating tension on the cable. As a cable is laterally inserted into the jacket or wrapped around by the jacket, a longitudinal slippage between the cable and the jacket may be significantly reduced.

In certain examples, a stiffening element is provided to either or both of the pushing edge and the receiving edge. The stiffening element can improve ability to push the jacketed cable for a longer distance while retaining sufficient flexibility to go around bends in a piping system into which the jacket with the cable is pushed.

In one aspect, a method for installing a cable includes providing a cable and a field-installable jacket to a field location. The field-installable jacket is configured to define an interior passage and has an opening for receiving the cable into the interior passage. The opening is defined along a length of the field-installable jacket. The method further includes placing the cable to the interior passage of the field-installable jacket, closing the opening of the field-installable jacket to form the interior passage enclosing the cable, and cutting the field-installable jacket into a desired length. In addition, the method may further include storing a remaining length of the cable in an enclosure.

In another aspect, a system for installing a cable includes a cable and a field-installlable jacket configured to define an interior passage for receiving the cable. The jacket has a pushing edge, a receiving edge, and a flexible section extending between the pushing edge and the receiving edge. The interior passage is defined by engaging the pushing edge with the receiving edge. The system may further include a stiffening element provided to at least one of the pushing edge and the receiving edge.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A method of inserting a telecommunications cable into a jacket, the jacket having a longitudinal slit, the method comprising:
   engaging a portion of the telecommunications cable with a cable guide of a jacket insertion device such that the portion of the telecommunications cable is placed within a jacket feeder channel, the telecommunications cable being stored in and dispensed from a cable dispenser;
   inserting a portion of the jacket into the jacket feeder channel to align the portion of telecommunications cable with the slit of the jacket;
   guiding the jacket with a jacket guide including a jacket alignment device inserted into an interior passage of the jacket as the jacket passes through the jacket feeder channel in a travel direction; and
   pulling the telecommunications cable and the jacket together to enable the telecommunications cable to be laterally inserted into the jacket through the slit of the jacket.

2. The method of claim 1, further comprising:
   dispensing the portion of the telecommunications cable from a cable dispenser, wherein the cable dispenser is configured to wind the telecommunications cable into a coreless coil defining an interior winding surface and an exterior winding surface, the interior winding surface defining a hollow interior, and the cable dispenser further including a plurality of winding separators at least partially embedded within the coil, wherein the portion of telecommunications cable alternately passes on one of a first side and a second side of one of the plurality of winding separators and on the other of the first and second sides of an adjacent winding separator.

3. The method of claim 2, further comprising:
   coupling the jacket insertion device to the cable dispenser.

4. A system for inserting a telecommunications cable into a jacket, the jacket having a slit extending along a length of the jacket, the system comprising:
   a non-rotating cable dispenser storing a length of telecommunications cable; and
   an insertion device configured to guide the telecommunications cable from the cable dispenser to the jacket through the slit of the jacket, the insertion device including a jacket guide having a jacket alignment device configured to be inserted into an interior passage of the jacket as the jacket passes through the insertion device in a travel direction.

5. The system of claim 4, wherein the insertion device includes:
   a jacket feeder channel defined by the jacket guide, the jacket feeder channel extending from a first end to a second end and configured to receive a leading end of the length of jacket at the first end; and
   a cable guide configured to guide the length of telecommunications cable to pass at least a portion of the jacket feeder channel and extend out from the second end of the jacket feeder channel, the cable guide aligning the length of telecommunications cable with the slit of the length of jacket passing through the jacket feeder channel,
   wherein at least a portion of the length of telecommunications cable is inserted into the interior passage of at least a portion of the length of jacket through at least a portion of the slit as the length of jacket and the length of telecommunications cable move past the insertion device in the travel direction, and
   wherein the cable guide includes a cable inlet through which the telecommunications cable passes into the jacket feeder channel.

6. A cabling method comprising:
   providing a cable and a field-installable jacket separately to a field location, the field-installable jacket configured to define a first interior passage and an interlocking longitudinal interface running a length of the jacket, an opening defined along a length of the field-installable jacket, the field-installable jacket including a stiffening rod extending within a second interior passage exterior to the first interior passage;
   placing the cable to the first interior passage of the field-installable jacket;

closing the opening of the field-installable jacket, with the interlocking longitudinal interface to provide a mechanical interlock, to form the first interior passage enclosing the cable; and cutting the field-installable jacket into a desired length.

7. The cabling method of claim 6, wherein the cable has a length longer than the desired length of the field-installable jacket, the method further comprising:

storing a remaining length of the cable in a storage device.

8. The cabling method of claim 6, wherein the cable is terminated with connectors at ends of the cable.

9. The cabling method of claim 6, wherein the cable is stored in a cable dispenser and carried to the field location in the cable dispenser.

10. The cabling method of claim 9, wherein the cable dispenser is a non-rotating dispenser.

11. The cabling method of claim 6, wherein placing the cable to the first interior passage of the field-installable jacket includes:

feeding the cable to the field-installable jacket as the field-installable jacket is deployed to a desired path.

12. The cabling method of claim 6, wherein the opening of the field-installable jacket includes a slit running along the length of the field-installable jacket, the slit configured to receive the cable into the first interior passage therethrough.

13. The cabling method of claim 6, wherein the field-installable jacket is made from a split sleeve having a flexible section, wherein the first interior passage is defined by mating edges of the flexible section.

14. The cabling method of claim 13, wherein the field-installable jacket is provided to the field location with a roll of the split sleeve.

15. The cabling method of claim 14, further comprising:

paying out at least a portion of the split sleeve from the roll of the split sleeve prior to placing the cable to the first interior passage of the field-installable jacket.

16. The cabling method of claim 13, wherein the flexible section has a pushing edge and a receiving edge, the method further comprising:

engaging the pushing edge with the receiving edge to close the opening of the field-installable jacket and surround the cable.

17. The cabling method of claim 16, wherein the pushing edge includes the stiffening rod.

18. The cabling method of claim 16, wherein the receiving edge includes the stiffening rod.

19. The cabling method of claim 16, wherein a tool is used to engage the pushing edge with the receiving edge.

20. The cabling method of claim 6, wherein the cable is a fiber optic cable.

* * * * *